United States Patent
Ikai et al.

(10) Patent No.: US 10,200,717 B2
(45) Date of Patent: Feb. 5, 2019

(54) IMAGE DECODING DEVICE, IMAGE CODING DEVICE, AND PREDICTED IMAGE GENERATION DEVICE

(71) Applicant: SHARP KABUSHIKI KAISHA, Sakai, Osaka (JP)

(72) Inventors: Tomohiro Ikai, Sakai (JP); Takeshi Tsukuba, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 62 days.

(21) Appl. No.: 15/319,668

(22) PCT Filed: Jun. 19, 2015

(86) PCT No.: PCT/JP2015/067787
§ 371 (c)(1),
(2) Date: Dec. 16, 2016

(87) PCT Pub. No.: WO2015/194669
PCT Pub. Date: Dec. 23, 2015

(65) Prior Publication Data
US 2017/0134750 A1  May 11, 2017

(30) Foreign Application Priority Data

Jun. 19, 2014 (JP) .................. 2014-126219

(51) Int. Cl.
| H04N 7/18 | (2006.01) |
| H04N 9/47 | (2006.01) |
| H04N 19/597 | (2014.01) |
| H04N 19/159 | (2014.01) |
| H04N 19/176 | (2014.01) |

(Continued)

(52) U.S. Cl.
CPC ......... *H04N 19/597* (2014.11); *H04N 19/117* (2014.11); *H04N 19/159* (2014.11); *H04N 19/176* (2014.11); *H04N 19/182* (2014.11)

(58) Field of Classification Search
None
See application file for complete search history.

(56) References Cited

U.S. PATENT DOCUMENTS

| 2009/0196342 A1* | 8/2009 | Divorra Escoda ..... H04N 19/50 375/240.02 |
| 2013/0083844 A1* | 4/2013 | Chong ................. H04N 19/463 375/240.02 |

OTHER PUBLICATIONS

Jäger et al., "CE3: Results on Depth-based Block Partitoning (DBBP)", Joint Coilaborative Team on 3D Video Coding Extensions of ITU-T SG 16 WP 3 and ISO/IEC JTC 1/SC 29/WG 11 7th Meeting: San Jose, USA, Jan. 11-Jan. 17, 2013, [JCT3V-G0106], 12 Pages.

(Continued)

*Primary Examiner* — Talha M Nawaz
(74) *Attorney, Agent, or Firm* — Birch, Stewart, Kolasch & Birch, LLP

(57) ABSTRACT

In DBBP, there is a problem because of a large processing amount of a synthesis process in which two complement images are synthesized according to segmentation and a filtering process is executed. A predicted image generation device includes a segmentation derivation section that derives segmentation information from an image; and an image synthesis section that generates a predicted image. The image synthesis section executes a filtering process based on a partition mode and the segmentation information.

5 Claims, 18 Drawing Sheets

(51) Int. Cl.
    *H04N 19/117* (2014.01)
    *H04N 19/182* (2014.01)

(56) References Cited

OTHER PUBLICATIONS

Lee et al., "Partition boundary filtering in DBBP", Joint Collaborative Team on 3D Video Coding Extensions of ITU-T SG 16 WP 3 and ISO/IEC JTC 1/SC 29/WG 11 8th Meeting: Valencia, ES, Mar. 29-Apr. 4, 2014, [JCT3V-H0104], 4 Pages.

Park et al., "Simplication of DBBP in 3D-HEVC", Joint Collaborative Team on 3D Video Coding Extensions of ITU-T SG 16 WP 3 and ISO/IEC JTC 1/SC 2.9/WG 11 8th Meeting: Valencia, ES, Mar. 29-Apr. 4, 2014, [JCT3V-H0068], 5 Pages.

\* cited by examiner

FIG. 11
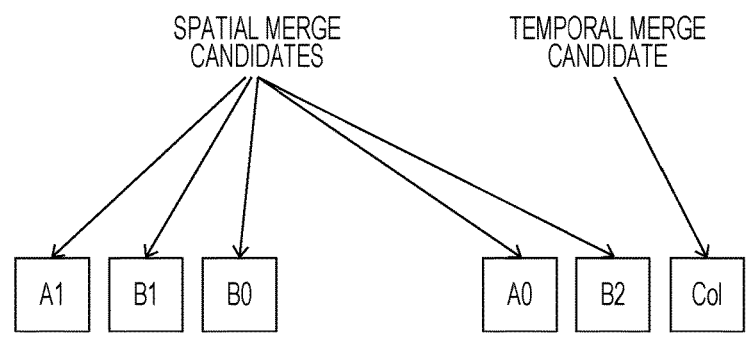
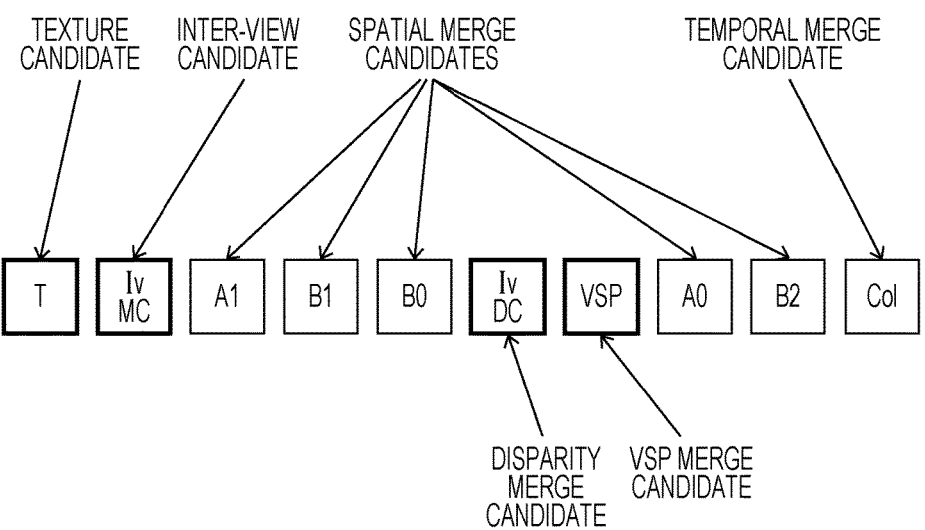

FIG. 20

| coding_unit(x0, y0, log2CbSize, ctDepth) { | Descriptor |
|---|---|
| ... | |
| if( slice_type != I ) | |
|   cu_skip_flag[ x0 ][ y0 ] | ae(v) | ← SE1001
| nCbS = ( 1 << log2CbSize ) | |
| if( cu_skip_flag[ x0 ][ y0 ] ) | |
|   prediction_unit(x0, y0, nCbS, nCbS) | |
| else { | |
|   if( slice_type != I ) | |
|     pred_mode_flag | ae(v) | ← SE1002
|   if( ( CuPredMode[ x0 ][ y0 ] != MODE_INTRA \|\| | |
|     log2CbSize == MinCbLog2SizeY ) && !predPartModeFlag ) | |
|     part_mode | ae(v) | ← SE1003
|   if( depth_based_blk_part_flag[ nuh_layer_id ] && PartMode == PART_2NxN ) | |
|     dbbp_flag[ x0 ][ y0 ] | u(1) | ← SE1004
|   if( CuPredMode[ x0 ][ y0 ] == MODE_INTRA ) { | |
|   ... | |
|   } | |
| } else { | |
|   if( PartMode == PART_2Nx2N ) | |
|     prediction_unit(x0, y0, nCbS, nCbS) | |
|   else if( PartMode == PART_2NxN ) { | |
|     prediction_unit(x0, y0, nCbS, nCbS / 2) | |
|     prediction_unit(x0, y0 + ( nCbS / 2 ), nCbS, nCbS / 2) | |
|   } else if( PartMode == PART_Nx2N ) { | |
|     prediction_unit(x0, y0, nCbS / 2, nCbS) | |
|     prediction_unit(x0 + ( nCbS / 2 ), y0, nCbS / 2, nCbS) | |
|   } else if( PartMode == PART_2NxnU ) { | |
|     prediction_unit(x0, y0, nCbS, nCbS / 4) | |
|     prediction_unit(x0, y0 + ( nCbS / 4 ), nCbS, nCbS * 3 / 4) | |
|   } else if( PartMode == PART_2NxnD ) { | |
|     prediction_unit(x0, y0, nCbS, nCbS * 3 / 4) | |
|     prediction_unit(x0, y0 + ( nCbS * 3 / 4 ), nCbS, nCbS / 4) | |
|   } else if( PartMode == PART_nLx2N ) { | |
|     prediction_unit(x0, y0, nCbS / 4, nCbS) | |
|     prediction_unit(x0 + ( nCbS / 4 ), y0, nCbS * 3 / 4, nCbS) | |
|   } else if( PartMode == PART_nRx2N ) { | |
|     prediction_unit(x0, y0, nCbS * 3 / 4, nCbS) | |
|     prediction_unit(x0 + ( nCbS * 3 / 4 ), y0, nCbS / 4, nCbS) | |
|   } else { /* PART_NxN */ | |
|     prediction_unit(x0, y0, nCbS / 2, nCbS / 2) | |
|     prediction_unit(x0 + ( nCbS / 2 ), y0, nCbS / 2, nCbS / 2) | |
|     prediction_unit(x0, y0 + ( nCbS / 2 ), nCbS / 2, nCbS / 2) | |
|     prediction_unit(x0 + ( nCbS / 2 ), y0 + ( nCbS / 2 ), nCbS / 2, nCbS / 2) | |
|   } | |
| } | |
| } | |
| cu_extension(x0, y0) | |
| if( !cu_skip_flag[ x0 ][ y0 ] ) { | |
|   if( !pcm_flag[ x0 ][ y0 ] && !sdc_flag[ x0 ][ y0 ] ) { | |
|     if( CuPredMode[ x0 ][ y0 ] != MODE_INTRA && | |
|     !( PartMode == PART_2Nx2N && merge_flag[ x0 ][ y0 ] ) ) | |
|     rqt_root_cbf | ae(v) |
|     if( rqt_root_cbf ) { | |
|       MaxTrafoDepth = ( CuPredMode[ x0 ][ y0 ] == MODE_INTRA ? | |
|         (max_transform_hierarchy_depth_intra + IntraSplitFlag) : | |
|         max_transform_hierarchy_depth_inter ) | |
|       transform_tree(x0, y0, x0, y0, log2CbSize, 0, 0) | |
|     } | |
|   } | |
| } | |
| } | |

IMAGE DECODING DEVICE, IMAGE CODING DEVICE, AND PREDICTED IMAGE GENERATION DEVICE

TECHNICAL FIELD

The present invention relates to an image decoding device, an image coding device, and a predicted image generation device.

BACKGROUND ART

In image coding techniques for multiple-viewpoint images, disparity prediction coding that reduces the amount of information by predicting disparity between images at the time of coding of multiple-viewpoint images and decoding methods corresponding to the coding methods have been proposed. A vector indicating disparity between viewpoint images is referred to as a disparity vector. A disparity vector is a 2-dimensional vector that has a component (x component) in the horizontal direction and a component (y component) in the vertical direction and is calculated for each block which is a region obtained by splitting one image. To acquire multiple-viewpoint images, it is general to use cameras disposed at respective viewpoints. In coding for multiple-viewpoint images, viewpoint images are coded as different layers in a plurality of layers. A coding method for a moving image formed in a plurality of layers is generally referred to as scalable coding or hierarchical coding. In scalable coding, high coding efficiency is realized by executing prediction between layers. A layer serving as a standard layer, which is not used in prediction between layers, is referred to as a base layer and other layers are referred to as enhancement layers. In a case where layers are formed from viewpoint images, scalable coding is referred to as view scalable coding. At this time, a base layer is also referred to as a base view and an enhancement layer is also referred to as a non-base view. Further, in addition to view scalable coding, scalable coding is referred to as 3-dimensional scalable coding in a case where layers are formed from a texture layer (image layer) and a depth layer (distance image layer).

In scalable coding, there are spatial scalable coding (in which a picture with a low resolution is processed as a base layer and a picture with a high resolution is processed as an enhancement layer), SNR scalable coding (in which a picture with a low resolution is processed as a base layer and a picture with a high resolution is processed as an enhancement layer), and the like as well as view scalable coding. In the scalable coding, for example, a picture of the base layer is used as a reference picture in coding for a picture of an enhancement layer in some cases.

In NPL 1, there is known a technique called depth-based block partitioning (DBBP) for deriving partition information (segmentation) from depth and synthesizing one predicted image from two interpolated images using the segmentation as a mask. In the DBBP, by deriving segmentation from region partition based on pixels of depth, the partition with the high degree of freedom is possible without being limited to rectangles (2N×2N, 2N×N, 2N×nU, 2N×nD, N×2N, nL×2N, and nR×2N).

In NPL 2, in a blending process for the DBBP, coding efficiency is improved by using horizontal and vertical filtering processes together.

CITATION LIST

Non Patent Literature

NPL 1: F. Jager, J. Konieczny, and G. Cordara, "CE3: Results on Depth-based Block Partitioning (DBBP)", JCT3V-G0106, JCT-3V 7th Meeting: San Jose, USA, 11 Jan. to 17 Jan. 2013 (disclosed on Jan. 3, 2014)

NPL 2: J. Y. Lee, M. Mishurovskiy, M. W. Park, C. Kim, "Partition boundary filtering in DBBP", JCT3V-H0104, JCT-3V 8th Meeting: Valencia, ES, 29 Mar. to 4 Apr. 2014 (disclosed on Mar. 21, 2014)

SUMMARY OF INVENTION

Technical Problem

In the DBBP synthesis process of NPL 1 and the DBBP filter of NPL 2, a difference in segmentation between each pixel on a block and adjacent pixels is determined on four top, bottom, right, and left adjacent pixels and a blending or filtering process is executed. Therefore, there is a problem that the determination process and the blending process are complicated.

Solution to Problem

According to an aspect of the invention, a predicted image generation device includes a segmentation derivation section that derives segmentation information from an image and an image synthesis section that generates a predicted image. The image synthesis section executes a filtering process based on a partition mode and the segmentation information.

Advantageous Effects of Invention

According to the invention, it is possible to obtain the advantageous effect of reducing a processing amount of a synthesis process in which two complement images are synthesized according to segmentation and a filtering process is executed in DBBP while maintaining coding efficiency.

BRIEF DESCRIPTION OF DRAWINGS

FIG. 4 is a diagram illustrating patterns of partition modes and FIGS. 4(a) to 4(h) illustrate partition shapes in a case of the partition modes 2N×2N, 2N×N, 2N×nU, 2N×nD, N×2N, nL×2N, nR×2N, and N×N, respectively.

FIG. 11 is a diagram illustrating an example of a merge candidate list.

FIG. 20 is a syntax table illustrating a DBBP flag dbbp_flag according to the embodiment.

DESCRIPTION OF EMBODIMENTS

Hereinafter, an embodiment of the present invention will be described with reference to the drawings.

Figure 2:
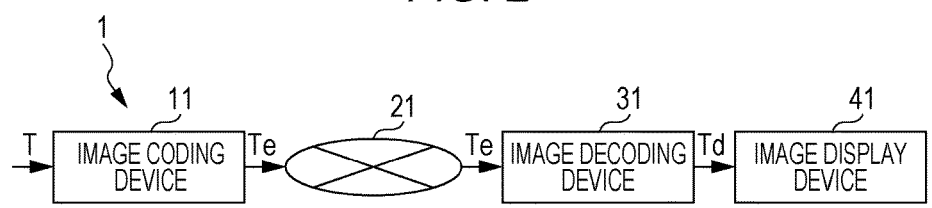
FIG. 2 is a schematic diagram illustrating the configuration of an image transmission system according to an embodiment of the invention.

FIG. 2 is a schematic diagram illustrating the configuration of an image transmission system 1 according to the embodiment.

The image transmission system 1 is a system that transmits codes obtained by coding a plurality of layer images and displays images obtained by decoding the transmitted codes. The image transmission system 1 is configured to include an image coding device 11, a network 21, an image decoding device 31, and an image display device 41.

Signals T indicating a plurality of layer images (also referred to as texture images) are input to the image coding device 11. The layer images are images viewed or captured at certain resolutions and certain viewpoints. In a case where view scalable coding of coding a 3-dimensional image using a plurality of layer images is executed, each of the plurality of layer images is referred to as a view image. Here, the viewpoint corresponds to an observation point or the position of an imaging device. For example, a plurality of viewpoint images are images obtained when right and left imaging devices image an object. The image coding device 11 codes the signals to generate coded streams Te (coded data). The details of the coded streams Te will be described below. The viewpoint image is a 2-dimensional image (planar image) observed at a certain viewpoint. The viewpoint image is expressed with, for example, a luminance value or a color signal value of each of the pixels arrayed in a 2-dimensional plane. Hereinafter, one viewpoint image or a signal indicating the viewpoint image is referred to as a picture. In a case where spatial scalable coding is executed using a plurality of layer images, the plurality of layer images are formed of a base layer image with a low resolution and enhancement layer images with high resolutions. In a case where SNR scalable coding is executed using a plurality of layer images, the plurality of layer images are formed of a base layer image with low quality and enhancement layer images with high quality. The view scalable coding, the spatial scalable coding, and the SNR scalable coding may be combined arbitrarily. In the embodiment, coding and decoding of images including at least a base layer image and images (enhancement layer images) other than the base layer image as a plurality of layer images are treated. An image on a referred side in two layers having a reference relation (dependency relation) in images or coding parameters among a plurality of layers is referred to as a first layer image and an image on a referring side is referred to as a second layer image. For example, in a case where there is an enhancement layer image (other than a base layer) coded referring to the base layer, the base layer image is treated as the first layer image and an enhancement layer image is treated as a second layer image. As an example of the enhancement layer image, there is a viewpoint image or a depth image other than a base view.

A depth image (also referred to as a depth map or a "distance image") is a signal value (referred to as a "depth value" or a "depth" corresponding to a distance of an object or a background contained in an object plane from a viewpoint (an imaging device or the like) and is an image signal formed from a signal value (pixel value) of each of the pixels arrayed in a 2-dimensional plane. The pixels forming a depth image correspond to the pixels forming a viewpoint image. Accordingly, the depth map serves as a clue for expressing a 3-dimensional object plane using a viewpoint image which is an image signal serving as a standard in which an object plane is projected to a 2-dimensional plane.

The network 21 transmits the coded streams Te generated by the image coding device 11 to the image decoding device 31. The network 21 is the Internet, a wide area network (WAN), a local area network (LAN), or a combination thereof. The network 21 is not necessarily limited to a bi directional communication network, but may be a uni-directional or bi-directional communication network in which broadcast waves of terrestrial digital broadcast or satellite broadcast are transmitted. The network 21 may be substituted with a storage medium that stores the coded streams Te, such as a digital versatile disc (DVD) or a Blu-ray (BD) disc.

The image decoding device 31 decodes the coded streams Te transmitted by the network 21 to generate a plurality of decoded layer images Td (decoded viewpoint images Td).

The image display device 41 displays some or all of the plurality of decoded layer images Td generated by the image decoding device 31. For example, in the view scalable coding, in the case where all of the decoded layer images are displayed, 3-dimensional images (stereoscopic images) or free viewpoint images are displayed. In the case where some of the decoded layer images are displayed, 2-dimensional images are displayed. The image display device 41 includes, for example, a display device such as a liquid crystal display or an organic electro-luminescence (EL) display. In the spatial scalable coding and the SNR scalable coding, in a case where the image decoding device 31 and the image display device 41 have a high processing capability, enhancement layer images with high quality are displayed. In a case where the image decoding device 31 and the image display device 41 have a lower processing capability, base layer images for which a processing capability or a display capability is not necessary in an enhancement layer are displayed.

<Structure of Coded Stream Te>

The data structure of the coded stream Te generated by the image coding device 11 and decoded by the image decoding device 31 will be described before the image coding device 11 and the image decoding device 31 according to the embodiment are described.

Figure 3:
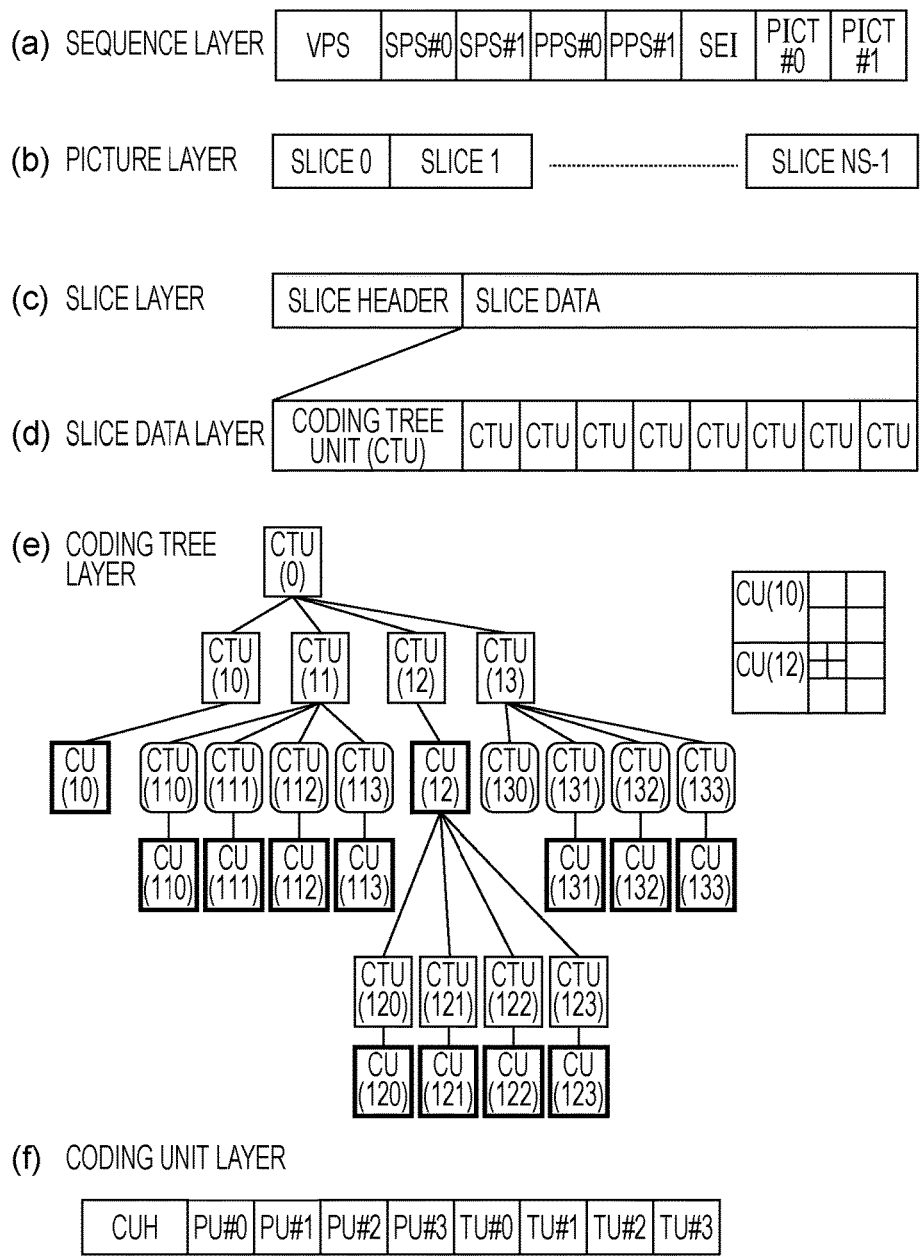
FIG. 3 is a diagram illustrating a hierarchical structure of data of a coded stream according to the embodiment of the invention.

FIG. 3 is a diagram illustrating the hierarchical structure of data of the coded stream Te. The coded stream Te includes, for example, a sequence and a plurality of pictures forming the sequence. FIGS. 3(a) to 3(f) are diagrams illustrating a sequence layer establishing a sequence SEQ, a picture layer defining pictures PICT, a slice layer defining slices S, a slice data layer defining slice data, a coding tree layer defining a coding tree unit included in slice data, and a coding unit layer defining a coding unit (CU) included in a coding tree, respectively.

(Sequence Layer)

In the sequence layer, a set of data which is referred to by the image decoding device 31 is defined to decode the processing target sequence SEQ (hereinafter also referred to as a target sequence). As illustrated in FIG. 3(a), the sequence SEQ includes a video parameter set, a sequence parameter set (SPS), a picture parameter set PPS, picture PICTs, and supplemental enhancement information (SEI). Here, a value suffixed after # indicates a layer ID (nuh_layer_id). In FIG. 3, an example in which there is coded data of #0 and #1, that is, layer 0 and layer 1, is illustrated, but the kinds of layers and the number of layers are not limited thereto.

In the video parameter set VPS, a set of coding parameters common to a plurality of moving images in a moving image formed by a plurality of layers and a set of coding parameters related to the plurality of layers and an individual layer included in the moving image are defined.

In the sequence parameter set SPS, a set of coding parameters which are referred to by the image decoding device 31 to decode the target sequence is defined. For example, the width or the height of a picture is defined.

In the picture parameter set PPS, a set of coding parameters which are referred to by the image decoding device 31 to decode each picture in a target sequence is defined. For example, a standard value (pic_init_qp_minus26) of a quantization width used to decode a picture or a flag (weighted_pred_flag) indicating application of weighted prediction are included. There may be a plurality of PPSs. In this case, any of the plurality of PPSs is selected from each picture in the target sequence.

(Picture Layer)

In the picture layer, a set of data which is referred to by the image decoding device 31 to decode a processing target picture PICT (hereinafter also referred to as a target picture) is defined. As illustrated in FIG. 3(b), the picture PICT includes slices S0 to SNS−1 (where NS is a total number of slices included in the picture PICT).

Hereinafter, in a case where it is not necessary to distinguish the slices S0 to SNS−1 from each other, the suffixes of the reference numerals are omitted in description in some cases. The same also applies data which is included in the coded stream Te to be described below and other data to which suffixes are attached.

(Slice Layer)

In the slice layer, a set of data which is referred to by the image decoding device 31 to decode a processing target slice S (also referred to as a target slice) is defined. As illustrated in FIG. 3(c), the slice S includes a slice header SH and slice data SDATA.

The slice header SH include a coding parameter group which is referred to by the image decoding device 31 to decide a target slice decoding method. Slice type designation information (slice_type) designating a type of slice is an example of a coding parameter included in the slice header SH.

As the types of slices which can be designated by the slice type designation information, (1) an I slice in which only intra-prediction is used at the time of coding, (2) a P slice in which uni-directional prediction or intra-prediction are used at the time of coding, and (3) a B slice in which uni-directional prediction, bi-directional prediction, or intra-prediction is used at the time of coding can be exemplified.

The slice header SH may include a reference (pic_parameter_set_id) to the picture parameter set PPS which is included in the sequence layer.

(Slice Data Layer)

In the slice data layer, a set of data which is referred to by the image decoding device 31 to decode the processing target slice data SDATA is defined. As illustrated in FIG. 3(d), the slice data SDATA includes a coded tree block (CTB). The CTB is a block with a fixed size (for example, 64×64) forming a slice and is also referred to as a largest cording unit (LCU) in some cases.

(Coding Tree Layer)

In the coding tree layer, as illustrated in FIG. 3(e), a set of data which is referred to by the image decoding device 31 to decode a processing target coded tree block is defined. The coded tree unit is partitioned through recursive quadtree partition. A node of a tree structure obtained through the recursive quadtree partition is referred to as a coding tree. An immediate node of a quadtree is defined as a coded tree unit (CTU) and the coded tree block is also defined as a highest CTU. The CTU includes a splitting flag (split_flag). In a case where split_flag is 1, the coded tree unit is partitioned to four coded tree units CTU. In a case where split_flag is 0, the coded tree unit CTU is partitioned into four coded units (CU). The coded unit CU is an end node of the coding tree and no further partition is executed in this layer. The coded unit CU is a base unit of a coding process.

In a case where the coded tree block CTB has a size of 64×64 pixels, the size of the coded unit CU can be one of 64×64 pixels, 32×32 pixels, 16×16 pixels, and 8×8 pixels.

(Coding Unit Layer)

In the coding unit layer, as illustrated in FIG. 3(f), a set of data referred to by the image decoding device 31 to decode the coding unit of a processing target is defined. Specifically, the coding unit is configured to include a CU header CUH, a prediction tree, a transform tree, a CU header CUF. In the CU header CUH, for example, whether the coding unit is a unit used for intra-prediction or a unit used for inter-prediction is defined. In the CU header CUH, the coding unit includes a residual prediction weight index iv_res_pred_weight_idx indicating a weight (or whether to execute residual prediction) used for residual prediction or an illumination compensation flag ic_flag indicating whether to use illumination compensation prediction. The coding unit is a root of a prediction unit (PU) and a transform tree (TT). The CU header CUF is included between the prediction tree and the transform tree or after the transform tree.

In the prediction tree, the coding unit is partitioned into one prediction block or a plurality of prediction blocks and the position and size of each prediction block are defined. In other words, the prediction block is a region included in the coding unit and one or plurality of regions which do not overlap with each other. The prediction tree includes one prediction block or a plurality of prediction blocks obtained through the above-described partition.

The prediction process is executed for each prediction block. Hereinafter, the prediction block which is a unit of prediction is referred to as a prediction unit (PU). More specifically, since the prediction is executed in units of color components, a block of each color component such as a luminance prediction block or a chroma prediction block is referred to as a prediction block below and referred to as a prediction unit to be fitted to a block of a plurality of color components (a luminance prediction block or a chroma prediction block). A block in which an index cIdx (colour_component Idx) indicating a kind of a color component) is 0 indicates a cIdx (colour_component Idx) indicates a luminance block (luminance prediction block) (usually indicated as L or Y) and a block in which cIdx is 1 or 2 indicates a Cb or Cr chroma block (chroma prediction block).

Roughly speaking, there are two types of partition in the prediction tree in the case of intra-prediction and the case of inter-prediction. The intra-prediction refers to prediction in the same picture and the inter-prediction refers to a prediction process executed between mutually different pictures (for example, between display times or between layer images).

In the case of intra-prediction, there are 2N×2N (which is the same size of the coding unit) and N×N partition methods.

In the case of inter-prediction, coding is executed in a partition mode part_mode of the coded data in a partition method. In the partition mode designated in the partition mode part_mode, there are a total of the following 8 types of patterns when the size of the target CU is set to 2N×2N. That is, there are four symmetric partitions (symmetric splittings), 2N×2N pixels, 2N×N pixels, N×2N pixels, and N×N pixels, and four asymmetric motion partitions (AMP), 2N×nU pixels, 2N×nD pixels, nL×2N pixels, and nR×2N pixels. N=2m (where m is any integer equal to or greater than 1) is meant. Hereinafter, a prediction block of which the partition mode is the asymmetric motion partition is also referred to as an AMP block. Since the number of partitions is one of 1, 2, and 4, the number of PUs included in the CU is 1 to 4. The PUs are expressed as PU0, PU1, PU2, and PU3 in order.

FIGS. 4(a) to 4(h) specifically illustrate the positions of boundaries of PU partition in the CU in the partition modes.

Figure 4:
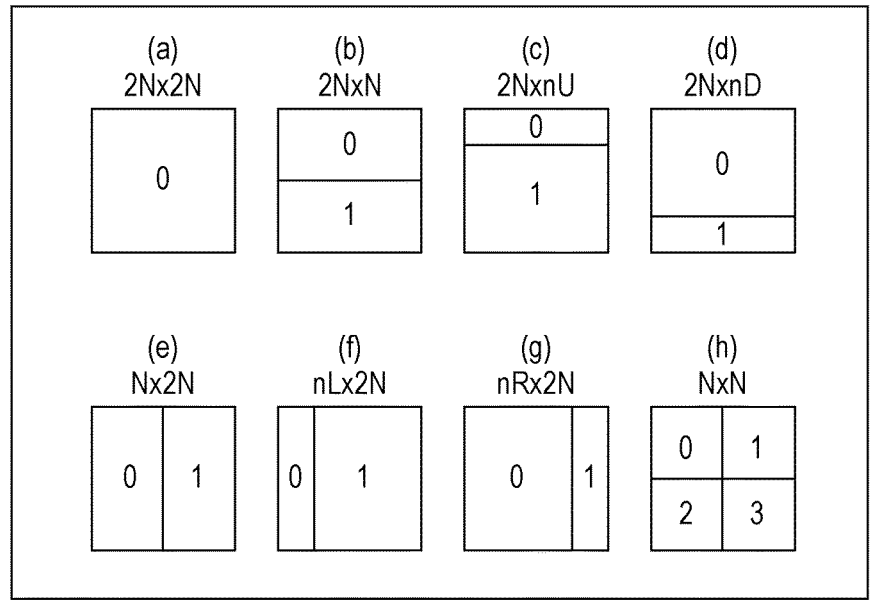

FIG. 4(a) illustrates the partition mode of 2N×2N in which partition of the CU is not executed. FIGS. 4(b) and 4(e) illustrate the shapes of partition in a case where the partition modes 2N×N and N×2N, respectively. FIG. 4(h) illustrates the shape of partition in a case where the partition mode is N×N.

FIGS. 4(c), 4(d), 4(f), and 4(g) illustrate the shapes of partition in cases of 2N×nU, 2N×nD, nL×2N, and nR×2N which are the asymmetric motion partitions (AMP), respectively.

FIGS. 4(a) to 4(h), numbers given in regions indicate identification numbers of the regions and a process is executed in the regions in the order of the identification numbers. That is, the identification numbers indicate a scanning order of the regions.

In the prediction block in the case of the inter-prediction, 7 types of partition modes except for N×N (see FIG. 4(h)) are defined among the 8 types of partition modes.

A specific value of N is defined in accordance with the size of the CU to which the PU belongs, and specific values of nU, nD, nL, and nR are decided according to the value of N. For example, a CU of 32×32 pixels can be partitioned into prediction blocks of the inter-prediction of 32×32 pixels, 32×16 pixels, 16×32 pixels, 32×16 pixels, 32×8 pixels, 32×24 pixels, 8×32 pixels, and 24×32 pixels.

In the transform tree, the coding unit is partitioned into one transform block or a plurality of transform blocks and the position and size of each transform block are defined. In other words, the transform block is a region included in the coding unit and one or plurality of regions which do not overlap with each other. The transform tree includes one transform block or a plurality of transform blocks obtained through the above-described partition.

As the partition of the transform tree, there is partition in which a region with the same size as the coding unit is allocated as the transform block and partition by recursive quadtree partition, as in the partition of the above-described tree block.

A transform process is executed for each transform block. Hereinafter, the transform block which is a unit of transform is referred to as a transform unit (TU).

(Prediction Parameter)

A predicted image of the prediction unit is derived by a prediction parameter subordinate to the prediction unit. As the prediction parameter, there is a prediction parameter of intra-prediction or a prediction parameter of inter-prediction. Hereinafter, the prediction parameter of inter-prediction (inter-prediction parameter) will be described. The inter-prediction parameter is configured to include prediction use flags predFlagL0 and predFlagL1, reference picture indexes refIdxL0 and refIdxL1, and vectors mvL0 and mvL1. The prediction use flags predFlagL0 and predFlagL1 are flags indicating whether to use reference picture lists respectively called an L0 list and an L1 list, and the reference picture list corresponding to the case of a value of 1 is used. In a case where "a flag indicating whether XX is indicated" is described in the present specification, 1 is set to a case where XX is indicated and 0 is set to a case where XX is not indicated. Then, 1 is treated to be true and 0 is treated to be false in logical NOT, logical AND, or the like (the same applies below). However, in actual devices or methods, other values can also be used as a true value and a false value. A case where two reference picture lists are used, that is, a case of (predFlagL0, predFlagL1)=(1, 1), corresponds to bi-prediction. A case where one reference picture list is used, that is, a case of (predFlagL0, predFlagL1)=(1, 0), or (predFlagL0, predFlagL1)=(0, 1), corresponds to uni-prediction. Information regarding the prediction use flag can also be expressed as an inter-prediction identifier inter_pred_idc to be described below. Normally, the prediction use flag is used in a predicted image generation section and a prediction parameter memory to be described below. In a case where information indicating which reference picture list is used or not is decoded from the coded data, the inter-prediction identifier inter_pred_idc is used.

Examples of syntax elements used to derive the inter-prediction parameter included in the coded data include a partition mode part_mode, a merge flag merge_flag, a merge index merge_idx, an inter-prediction identifier inter_pred_idc, a reference picture index refIdxLX, a prediction vector flag mvp_LX_flag, and a difference vector mvdLX. LX is a description method used in a case where L0 prediction and L1 prediction are not distinguished from each other. By substituting LX with L0 and L1, parameters for the L0 list and parameters for the L1 list are distinguished from each other (the same applies below). For example, refIdxL0 is a reference picture index used for L0 prediction and refIdxL1 is a reference picture index used for L1 prediction. Here, refIdx (refIdxLX) is notation used in a case where refIdxL0 and refIdxL1 are not distinguished from each other.

(Example of Reference Picture List)

Figure 5:
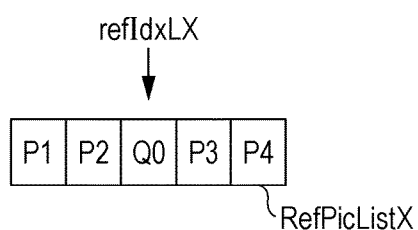
FIG. 5 is a conceptual diagram illustrating an example of a reference picture list.

Next, an example of the reference picture list will be described. The reference picture list is a line formed by reference pictures stored in a reference picture memory 306. FIG. 5 is a conceptual diagram illustrating an example of the reference picture list RefPicListX. In the reference picture list RefPicListX, 5 rectangles arranged horizontally in a line indicate reference pictures. Codes P1, P2, Q0, P3, and P4 shown in order from the left end to the right are codes indicating reference pictures. P such as P1 indicates a viewpoint P and Q such as Q0 indicates a different viewpoint Q from the viewpoint P. The suffixes of P and Q indicate picture order numbers POC. A downward arrow immediately below refIdxLX indicates that the reference picture index refIdxLX is an index referring to the reference picture Q0 in the reference picture memory 306.

(Example of Reference Picture)

Figure 6:
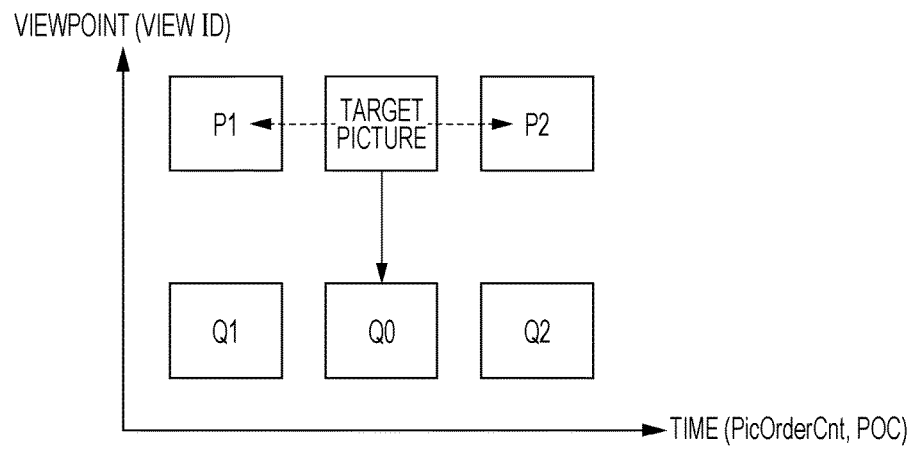
FIG. 6 is a conceptual diagram illustrating an example of a reference picture.

Next, an example of the reference picture used at the time of derivation of a vector will be described. FIG. 6 is a conceptual diagram illustrating an example of the reference picture. In FIG. 6, the horizontal axis represents a display time and the vertical axis represents a viewpoint. As illustrated in FIG. 6, rectangles of 2 vertical rows and 3 horizontal columns (a total of 6 rectangles) indicate pictures. Of the 6 rectangles, the second rectangle from the left in the low row indicates a picture of a decoding target (target picture). The remaining five rectangles indicate reference pictures. A reference picture Q0 indicated by an upward arrow from the target picture is a picture of which a display time is the same as the target picture and a viewpoint (view ID) is different from the target picture. In disparity prediction in which a target picture serves as a standard, the reference picture Q0 is used. A reference picture P1 indicated by a leftward arrow from the target picture is a past picture of which the viewpoint is the same as the target picture. A reference picture P2 indicated by a rightward arrow from the target picture is a future picture of which the viewpoint is the same as the target picture. In motion prediction in which a target picture serves as a criterion, the reference picture P1 or P2 is used.

(Inter-Prediction Identifier and Prediction Use Flag)

A relation between the inter-prediction identifier inter_pred_idc and the prediction use flags predFlagL0 and predFlagL1 can be mutually converted using formulae:

inter_pred_$idc$=(predFlag$L$1<<1)+predFlag$L$0;

predFlag$L$0=inter_pred_$idc$ & 1; and predFlag$L$1=inter_pred_$idc$>>1.

Here, >> is a right shift and << is a left shift. Therefore, as the inter-prediction parameter, the prediction use flags pred-FlagL0 and predFlagL1 may be used or the inter-prediction identifier inter_pred_idc may be used. Hereinafter, in determination in which the prediction use flags predFlagL0 and predFlagL1 are used, the flags can also be substituted with the inter-prediction identifier inter_pred_idc. In contrast, in determination in which the inter-prediction identifier inter_pred_idc is used, the flag can also be substituted with the prediction use flags predFlagL0 and predFlagL1.

(Merge Mode and AMVP Prediction)

In a method of decoding (coding) the prediction parameter, there are a merge mode and an adaptive motion vector prediction (AMVP) mode. The merge flag merge_flag is a flag used to identify these modes. In either the merge mode or the AMVP mode, a prediction parameter of a target PU is derived using the prediction parameter of the block which has already been processed. The merge mode is a mode in which the prediction use flag predFlagLX (the inter-prediction identifier inter_pred_idc), the reference picture index refIdxLX, and the vector mvLX are not included in coded data and is a mode in which the already derived prediction parameters are used without change. The AMVP mode is a mode in which the inter-prediction identifier inter_pred_idc, the reference picture index refIdxLX, and the vector mvLX are included in coded data. The vector mvLX is coded as a difference vector (mvdLX) and a prediction vector flag mvp_LX_flag indicating a prediction vector.

The inter-prediction identifier inter_pred_idc is data indicating the types and numbers of reference pictures and has a value of one of Pred_L0, Pred_L1, and Pred_BI. Pred_L0 and Pred_L1 each indicate that reference pictures stored in the reference picture lists referred to as the L0 list and the L1 list are used and both indicate that one reference picture is used (uni-prediction). The prediction using the L0 list and the L1 list are referred to as L0 prediction and L1 prediction, respectively. Pred_BI indicates that 2 reference pictures are used (bi-prediction) and indicates that 2 reference pictures stored in the L0 list and the L1 list are used. The prediction vector index mvp_LX_flag is an index indicating a prediction vector and the reference picture index refIdxLX is an index indicating the reference picture stored in the reference picture list. The merge index merge_idx is an index indicating that one prediction parameter among prediction parameter candidates (merge candidates) derived from the completely processed block is used as a prediction parameter of the prediction unit (target block).

(Motion Vector and Disparity Vector)

As the vector mvLX, there are a motion vector and a disparity vector (parallax vector). The motion vector is a vector that indicates a position deviation between the position of a block in a picture of a certain layer at a certain display time and the position of a corresponding block in the picture of the same layer at a different display time (for example, an adjacent discrete time). The disparity vector is a vector that indicates a position deviation between the position of a block in a picture of a certain layer at a certain display time and the position of a corresponding block in a picture of a different layer at the same display time. The picture of the different layer is a picture with a different viewpoint in some cases or is a picture with a different resolution in some cases. In particular, the disparity vector corresponding to the picture with the different viewpoint is referred to as a parallax vector. In the following description, in a case where the motion vector and the disparity vector are not distinguished from each other, the motion vector and the disparity vector are simply referred to as vectors mvLX. A prediction vector and a difference vector in regard to the vector mvLX are referred to as a prediction vector mvpLX and a difference vector mvdLX, respectively. Whether the vector mvLX and the difference vector mvdLX are the motion vectors or the disparity vectors is executed using the reference picture index refIdxLX subordinate to the vector.

(Configuration of Image Decoding Device)

Figure 7:
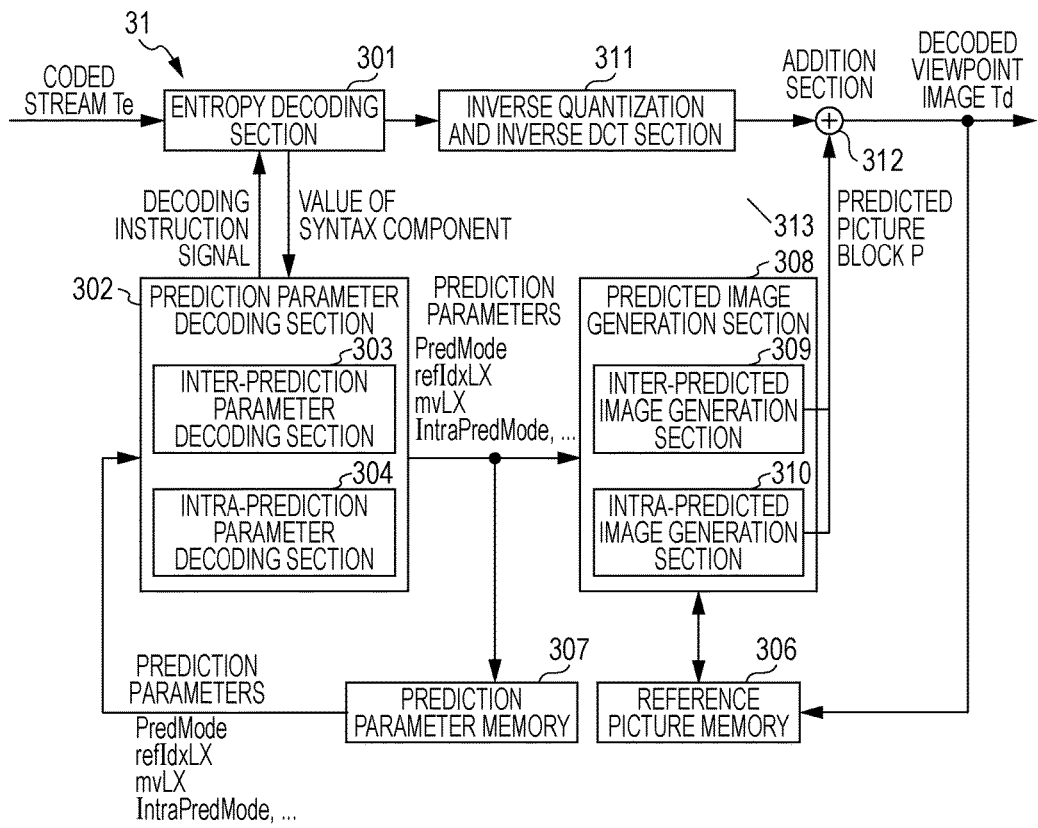
FIG. 7 is a schematic diagram illustrating the configuration of an image decoding device 31 according to the embodiment.

Next, the configuration of the image decoding device 31 according to the embodiment will be described. FIG. 7 is a schematic diagram illustrating the configuration of the image decoding device 31 according to the embodiment. The image decoding device 31 is configured to include an entropy decoding section 301, a prediction parameter decoding section 302, a reference picture memory (reference image storage section or a frame memory) 306, a prediction parameter memory (prediction parameter storage section or a frame memory) 307, a predicted image generation section 308, an inverse quantization and inverse DCT section 311, an addition section 312, and a depth DV derivation section 351 (not illustrated).

The prediction parameter decoding section 302 is configured to include an inter-prediction parameter decoding section 303 and an intra-prediction parameter decoding section 304. The predicted image generation section 308 is configured to include an inter-predicted image generation section 309 and an intra-predicted image generation section 310.

The entropy decoding section 301 executes entropy decoding on the coded stream Te input from the outside, and separates and decodes individual codes (syntax elements). As the separated code, there are, for example, prediction information used to generate a predicted image and residual information used to generate a difference image.

The entropy decoding section 301 outputs some of the separated codes to the prediction parameter decoding section 302. Some of the separated codes are, for example, a prediction mode PredMode, the partition mode part_mode, the merge flag merge_flag, the merge index merge_idx, the inter-prediction identifier inter_pred_idc, the reference picture index refIdxLX, the prediction vector flag mvp_LX_flag, the difference vector mvdLX, the residual prediction index iv_res_pred_weight_idx, and the illumination compensation flag ic_flag. Which codes are decoded is controlled based on an instruction of the prediction parameter decoding section 302. The entropy decoding section 301 outputs a quantization coefficient to the inverse quantization and inverse DCT section 311. The quantization coefficient is a coefficient which is quantized and obtained by executing discrete cosine transform (DCT) on a residual signal in a coding process. The entropy decoding section 301 outputs a depth DV conversion table DepthToDisparityB to the depth DV derivation section 351. The depth DV conversion table DepthToDisparityB is a table for converting the pixel value of a depth image into a parallax indicating disparity between viewpoint images, and the component DepthToDisparityB[d] of the depth DV conversion table DepthToDisparityB can be obtained using a slope cp_scale, an offset cp_off, and slope precision cp_precision by the following formula:

log 2 Div=BitDepth$Y$−1+$cp$_precision;

offset=($cp$_off<<BitDepth$Y$)+((1<<log 2 Div)>>1);

scale=$cp$_scale; and

DepthToDisparity$B$[$d$]=(scale*$d$+offset)>>log 2 Div.

The parameters cp_scale, cp_off, and cp_precision are decoded from a parameter set in the coded data at each preferred viewpoint. BitDepthY indicates a bit depth of a pixel value corresponding to a luminance signal and has, for example, 8 as a value.

The prediction parameter decoding section 302 receives some of the codes as inputs from the entropy decoding section 301. The prediction parameter decoding section 302 decodes the prediction parameters corresponding to the prediction mode indicated by the prediction mode PredMode which is a part of the codes. The prediction parameter decoding section 302 outputs the prediction mode PredMode and the decoded prediction parameters to the prediction parameter memory 307 and the predicted image generation section 308.

The inter-prediction parameter decoding section 303 decodes an inter-prediction parameter with reference to the prediction parameters stored in the prediction parameter memory 307 based on the codes input from the entropy decoding section 301. The inter-prediction parameter decoding section 303 outputs the decoded inter-prediction parameters to the predicted image generation section 308 and stores the decoded inter-prediction parameters in the prediction parameter memory 307. The details of the inter-prediction parameter decoding section 303 will be described below.

The intra-prediction parameter decoding section 304 decodes the intra-prediction parameter with reference to the prediction parameter stored in the prediction parameter memory 307 based on the codes input from the entropy decoding section 301. The intra-prediction parameter refers to a parameter used for a process of predicting a picture block in one picture and is, for example, an intra-prediction mode intraPredMode. The intra-prediction parameter decoding section 304 outputs the decoded intra-prediction parameter to the predicted image generation section 308 and stores the decoded intra-prediction parameter in the prediction parameter memory 307.

The reference picture memory 306 stores a decoded picture block recSamples generated by the addition section 312 at the position of the decoded picture block.

The prediction parameter memory 307 stores the prediction parameter at a position decided in advance for each decoding target picture and block. Specifically, the prediction parameter memory 307 stores the inter-prediction parameter decoded by the inter-prediction parameter decoding section 303, the intra-prediction parameter decoded by the intra-prediction parameter decoding section 304, and the prediction mode PredMode separated by the entropy decoding section 301. As the stored inter-prediction parameter, for example, there are the prediction use flag predFlagLX, the reference picture index refIdxLX, and the vector mvLX.

The prediction mode PredMode and the prediction parameter are input from the prediction parameter decoding section 302 to the predicted image generation section 308. The predicted image generation section 308 reads the reference picture from the reference picture memory 306. The predicted image generation section 308 generates a predicted picture block predSamples (predicted image) using the input prediction parameters and the read reference picture in the prediction mode indicated by the prediction mode PredMode.

Here, in a case where the prediction mode PredMode indicates an inter-prediction mode, the inter-predicted image generation section 309 generates the predicted picture block predSamples through the inter-prediction using the inter-prediction parameter input from the inter-prediction parameter decoding section 303 and the read reference picture. The predicted picture block predSamples corresponds to the prediction unit PU. The PU corresponds to a part of a picture which is formed by a plurality of pixels and is a unit in which the prediction process is executed, as described above, that is, a decoding target block subjected to a prediction process once.

The inter-predicted image generation section 309 reads, from the reference picture memory 306, the reference picture block located at the position indicated by the vector mvLX using the prediction unit as a standard from the reference picture RefPicListLX[refIdxLX] indicated by the reference picture index refIdxLX in regard to the reference picture list RefPicListLX in which the prediction use flag predFlagLX is 1. The inter-predicted image generation section 309 executes motion compensation on the read reference picture block to generate a predicted picture block predSamplesLX. The inter-predicted image generation section 309 generates the predicted picture block predSamples from predicted picture blocks predSamplesL0 and predSamplesL1 derived further from the reference picture of each reference picture list and outputs the predicted picture block predSamples to the addition section 312.

In a case where the prediction mode predMode indicates the intra-prediction mode, the intra-predicted image generation section 310 executes the intra-prediction using the intra-prediction parameter input from the intra-prediction parameter decoding section 304 and the read reference picture. Specifically, the intra-predicted image generation section 310 reads, from the reference picture memory 306, the reference picture block which is the decoding target picture and is within a pre-decided range from the prediction unit among the already processed blocks. The pre-decided range is, for example, a range of the left, top left, top, and top right of adjacent blocks and is different according to the intra-prediction mode.

The intra-predicted image generation section 310 executes the prediction on the read reference picture block in the prediction mode indicated by the intra-prediction mode IntraPredMode to generate the predicted picture block predSamples, and then outputs the generated predicted picture block predSamples to the addition section 312.

The inverse quantization and inverse DCT section 311 executes inverse quantization on the quantization coefficient input from the entropy decoding section 301 to obtain a DCT coefficient. The inverse quantization and inverse DCT section 311 executes inverse discrete cosine transform (DCT) on the obtained DCT coefficient to calculate a decoded residual signal. The inverse quantization and inverse DCT section 311 outputs the calculated decoded residual signal to the addition section 312.

The addition section 312 adds the predicted picture blocks predSamples input from the inter-predicted image generation section 309 and the intra-predicted image generation section 310 and the signal value resSamples of the decoded residual signal input from the inverse quantization and inverse DCT section 311 for each pixel to generate decoded picture blocks recSamples. The addition section 312 outputs the generated decoded picture blocks recSamples to the reference picture memory 306. The decoded picture blocks are integrated for each picture. Loop filters such as a deblock filter and an adaptive offset filter are applied to the decoded picture. The decoded picture is output as the decoded layer image Td to the outside.

(Configuration of Inter-Prediction Parameter Decoding Section)

Figure 8:
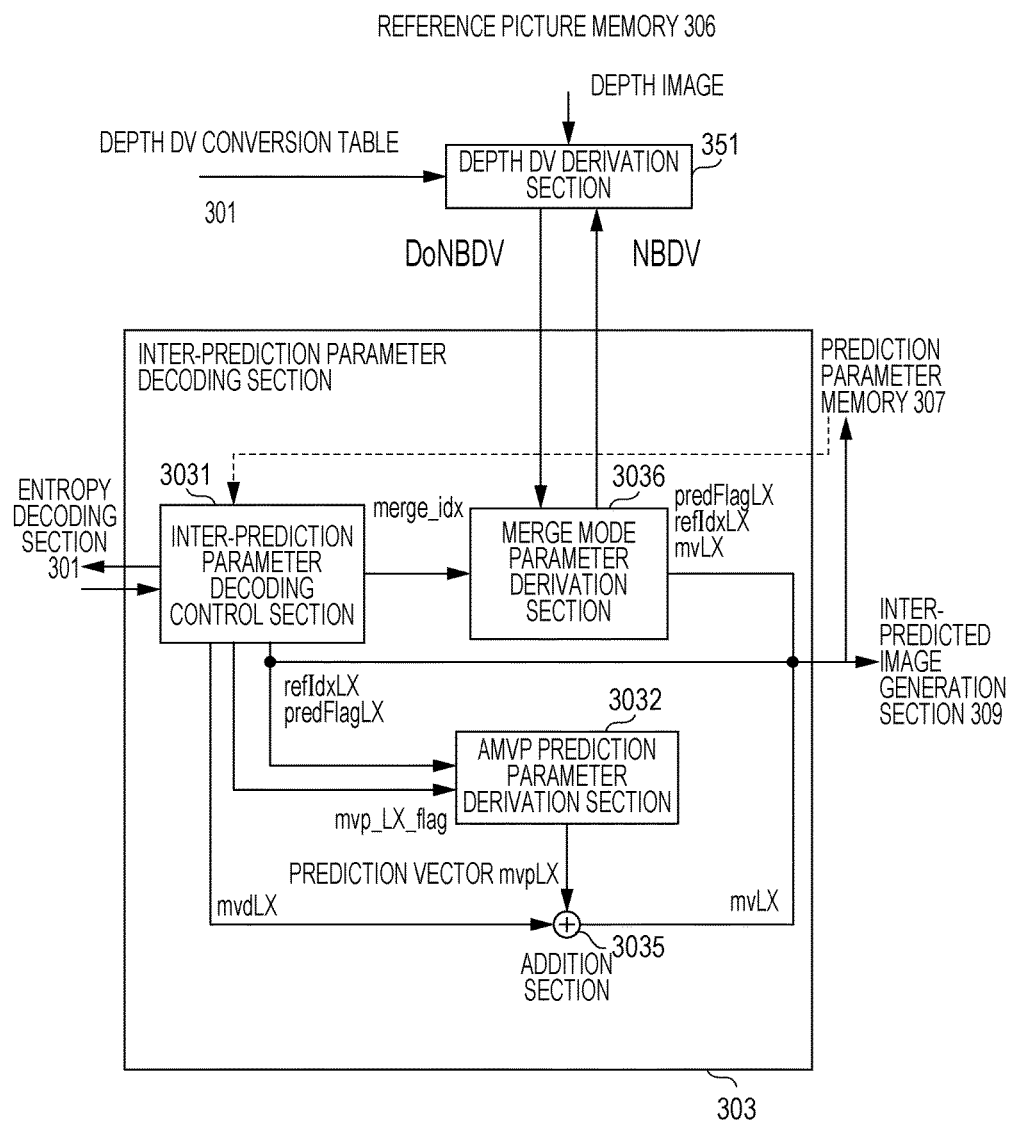
FIG. 8 is a schematic diagram illustrating the configuration of an inter-prediction parameter decoding section 303 according to the embodiment.

Next, the configuration of the inter-prediction parameter decoding section 303 will be described. FIG. 8 is a schematic diagram illustrating the configuration of the inter-prediction parameter decoding section 303 according to the embodiment. The inter-prediction parameter decoding section 303 is configured to include an inter-prediction parameter decoding control section 3031, an AMVP prediction parameter derivation section 3032, an addition section 3035, a merge mode parameter derivation section 3036, and a disparity derivation section 30363.

The inter-prediction parameter decoding control section 3031 instructs the entropy decoding section 301 to decode the codes (syntax elements related to the inter-prediction and extracts codes (syntax elements)) included in the coded data, for example, the partition mode part_mode, the merge flag merge_flag, the merge index merge_idx, the inter-prediction identifier inter_pred_idc, the reference picture index refIdxLX, the prediction vector flag mvp_LX_flag, the difference vector mvdLX, the residual prediction index iv_res_pred_weight_idx, the illumination compensation flag ic_flag, and a DBBP flag dbbp_flag. In a case where the inter-prediction parameter decoding control section 3031 expresses the extraction of certain syntax elements, it is meant that the inter-prediction parameter decoding control section 3031 instructs the entropy decoding section 301 to decode the certain syntax elements and reads the corresponding syntax elements from the coded data.

In a case where the merge flag merge_flag is 1, that is, the prediction unit is in the merge mode, the inter-prediction parameter decoding control section 3031 extracts, for example, the merge index merge_idx from the coded data. The inter-prediction parameter decoding control section 3031 outputs the extracted residual prediction index iv_res_pred_weight_idx, the illumination compensation flag ic_flag, and the merge index merge_idx to the merge mode parameter derivation section 3036.

In a case where the merge flag merge_flag is 0, that is, the prediction block is in the AMVP prediction mode, the inter-prediction parameter decoding control section 3031 extracts the inter-prediction identifier inter_pred_idc, the reference picture index refIdxLX, the prediction vector flag mvp_LX_flag, and the difference vector mvdLX from the coded data using the entropy decoding section 301. The inter-prediction parameter decoding control section 3031 outputs the prediction use flag predFlagLX and the reference picture index refIdxLX derived from the extracted inter-prediction identifier inter_pred_idc to the AMVP prediction parameter derivation section 3032 and the predicted image generation section 308 and stores the prediction use flag predFlagLX and the reference picture index refIdxLX in the prediction parameter memory 307. The inter-prediction parameter decoding control section 3031 outputs the extracted prediction vector flag mvp_LX_flag to the AMVP prediction parameter derivation section 3032 and outputs the extracted difference vector mvdLX to the addition section 3035.

In a case where the partition mode PartMode is a specific value, the inter-prediction parameter decoding control section 3031 decodes the DBBP flag dbbp_flag from the coded data. In other cases, that is, in a case where dbbp_flag is not included in the coded data, 0 is estimated as dbbp_flag. FIG. 20 is a syntax table illustrating the DBBP flag dbbp_flag according to the embodiment. The inter-prediction parameter decoding control section 3031 decodes cu_skip_flag, pred_mode, part_mode, and dbbp_flag indicated in SE 1001 to SE 1004 of the drawing. Here, cu_skip_flag is a flag indicating whether a target CU is skipped. In a case where target CU is skipped, PartMode is limited to 2N×2N and decoding of the partition mode part_mode is omitted. The partition mode part_mode decoded from the coded data is set in the partition mode PredMode. In a case where the partition mode PartMode (=part_mode) is 2N×N in this example, the inter-prediction parameter decoding control section 3031 decodes dbbp_flag. In a case where the partition mode is other values, the inter-prediction parameter decoding control section 3031 may decode dbbp_flag. The DBBP dbbp_flag may be derived according to a different method from the foregoing method.

The inter-prediction parameter decoding control section 3031 outputs a disparity vector (NBDV) derived at the time of derivation of the inter-prediction parameter and a VSP mode flag VspModeFlag which is a flag indicating whether to execute viewpoint synthesis prediction to the inter-predicted image generation section 309.

Figure 9:
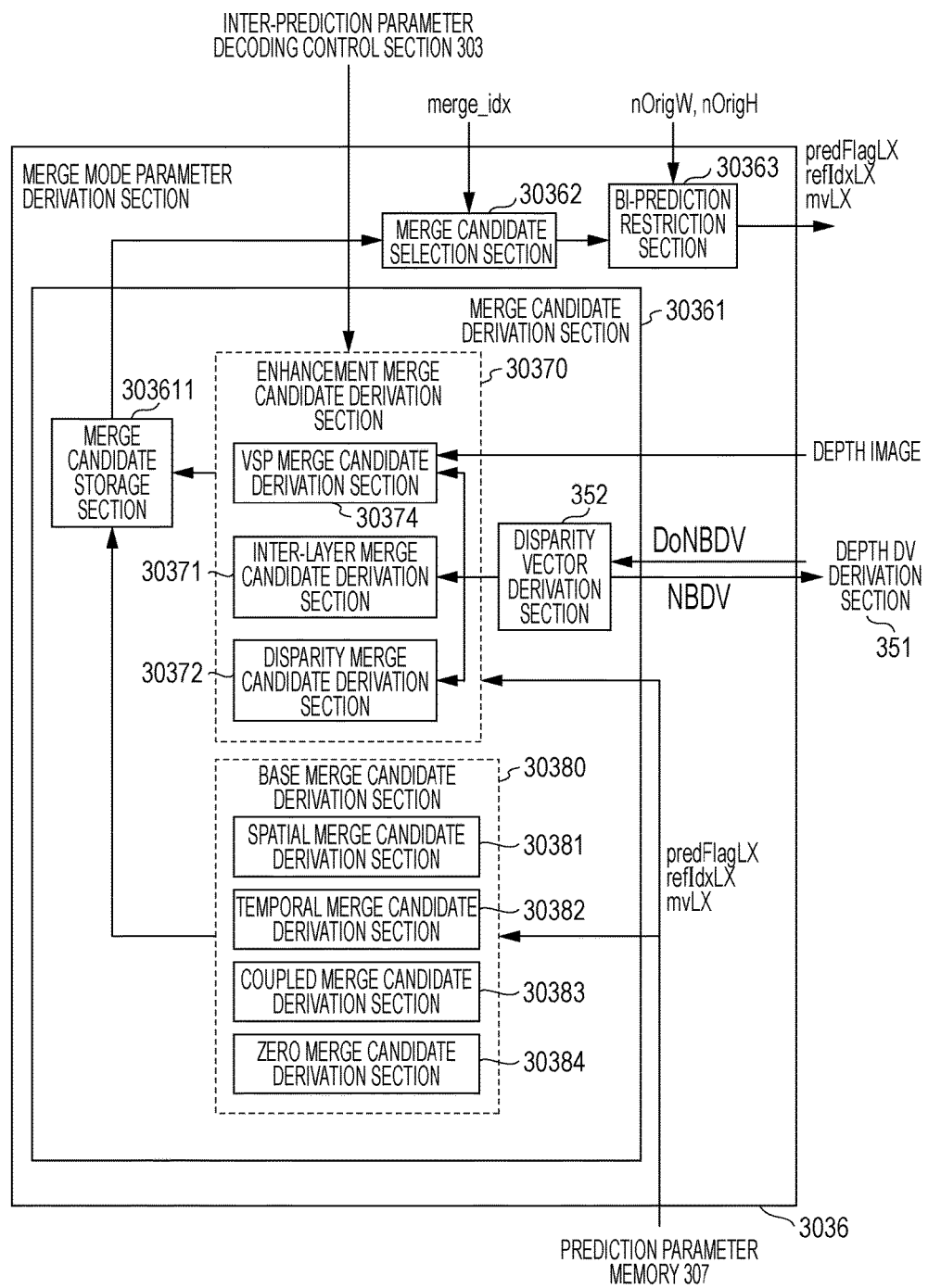
FIG. 9 is a schematic diagram illustrating the configuration of a merge mode parameter derivation section 3036 according to the embodiment.

FIG. 9 is a schematic diagram illustrating the configuration of the merge mode parameter derivation section 3036 according to the embodiment. The merge mode parameter derivation section 3036 includes a merge candidate derivation section 30361, a merge candidate selection section 30362, and a bi-prediction restriction section 30363. The merge candidate derivation section 30361 is configured to include a merge candidate storage section 303611, an enhancement merge candidate derivation section 30370, and a base merge candidate derivation section 30380.

The merge candidate storage section 303611 stores merge candidates input from the enhancement merge candidate derivation section 30370 and the base merge candidate derivation section 30380 in the merge candidate list mergeCandList. The merge candidates are configured to include the prediction use flag predFlagLX, the vector mvLX, the reference picture index refIdxLX, the VSP mode flag VspModeFlag, a disparity vector MvDisp, and a layer IDRefViewIdx. In the merge candidate storage section 303611, indexes can be allocated to the merge candidates stored in a merge candidate list mergeCandList according to a predetermined rule.

FIG. 11 is a diagram illustrating an example of the merge candidate list mergeCandList derived by the merge candidate derivation section 30361. FIG. 11($a$) illustrates the merge candidates derived by the merge candidate storage section 303611 in the base layer (a layer IDnal_unit_layer=0). In a case where two merge candidates are the same prediction parameter, a merge index order is an order of a spatial merge candidate (A1), a spatial merge candidate (B1), a spatial merge candidate (B0), a spatial merge candidate (A0), and a spatial merge candidate (B2), excluding a process (pruning process) of filling a sequence. Nicknames of the merge candidates are notated in parentheses and the parentheses correspond to the positions of the reference blocks used for the derivation in the case of the spatial merge candidates. After the merge candidates, coupled merge candidates and zero merge candidates are present, but are omitted in FIG. 11. Such merge candidates, that is, the spatial merge candidates, the temporal merge candidates, the coupled merge candidates, and the zero merge candidates are derived by the base merge candidate derivation section 30380. FIG. 11($b$) illustrates merge candidates derived by the merge candidate storage section 303611 in an enhancement layer (layer IDnal_unit_layer!=0) which is a layer other than the base layer. A merge index order is an order of a texture merge candidate (T), an interview merge candidate (IvMC), a spatial merge candidate (A1), a spatial merge candidate (B1), a spatial merge candidate (B0), a disparity merge candidate (IvDC), a VSP merge candidate (VSP), the spatial merge candidate (A0), a spatial merge candidate (B2), a motion shift merge candidate (IvMCShift), a disparity shift merge candidate (IvDCShift), and the time merge candidate (Col). Nicknames of the merge candidates are notated in parentheses. After the merge candidates, coupled merge candidates and zero merge candidates are present, but are omitted in FIG. 11. The texture merge candidate (T), the interview merge candidate (IvMC), the disparity merge candidate (IvDC), the VSP merge candidate (VSP), the motion shift merge candidate (IvMCShift), and the disparity shift merge candidate (IvDCShift) are derived by the enhancement merge candidate derivation section 30370.

Figure 12:
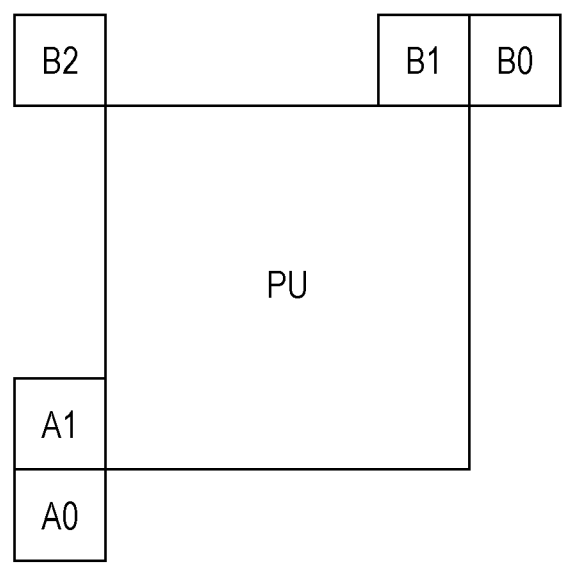
FIG. 12 is a diagram illustrating the positions of adjacent blocks to which spatial merge candidates refer.

FIG. 12 is a diagram illustrating the positions of adjacent blocks to which spatial merge candidates refer. A0, A1, B0, B1, and B2 correspond to positions illustrated in FIG. 12, respectively, and the coordinates thereof are as follows. In a case where the top left coordinates of the prediction unit are xPb and yPb and the width and height of the prediction unit are nPbW and nPbH, the positions of the adjacent blocks are as follows.

$(xPb-1, yPb+nPbH)$;   A0:

$(xPb-1, yPb+nPbH-1)$;   A1:

$(xPb+nPbW, yPb-1)$;   B0:

$(xPb+nPbW-1, yPb-1)$; and   B1:

$(xPb-1, yPb-1)$.   B2:

The enhancement merge candidate derivation section 30370 is configured to include an inter-layer merge candidate derivation section 30371 (interview merge candidate derivation section 30371), a disparity merge candidate derivation section 30373, and a VSP merge candidate derivation section 30374 (VSP prediction section 30374). The enhancement merge candidates are different merge candidates from base merge candidates to be described below and include at least one of the texture merge candidate (T), the interview merge candidate (IvMC), the disparity merge candidate (IvDC), the VSP merge candidate (VSP), the motion shift merge candidate (IvMCShift), and the disparity shift merge candidate (IvDCShift).

(Texture Merge Candidate)

The inter-layer merge candidate derivation section 30371 derives the texture merge candidate (T), the interview merge candidate (IvMC), and the motion shift merge candidate (IvMCShift). These merge candidates are derived by selecting a block corresponding to the prediction unit from the reference picture of another layer (for example, the base layer or a base view) having the same POC as the target picture and reading the prediction parameter which is a motion vector included in the block from the prediction parameter memory 307.

The texture merge candidate (T) is derived in the inter-layer merge candidate derivation section 30371 in a case where the target picture is a depth. The texture merge candidate (T) is derived by specifying the reference block from a depth picture having the same view ID as the target picture and reading a motion vector of the reference block. The coordinates (xRef, yRef) of the reference block is derived from the following formulae in a case where the top left coordinates of the prediction unit are xPb and yPb and the width and height of the prediction unit are nPbW and nPbH.

$x\text{RefFull}=xPb+((nPbW-1)>>1)$;

$y\text{RefFull}=yPb+((nPbH-1)>>1)$;

$x\text{Ref}=\text{Clip3}(0, \text{PicWidthInSamples}L-1, (x\text{RefFull}>>3)<<3)$; and $y\text{Ref}=\text{Clip3}(0,\text{PicHeightInSamples}L-1,(y\text{RefFull}>>3)<<3).$ PicWidthInSamplesL and PicHeightInSamplesL indicate the width and height of an image, respectively, and the function Clip3 (x, y, z) is a function that restricts (clips) z to x or more and y or less and returns a restricted result.

When a motion vector of the reference block is textMvLX, a motion vector mvLXT of the texture merge candidate is derived by the following formulae.

$mvLXT[0]=(\text{text}MvLX[x\text{Ref}][y\text{Ref}][0]+2)>>2;$ and $mvLXT[1]=(\text{text}MvLX[x\text{Ref}][y\text{Ref}][1]+2)>>2.$ For the texture merge candidates, the prediction parameters may be allocated in sub-block units obtained by further partitioning the prediction unit.

(Interview Merge Candidate)

The interview merge candidate has the same POC as the target picture specified by the disparity vector derivation section 352 to be described below and is derived in the inter-layer merge candidate derivation section 30371 by reading the prediction parameter such as a motion vector from the reference block of the reference picture ivRefPic having a different view ID (refViewIdx). This process is referred to as a temporal interview motion candidate derivation process. As the temporal interview motion candidate derivation process, the inter-layer merge candidate derivation section 30371 first derives reference coordinates (xRef, yRef) from the following formulae in a case where the top left coordinates of a block are (xPb, yPb), the width and height of the block are nPbW and nPbH, and a disparity vector derived from the disparity vector derivation section 352 is (mvDisp[0], mvDisp[1]).

$x\text{RefFull}=x\text{Pb}+(n\text{Pb}W>>1)+((mv\text{Disp}[0]+2)>>2);$ $y\text{RefFull}=y\text{Pb}+(n\text{Pb}H>>1)+((mv\text{Disp}[1]+2)>>2);$ $x\text{Ref}=\text{Clip3}(0,\text{PicWidthInSamples}L-1,(x\text{RefFull}>>3)<<3);$ and $y\text{Ref}=\text{Clip3}(0,\text{PicHeightInSamples}L-1,(y\text{RefFull}>>3)<<3).$ Next, in the inter-layer merge candidate derivation section 30371, a temporal interview motion candidate derivation process is executed in a temporal interview motion candidate derivation section 303711 (not illustrated).

The temporal interview motion candidate derivation section 303711 derives a reference block position (xRef, yRef) from the coordinates (xPb, yPb) of the block, the width nPbW and nPbH of the block, and the disparity vector mvDisp of the block through the foregoing process and further derives a vector of a temporal interview motion candidate with reference to the vector of a prediction unit on the reference picture ivRefPic located at the reference block position (xRef, yRef). First, the top left coordinates of a prediction unit (luminance prediction block) on the reference picture ivRefPic including the coordinates indicated at the reference block position (xRef, yRef) are assumed to be (xIvRefPb, yIvRefPb). A reference picture list, a prediction list flag, a vector, and a reference picture index included in the prediction unit on the reference picture ivRefPic are assumed to be refPicListLYIvRef, predFlagLYIvRef[x][y], mvLYIvRef[x][y], and refIdxLYIvRef[x][y], respectively.

In a case where the prediction use flag predFlagLYIvRef[xIvRefPb][yIvRefPb] is 1, the temporal interview motion candidate derivation section 303711 determines whether PicOrderCnt (refPicListLYIvRef[refIdxLYIvRef[xIvRefPb][yIvRefPb]]) which is POC of the prediction unit on the reference picture ivRefPic is the same as PicOrderCnt (RefPicListLX[i]) which is POC of the reference picture of a target prediction unit in an index i of the number of reference picture list components−1 (num_ref_idx_IX_active_minus 1) from 0. In a case where PicOrderCnt (refPicListLYIvRef[refIdxLYIvRef[xIvRefPb][yIvRefPb]]) is the same as PicOrderCnt (RefPicListLX[i]), a predictable flag availableFlagLXInterView (that is, a case where mvLYIvRef[xIvRefPb][yIvRefPb] is a disparity vector), a vector mvLXInterView, and a reference picture index refIdxLX are derived by the following formulae.

availableFlag$LX$InterView=1;

$mvLX\text{InterView}=mvLYIv\text{Ref}[xIv\text{Ref}Pb][yIv\text{Ref}Pb];$ and ref$IdxLX=i.$ That is, in a case where the reference picture referred to by the target prediction unit is the same as the reference picture referred to by the prediction unit on the reference picture ivRefPic, the temporal interview motion candidate derivation section 303711 derives the vector mvLXInterveiw and the reference picture index refIdxLX using the prediction parameters of the prediction unit on the reference picture ivRefPic.

For the interview merge candidates, the prediction parameters may be allocated in sub-block units obtained by further partitioning the prediction unit. For example, in a case where the width and height of the prediction unit are nPbW and nPbH and the minimum size of a sub-block is SubPbSize, a width nSbW and a height nSbH of the sub-block are derived by the following formulae.

$nSbW=nPbW/\text{Sub}Pb\text{Size}<=1?nPbW:\text{Sub}Pb\text{Size}n;$ and $nSbH=nPbH/\text{Sub}Pb\text{Size}<=1?nPbH:\text{Sub}Pb\text{Size}.$ Subsequently, the above-described temporal interview motion candidate derivation section 303711 derives a vector spMvLX[xBlk][yBlk], a reference picture index spRefIdxLX[xBlk][yBlk], and a prediction use flag spPredFlagLX[xBlk][yBlk] for each sub-block.

Here, (xBlk, yBlk) are relative coordinates (coordinates when the top left coordinates of the prediction unit are a standard) of the sub-block in the prediction unit and has integer values of (nPbW/nSbW−1) from 0 and (nPbH/nSbH−1) from 0, respectively. When the coordinates of the prediction unit are (xPb, yPb) and the relative coordinates of the sub-block in the prediction unit are (xBlk, yBlk), the coordinates of the sub-block in the picture are expressed as (xPb+xBlk*nSbW, yPb+yBlk*nSbH).

The temporal interview motion candidate derivation process is executed in the sub-block units using the coordinates (xPb+xBlk*nSbW, yPb+yBlk*nSbH) of the sub-block in the picture and the width nSbW and the height nSbH of the sub-block as inputs (xPb, yPb), nPbW, and nPbH of the temporal interview motion candidate derivation section 303711.

The temporal interview motion candidate derivation section 303711 derives the vector spMvLX, the reference picture index spRefIdxLX, and the prediction use flag spPredFlagLX corresponding to the sub-block by the following formulae from the vector mvLXInterView, the reference picture index refIdxLXInterView, and the prediction use flag availableFlagLXInterView of the interview merge candidate in the sub-block in which the predictable flag availableFlagLXInterView is 0.

spMvLX[xBlk][yBlk]=mvLXInterView;

spRefIdxLX[xBlk][yBlk]=refIdxLXInterView; and spPredFlagLX[xBlk][yBlk]=availableFlagLXInterView.

Here, xBlk and yBlk are a sub-block address and has values of (nPbW/nSbW−1) from 0 and (nPbH/nSbH−1) from 0, respectively. The vector mvLXInterView, the reference picture index refIdxLXInterView, and the prediction use flag availableFlagLXInterView of the interview merge candidate are derived by executing the temporal interview motion candidate derivation process using (xPb+(nPbW/nSbW/2)*nSbW, yPb+(nPbH/nSbH/2)*nSbH) as reference block coordinates.

(Motion Shift Merge Candidate)

The motion shift merge candidate has the same POC as the target picture specified by the disparity vector derivation section 352 and is derived in the inter-layer merge candidate derivation section 30371 by reading the prediction parameter such as a motion vector from the reference block of the picture having a different view ID. The coordinates (xRef, yRef) of the reference block are derived from the following formulae in a case where the top left coordinates are (xPb, yPb) of the prediction unit, the width and height of the prediction unit are nPbW and nPbH, and the disparity vector derived from the disparity vector derivation section 352 is (mvDisp[0], mvDisp[1]).

xRefFull=xPb+(nPbW>>1)+((mvDisp[0]+nPbW*2+4+2)−2);

yRefFull=yPb+(nPbH>>1)+((mvDisp[1]+nPbH*2+4+2)>>2);

xRef=Clip3(0,PicWidthInSamplesL−1,(xRefFull>>3)<<3); and yRef=Clip3(0,PicHeightInSamplesL−1,(yRefFull>>3)<<3).

(Disparity Merge Candidate)

The disparity merge candidate derivation section 30373 derives the disparity merge candidate (IvDC) and the shift disparity merge candidate (IvDCShift) from the disparity vector input from the disparity vector derivation section 352. The disparity merge candidate derivation section 30373 generates a vector which has a vertical component of 0 and the horizontal component mvDisp[0] of the disparity vector (mvDisp[0], mvDisp[1]) of which the horizontal component is input, as the disparity merge candidate (IvDC), by the following formulae.

mvL0IvDC[0]=DepthFlag?(mvDisp[0]+2)>>2:mvDisp[0]; and mvL0IvDC[1]=0.

Here, DepthFlag is a variable which is 1 in the case of a depth.

The disparity merge candidate derivation section 30373 outputs the generated vector and the reference picture index refIdxLX (for example, the index of the base layer image having the same POC as a decoding target picture) of a previous layer image indicated by the disparity vector as merge candidates to the merge candidate storage section 303611.

The disparity merge candidate derivation section 30373 derives a merge candidate having a vector obtained by shifting the disparity merge candidate in the horizontal direction as the shift disparity merge candidate (IvDC) by the following formula.

mvLXIvDCShift[0]=mvL0IvDC[0]+4; and mvLXIvDCShift[1]=mvL0IvDC[1].

(VSP Merge Candidate)

The VSP merge candidate derivation section 30374 (hereinafter referred to as the VSP prediction section 30374) derives a view synthesis prediction (VSP) merge candidate. The VSP prediction section 30374 partitions the prediction unit into a plurality of sub-blocks (sub-prediction units) and sets the vector mvLX, the reference picture index refIdxLX, and the view IDRefViewIdx in the partition sub-block units. The VSP prediction section 30374 outputs the derived VSP merge candidate to the merge candidate storage section 303611.

Figure 14:
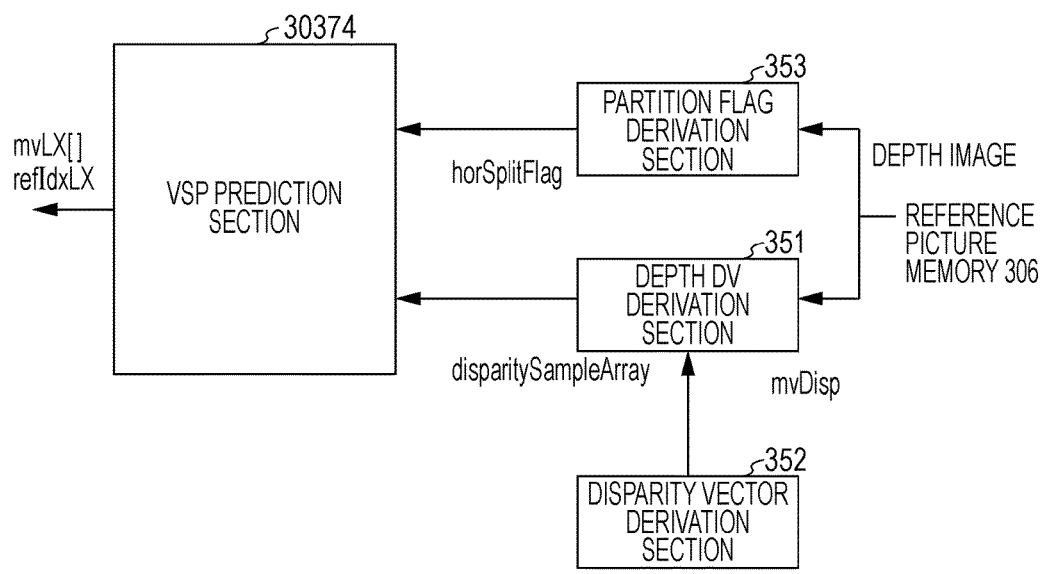
FIG. 14 is a diagram illustrating the configuration of a VSP merge candidate derivation section 30374 (VSP prediction section 30374) according to the embodiment.

FIG. 14 is a block diagram illustrating a relation between the VSP prediction section 30374 and other means. The VSP prediction section 30374 operates using a splitting flag horSplitFlag derived by a splitting flag derivation section 353 and a disparity vector derived by the depth DV derivation section 351.

A partition splitting section (not illustrated) of the VSP prediction section 30374 decides a sub-block size by selecting one of a horizontally long rectangle (here, 8×4) and a vertically long rectangle (here, 4×8) according to the splitting flag horSplitFlag derived by the splitting flag derivation section 353. Specifically, a width nSubBlkW and a height nSubBlkH of the sub-block are set using the following formulae.

nSubBlkW=horSplitFlag?8:4; and nSubBlkH=horSplitFlag?4:8.

A depth vector derivation section (not illustrated) of the VSP prediction section 30374 derives a vector mvLX[ ] using a motion vector disparitySampleArray[ ] derived from the depth DV derivation section 351 as a motion vector mvLX[0] of a horizontal component and using 0 as a motion vector mvLX[1] of a vertical component of each sub-block with the derived sub-block size, and derives a prediction parameter of the VSP merge candidate.

The VSP prediction section 30374 may control whether to add the VSP merge candidate to the merge candidate list mergeCandList according to the residual prediction index iv_res_pred_weight_idx and the illumination compensation flag is flag input from the inter-prediction parameter decoding control section 3031. Specifically, the VSP prediction section 30374 may add the VSP merge candidate to the component of the merge candidate list mergeCandList only in a case where the residual prediction index iv_res_pred_weight_idx is 0 and the illumination compensation flag ic_flag is 0.

The base merge candidate derivation section 30380 is configured to include a spatial merge candidate derivation section 30381, a temporal merge candidate derivation section 30382, a coupled merge candidate derivation section 30383, and a zero merge candidate derivation section 30384. The base merge candidate is a merge candidate used in the base layer, that is, a merge candidate used for not scalable but HEVC (for example, an HEVC main profile), and includes at least one of the spatial merge candidate and the temporal merge candidate.

The spatial merge candidate derivation section 30381 reads the prediction parameters (the prediction use flag predFlagLX, the vector mvLX, and the reference picture index refIdxLX) stored by the prediction parameter memory 307 according to a predetermined rule and derives the read prediction parameters as spatial merge candidates. The read prediction parameters are prediction parameters related to adjacent blocks which are blocks within a pre-decided range from the prediction unit (for example, some or all of the blocks adjacent to the bottom left end, the top left end, the top right end of the prediction unit). The derived spatial merge candidates are stored in the merge candidate storage section 303611.

The spatial merge candidate derivation section 30381 sets a VSP mode flag mergeCandIsVspFlag of a merge candidate derived in succession of the VSP mode flag VspModeFlag of the adjacent block. That is, in a case where the VSP mode flag VspModeFlag of the adjacent block is 1, the VSP mode flag mergeCandIsVspFlag of the corresponding spatial merge candidate is set to 1. In other cases, the VSP mode flag mergeCandIsVspFlag is set to 0.

Hereinafter, the VSP mode flag VspModeFlag is set to 0 in the merge candidates derived by the temporal merge candidate derivation section 30382, the coupled merge candidate derivation section 30383, and the zero merge candidate derivation section 30384.

The temporal merge candidate derivation section 30382 reads the prediction parameters of a block in a reference image including the bottom right coordinates of the prediction unit from the prediction parameter memory 307 and sets the prediction parameters as merge candidates. As a method of designating the reference image, the merge candidate storage section 303611 stores merge candidates which may be derived when a collocated picture col_ref_idx designated by a slice header and the reference picture index refIdxLX designated with RefPicListX[col_ref_idx] designated from the reference picture list RefPicListX are used.

The coupled merge candidate derivation section 30383 derives coupled merge candidates by combining the reference picture index and the vector of two different derived merge candidates already derived and stored in the merge candidate storage section 303611 as vectors of L0 and L1. The derived merge candidates are stored in the merge candidate storage section 303611.

The zero merge candidate derivation section 30384 derives merge candidates in which the reference picture index refIdxLX is i and both of the X and Y components of the vector mvLX are 0 until the number of derived merge candidates reaches a maximum value. A vale of i indicating the reference picture index refIdxLX is allocated in sequence from 0. The derived merge candidates are stored in the merge candidate storage section 303611.

The merge candidate selection section 30362 selects the merge candidates to which indexes corresponding to the merge indexes merge_idx input from the inter-prediction parameter decoding control section 3031 are allocated as the inter-prediction parameters of a target PU among the merge candidates stored in the merge candidate storage section 303611. That is, when the merge candidate list is merge-CandList, the prediction parameter indicated by mergeCandList[merge_idx] is selected and output to the bi-prediction restriction section 30363.

In a case where the interview merge candidate is selected as the merge candidate, the merge candidate selection section 30362 sets a sub-block motion compensation flag subPbMotionFlag to 1. The merge candidate selection section 30362 may set the sub-block motion compensation flag subPbMotionFlag to 1 even in a case where the VSP mode flag vspModeFlag of the merge candidate is 1. In other cases, the sub-block motion compensation flag subPbMotionFlag is set to 0.

In a case of bi-prediction restriction condition 1 to be described below, the bi-prediction restriction section 30363 converts bi-prediction into uni-prediction by setting refIdxL1=−1 and predFlagL1=0 in the reference picture index refIdxL1 of L1 and the prediction use flag predFlagL1 of L1.

Bi-prediction restriction condition 1: the selected prediction parameter is bi-prediction (predFlagL0=1 and predFlagL1) and the size of the prediction unit is less than a predetermined size (a sum of a width nOrigPbW and a height nOrigPbH of the prediction unit is equal to 12).

The bi-prediction restriction section 30363 stores the selected merge candidate in the prediction parameter memory 307 and outputs the selected merge candidate to the predicted image generation section 308.

$$predSamplesLX'[x][y]=predSamplesLX[x][y].$$

Figure 10:
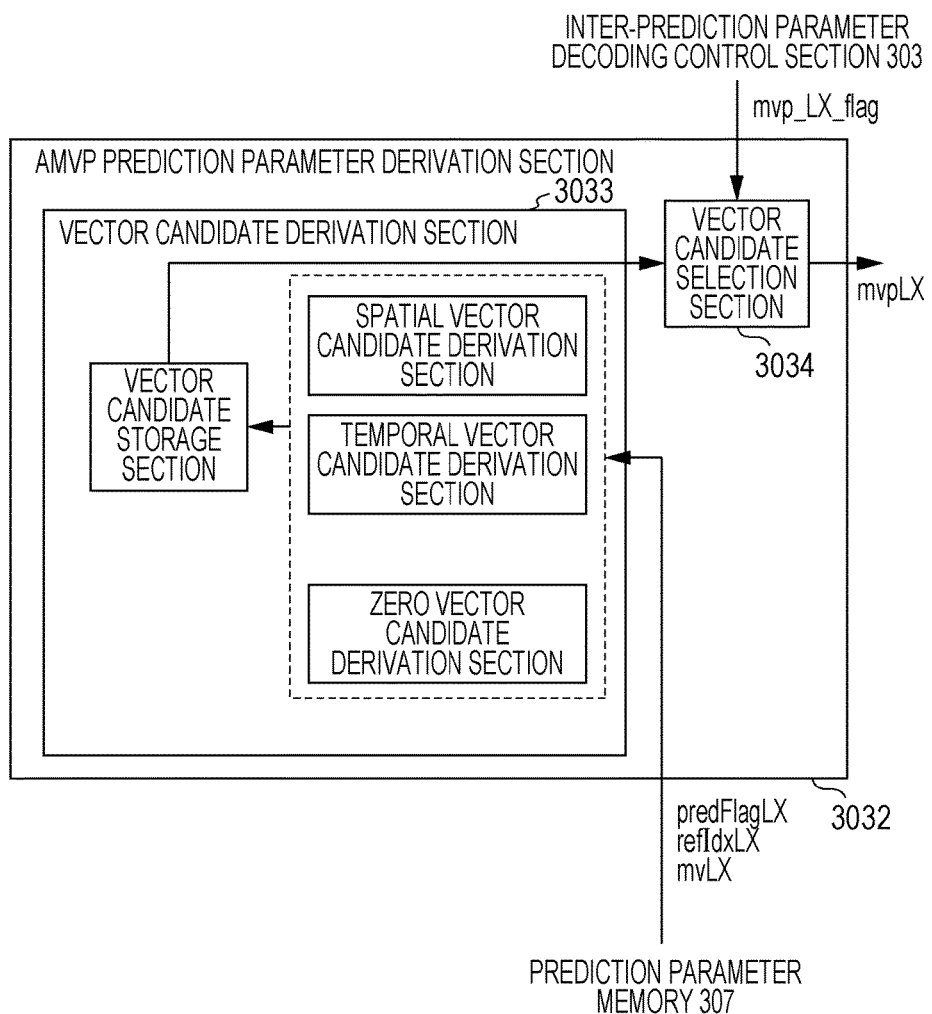
FIG. 10 is a schematic diagram illustrating the configuration of an AMVP prediction parameter derivation section 3032 according to the embodiment.

FIG. 10 is a schematic diagram illustrating the configuration of an AMVP prediction parameter derivation section 3032 according to the embodiment. The AMVP prediction parameter derivation section 3032 includes a vector candidate derivation section 3033, a prediction vector selection section 3034, and an inter-prediction identifier derivation section 3035. The vector candidate derivation section 3033 reads the vectors stored by the prediction parameter memory 307 based on the reference picture indexes refIdx and generates the vector candidate list mvpListLX. The reference blocks are blocks located at pre-decided positions using the position of the prediction unit as a standard (for example, blocks temporally adjacent to the bottom left end and the top right end of the prediction unit).

The prediction vector selection section 3034 selects, as the prediction vector mvpLX, the vector mvpListLX[mvp_lX_flag] indicated by the prediction vector flag mvp_LX_flag input from the inter-prediction parameter decoding control section 3031 among the vector candidates mvpListLX derived by the vector candidate derivation section 3033. The prediction vector selection section 3034 outputs the selected prediction vector mvpLX to the addition section 3035.

The addition section 3035 adds the prediction vector mvpLX input from the prediction vector selection section 3034 and the difference vector mvdLX input from the inter-prediction parameter decoding control section to calculate the vector mvLX. The addition section 3035 outputs the calculated vector mvLX to the predicted image generation section 308.

Figure 15:
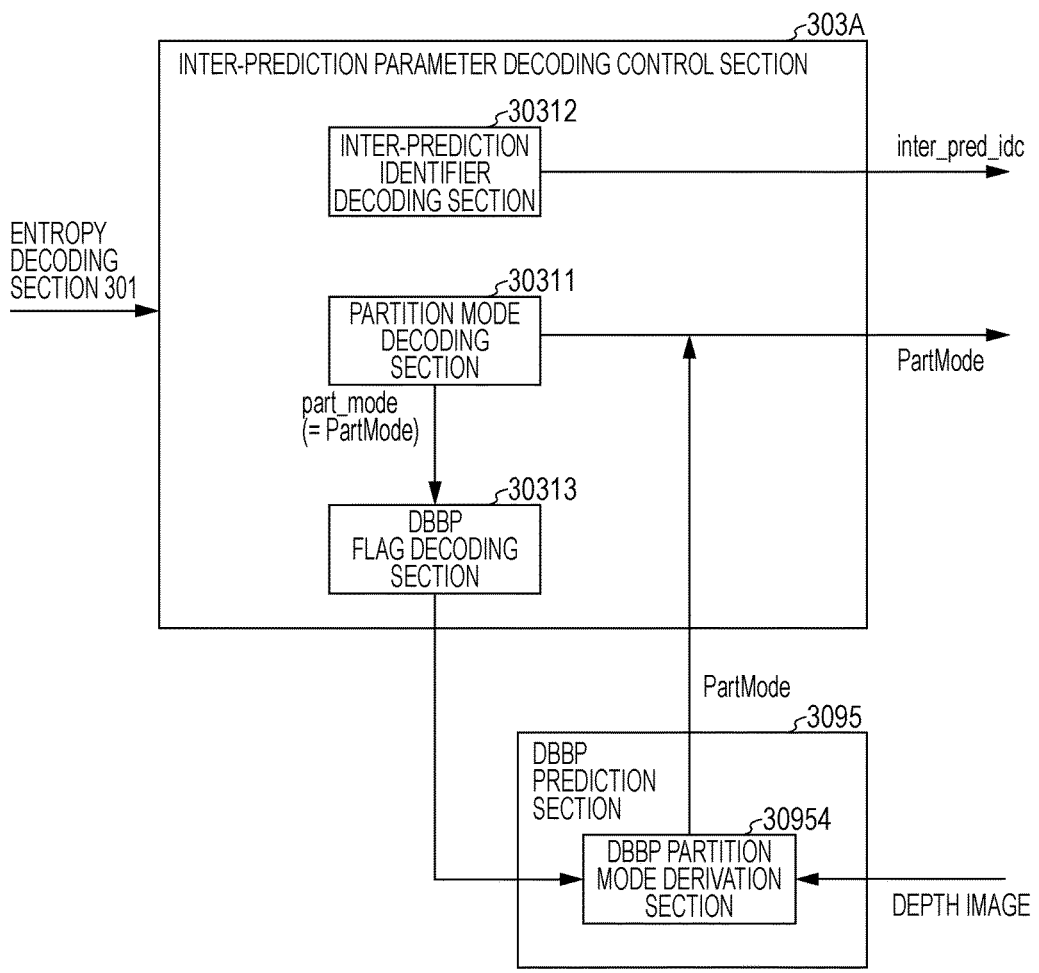
FIG. 15 is a schematic diagram illustrating the configuration of the inter-prediction parameter decoding control section 303 according to the first embodiment.

FIG. 15 is a block diagram illustrating the configuration of the inter-prediction parameter decoding control section 3031 according to the first embodiment of the invention. As illustrated in FIG. 15, the inter-prediction parameter decoding control section 3031 is configured to include a partition mode decoding section 30311, an inter-prediction identifier decoding section 30312, and a DBBP flag decoding section 30313 and include a merge flag decoding section, a merge index decoding section, an inter-prediction identifier decoding section, a reference picture index coding section, a vector candidate index decoding section, a vector difference decoding section, a residual prediction index decoding section, and an illumination compensation flag decoding section (none of which are not illustrated). The partition mode decoding section, the merge flag decoding section, the merge index decoding section, the reference picture index decoding section, the vector candidate index decoding section, and the vector difference decoding section decode the partition mode part_mode, the merge flag merge_flag, the merge index merge_idx, the inter-prediction identifier inter_pred_idc, the reference picture index refIdxLX, a prediction vector flag mvp_LX_flag, and the difference vector mvdLX, respectively.

The inter-prediction identifier decoding section 30312 decodes an inter-prediction identifier inter_pred_flag in which the prediction unit indicates L0 prediction (PRED_L0), L0 prediction (PRED_L1), or bi-prediction (PRED_BI).

In a case where the partition mode PartMode (part_mode) of the coding unit CU is 2N×2N, the residual prediction index decoding section uses the entropy decoding section 301 to decode the residual prediction index iv_res_pred_weight_idx from coded data. In other cases, the residual prediction index decoding section sets (infers) 0 in iv_res_pred_weight_idx. The residual prediction index decoding section outputs the decoded residual prediction index iv_res_pred_weight_idx to the merge mode parameter derivation section 3036 and the inter-predicted image generation section 309. The residual prediction index is a parameter for changing an operation of residual prediction. In the embodiment, the residual prediction index is an index indicating weight of the residual prediction and has a value of 0, 1, or 2. In a case where iv_res_pred_weight_idx is 0, the residual prediction is not executed. The weight of the residual prediction may not be changed according to the index, but the vector used for the residual prediction may be changed. A flag (residual prediction flag) indicating whether to execute the residual prediction may be used rather than the residual prediction index.

In a case where the partition mode PartMode is 2N×2N, the illumination compensation flag decoding section uses the entropy decoding section 301 to decode the illumination compensation flag ic_flag from the coded data. In other cases, the illumination compensation flag decoding section sets (infers) 0 in ic_flag. The illumination compensation flag decoding section outputs the decoded illumination compensation flag ic_flag to the merge mode parameter derivation section 3036 and the inter-predicted image generation section 309.

Hereinafter, the disparity vector derivation section 352, the splitting flag derivation section 353, and the depth DV derivation section 351 which are means used to derive the prediction parameters will be described in this order.

(Disparity Vector Derivation Section 352)

The disparity vector derivation section 352 extracts disparity vectors (hereinafter referred to as MvDisp[x][y] or mvDisp[x][y]) of a coding unit (target CU) to which a target PU belongs from blocks spatially or temporally adjacent to the coding unit. Specifically, a block Col temporally adjacent to the target CU, a second block AltCol temporally adjacent to the target CU, a block A1 spatially left adjacent to the target CU, and a block B1 spatially top adjacent to the target CU are set as reference blocks, and the prediction flag predFlagLX, the reference picture index refIdxLX, and the vector mvLX of the reference blocks are extracted in sequence. In a case where the extracted vector mvLX is a disparity vector, the disparity vectors of the adjacent blocks are output. In a case where there is no disparity vector in the prediction parameter of the adjacent block, the prediction parameter of the subsequent adjacent block is read and the disparity vector is similarly derived. In a case where the disparity vectors may not be derived in all of the adjacent blocks, a zero vector is output as a disparity vector. The disparity vector derivation section 352 outputs the reference picture index and the view ID (RefViewIdx[x][y], here (xP, yP) are coordinates) of the block in which the disparity vector is derived.

The disparity vector obtained as described above is referred to as neighbor base disparity vector (NBDV). The disparity vector derivation section 352 outputs the further obtained disparity vector NBDV to the depth DV derivation section 351. The depth DV derivation section 351 derives a depth-originated disparity vector disparitySampleArray. The disparity vector is updated by setting the disparity vector disparitySampleArray as a disparity vector, a horizontal component mvLX[0] of a motion vector. The updated disparity vector is referred to as a depth orientated neighbor base disparity vector (DoNBDV). The disparity vector derivation section 352 outputs the disparity vector (DoNBDV) to the inter-layer merge candidate derivation section 30371, the disparity merge candidate derivation section, and a viewpoint synthesis prediction merge candidate derivation section. Further, the obtained disparity vector (NBDV) is output to the inter-predicted image generation section 309.

(Splitting Flag Derivation Section 353)

The splitting flag derivation section 353 derives the splitting flag horSplitFlag with reference to the depth image corresponding to a target block. The coordinates of the target block set as an input of the splitting flag derivation section 353 are assumed to be (xP, yP), the width and the height are assumed to be nPSW and nPSH, and the disparity vector is assumed to be mvDisp in the following description. The splitting flag derivation section 353 may refer to the depth image in a case where the width and the height of the target block are the same. However, in a case where the width and the height of the target block are not the same, the splitting flag derivation section 353 may derive the splitting flag horSplitFlag without referring to the depth image. Hereinafter, the details of the splitting flag derivation section 353 will be described.

The splitting flag derivation section 353 reads the depth image refDepPels which has the same POC as the decoding target picture and has the same view ID as the view ID (RefViewIdx) of the reference picture indicated by the disparity vector mvDisp, from the reference picture memory 306.

Next, the splitting flag derivation section 353 derives coordinates (xTL, yTL) obtained by shifting the top left coordinates (xP, yP) of the target block by the disparity vector MvDisp by the following formulae.

$$xTL = xP + ((mvDisp[0]+2)>>2); \text{ and}$$

$$yTL = yP + ((mvDisp[1]+2)>>2).$$

Here, mvDisp[0] and mvDisp[1] are X and Y components of the disparity vector MvDisp, respectively. The derived coordinates (xTL, yTL) indicate the coordinates of a block corresponding to the target block on the depth image refDepPels.

The splitting flag derivation section 353 sets 1 in a flag minSubBlkSizeFlag by the following formula in a case where the width nPSW or the height nPSH of the target block is a value other than a multiple of 8.

$$minSubBlkSizeFlag = (nPSW \% 8 != 0) || (nPSH \% 8 != 0)$$

In a case where the flag minSubBlkSizeFlag is 1, the splitting flag derivation section 353 sets 1 in horSplitFlag by the following formula in a case where the height of the target block is value other than a multiple of 8 (a case where nPSH % 8 is true). The splitting flag derivation section 353 sets 0 in other cases.

$$horSplitFlag = (nPSH \% 8 != 0).$$

That is, in a case where the height of the target block is a value other than a multiple of 8 (a case where nPSH % 8 is true), 1 is set in horSplitFlag. In a case where the width of the target block is a value other than a multiple of 8 (a case where nPSW % 8 is true), 0 is set in horSplitFlag.

The splitting flag derivation section 353 derives a sub-block size from the depth value. The sub-block size is derived by comparing four corner points (TL, TR, BL, and BR) of the prediction block. In a case where the flag minSubBlkSizeFlag is 0 and a case where a pixel value of the depth image at the coordinates of the top left end (TL) of the target block is refDepPelsP0, a pixel value of the top right end (TR) is refDepPelsP1, a pixel value of the bottom left end (BL) is refDepPelsP2, and a pixel value of the bottom right end (BR) is refDepPelsP3, it is determined whether the following conditional formula (horSplitFlag) is established:

horSplitFlag=(refDepPelsP0>refDepPelsP3)= (refDepPelsP1>refDepPelsP2).

The following formula in which codes are changed may be used in the derivation of horSplitFlag.

horSplitFlag=(refDepPelsP0<refDepPelsP3)= (refDepPelsP1<refDepPelsP2).

The splitting flag derivation section 353 outputs horSplitFlag to a partition mode derivation section 30954C and the VSP prediction section 30374.

The splitting flag derivation section 353 may execute the derivation as follows. In a case where the width nPSW and the height nPSH of the target block are different, horSplitFlag is derived according to the width and the height of the target block by the following formula.

horSplitFlag=1 when $nPSW>nPSH$; and otherwise, horSplitFlag=0 when nPSH>nPSW. Otherwise, horSplitFlag is derived with reference to the depth by the following formula in a case where the width and the height of the target block are the same.

horSplitFlag=(refDepPelsP0>refDepPelsP3)== (refDepPelsP1>refDepPelsP2).

The target block of the splitting flag derivation section 353 is a prediction unit in the case of parallax synthesis prediction, and is a block in which the width and the height are the same in the case of DBBP. Since the width and the height are the same in the case of DBBP, the splitting flag horSplitFlag is derived with reference to four corners of the depth image in the foregoing derivation method.

(Depth DV Derivation Section 351)

Figure 13:
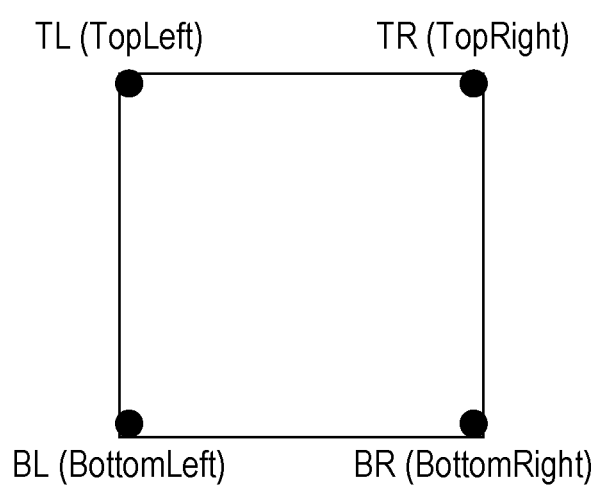
FIG. 13 is a diagram illustrating depth reference positions in derivation of the splitting flag in the partition mode according to the embodiment.

The depth DV derivation section 351 derives a parallax array disparitySamples (horizontal vector) which is a horizontal component of the depth-originated disparity vector in the designated block unit (sub-block). Inputs of the depth DV derivation section 351 are the depth DV conversion table DepthToDisparityB, the width nBlkW and the height nBlkH of the block, the splitting flag splitFlag, the depth image refDepPels, the coordinates (xTL, yTL) of a correspondence block on the depth image refDepPels, and the view IDrefViewIdx. An output of the depth DV derivation section 351 is the parallax array disparitySamples (horizontal vector). Through the following process, the depth DV derivation section 351 sets the pixels used to derive a depth representative value maxDep for each target block. Specifically, as illustrated in FIG. 13, in a case where relative coordinates (xSubB, ySubB) from the top left prediction block (xTL, yTL) of the target block are assumed to be (xSubB, ySubB), the X coordinate xP0 at the left end of the sub-block, the X coordinate xP1 at the right end thereof, the Y coordinate yP0 at the top end, and the Y coordinate yP1 at the bottom end are obtained from the following formulae.

xP0=Clip3(0,pic_width_in_luma_samples−1,xTL+ xSubB);

yP0=Clip3(0,pic_height_in_luma_samples−1,yTL+ ySubB);

xP1=Clip3(0,pic_width_in_luma_samples−1,xTL+ xSubB+nBlkW−1); and yP1=Clip3(0,pic_height_in_luma_samples−1,yTL+ ySubB+nBlkH−1).

Here, pic_width_in_luma_samples and pic_height_in_luma_samples indicate the width and the height of an image, respectively.

Next, the depth DV derivation section 351 derives the representative value maxDep of the depth of the target block. Specifically, the depth DV derivation section 351 derives the representative depth value maxDep which is the maximum value of pixel values refDepPels[xP0][yP0], refDepPels[xP0][yP1], refDepPels[xP1][yP0], and refDepPels[xP1][yP1] of depth images at the corners of the sub-block and 4 points near the corners by the following formulae.

maxDep=0;

maxDep=Max(maxDep,refDepPels[xP0][yP0]);

maxDep=Max(maxDep,refDepPels[xP0][yP1]);

maxDep=Max(maxDep,refDepPels[xP1][yP0]); and maxDep=Max(maxDep,refDepPels[xP1][yP1]).

A function Max (x, y) is a function that returns x in a case where a first argument x is equal to or greater than a second argument y and returns y otherwise.

The depth DV derivation section 351 derives a parallax array disparitySamples which is the horizontal component of the depth-originated disparity vector for each pixel (x, y) (where x receives a value of nBlkW−1 from 0 and y receives a value of nBlkH−1 from 0) in the target block using the representative depth value maxDep, the depth DV conversion table DepthToDisparityB, and the view IDrefViewIdx of the layer indicated by the disparity vector (NBDV) by the following formula.

disparitySamples[x][y]=DepthToDisparityB [refViewIdx][maxDep] (formula A).

The depth DV derivation section 351 outputs the derived parallax array disparitySamples[ ] as the disparity vector DoNBDV (a horizontal component of this disparity vector) to the disparity vector derivation section 352. The depth DV derivation section 351 also outputs the derived parallax array disparitySamples[ ] as the disparity vector (a horizontal component of the disparity vector) to the VSP prediction section 30374.

(Inter-Predicted Image Generation Section 309)

Figure 16:
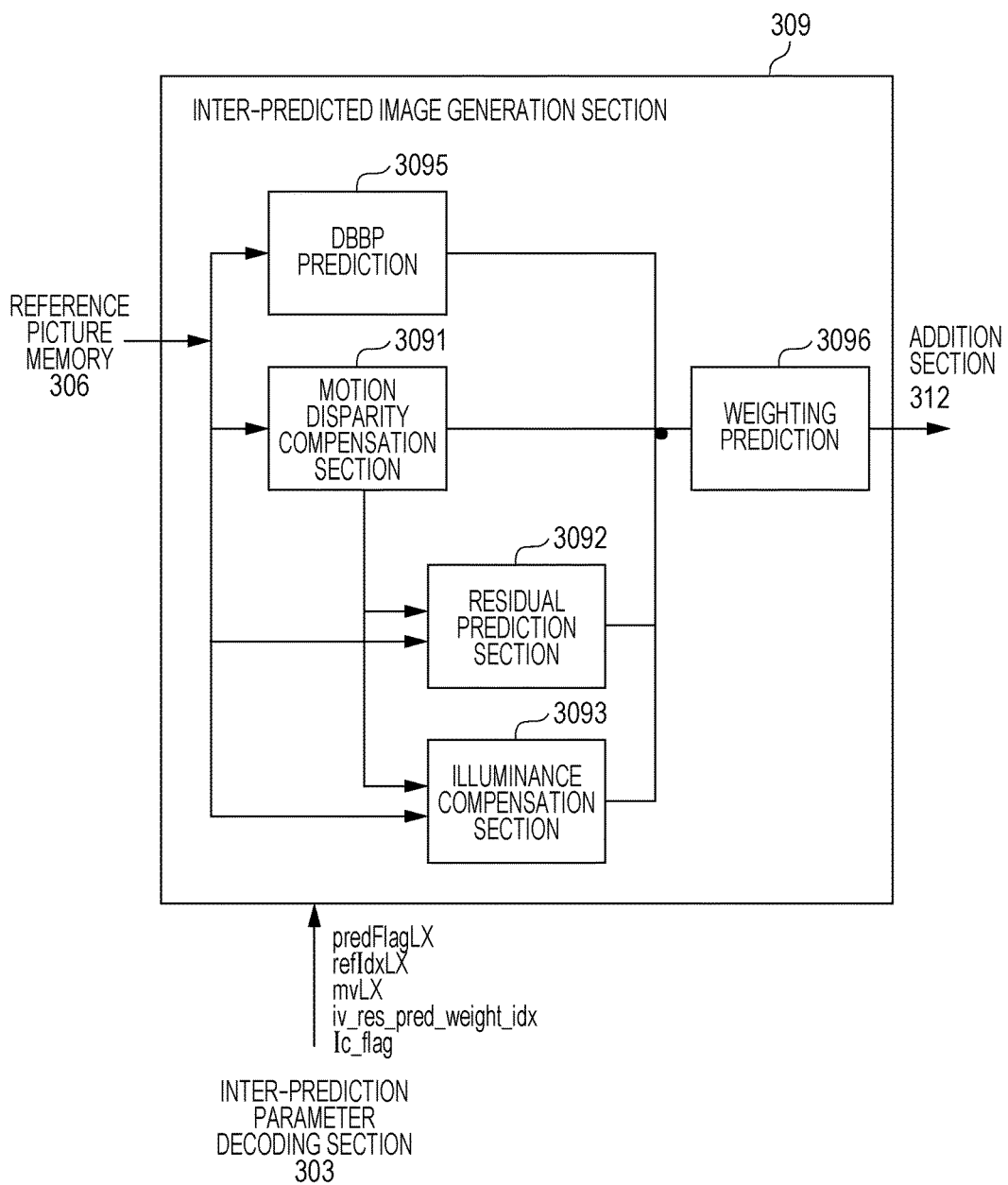
FIG. 16 is a schematic diagram illustrating the configuration of an inter-predicted image generation section 309 according to the embodiment.

FIG. 16 is a schematic diagram illustrating the configuration of an inter-predicted image generation section 309 according to the embodiment. The inter-predicted image generation section 309 is configured to include a motion disparity compensation section 3091, a residual prediction section 3092, an illumination compensation section 3093, a DBBP prediction section 3095 (depth-based block predicted image generation device 3095), and a weight prediction section 3096.

In a case where a sub-block motion compensation flag subPbMotionFlag input from the inter-prediction parameter decoding section 303 is 1, the inter-predicted image generation section 309 executes the following process in the sub-block unit. In a case where the sub-block motion compensation flag subPbMotionFlag is 0, the inter-predicted image generation section 309 executes the following process in units of the prediction units. In a case where the interview merge candidate or the VSP merge candidate is selected as a merge mode, the sub-block motion compensation flag subPbMotionFlag becomes 1. The inter-predicted image generation section 309 causes the motion disparity compensation section 3091 to derive a predicted image predSamples using the prediction parameter. In a case where the residual prediction index iv_res_pred_weight_idx is not 0, the inter-predicted image generation section 309 sets 1 indicating that residual prediction is executed in a residual prediction execution flag resPredFlag and outputs the residual prediction execution flag resPredFlag to the motion disparity compensation section 3091 and the residual prediction section 3092. Conversely, in a case where the residual prediction index iv_res_pred_weight_idx is 0, 0 is set in the residual prediction execution flag resPredFlag and the residual prediction execution flag resPredFlag is output to the motion disparity compensation section 3091 and the residual prediction section 3092.

The motion disparity compensation section 3091, the residual prediction section 3092, the illumination prediction section 3093, and the DBBP prediction section 3095 each derive a motion compensated image predSamplesL0 mof L0 or a motion compensated image predSamplesL1 of L1 in a case of the uni-prediction (predFlagL0=1 or predFlagL1=1), derive the motion compensated image predSamplesL0 of L0 and the motion compensated image predSamplesL1 of L1 in the case of the bi-prediction (predFlagL0=1 and predFlagL1=1), and output the motion compensated images to the weight prediction section 3096. The weight prediction section 3096 derives the predicted image predSamples from one motion compensated image predsamplesL0 or predSamplesL1 in the case of the uni-prediction and derives the predicted image predSamples from the two motion compensated images predSamplesL0 and predSamplesL1 in the case of the bi-prediction.

(Motion Disparity Compensation)

The motion disparity compensation section 3091 generates a motion prediction image predSampleLX based on the prediction use flag predFlagLX, the reference picture index refIdxLX, and the vector mvLX (a motion vector or a disparity vector). The motion disparity compensation section 3091 generates, from the reference picture memory 306, a predicted image by executing reading interpolation on a block located at a position deviated by the vector mvLX when the position of the prediction unit of the reference picture designated by the reference picture index refIdxLX is an origin. Here, in a case where the vector mvLX is not an integer vector, filtering called motion compensation filtering (or disparity compensation filtering) is executed to generate a pixel at a decimal position to generate a predicted image. In general, in a case where the vector mvLX is a motion vector, the foregoing process is referred to as motion compensation. In a case where the vector mvLX is a disparity vector, the foregoing process is referred to as disparity compensation. Here, the foregoing processes are collectively expressed as motion disparity compensation.

Hereinafter, a predicted image of L0 prediction is referred to as predSamplesL0 and a predicted image of L1 prediction is referred to as predSamplesL1. In a case where both of the predicted images are not distinguished from each other, the predicted images are referred to as predSamplesLX. Hereinafter, an example in which residual prediction and illumination compensation are executed on the predicted images predSamplesLX obtained by the motion disparity compensation section 3091 will be described. These output images are also referred to as predicted images predSamplesLX. In a case where an input image and an output image are distinguished from each other in the following residual prediction and illumination compensation, the input image is expressed as predSamplesLX and an output image is expressed as predSamplesLX'.

In a case where the residual prediction execution flag resPredFlag is 0, the motion disparity compensation section 3091 generates a motion compensated image predSamplesLX by a motion compensation filter in which luminance components are 8 taps and chroma components are 4 taps. In a case where the residual prediction execution flag resPredFlag is 1, the motion disparity compensation section 3091 generates a motion compensated image predSamplesLX by a motion compensation filter in which luminance components are 2 taps and chroma components are 2 taps.

In a case where the sub-block motion compensation flag subPbMotionFlag is 1, the motion disparity compensation section 3091 executes motion compensation in the sub-block unit. Specifically, the vector, the reference picture index, and the reference list use flag of a sub-block at coordinates (xCb, yCb) are derived from the following formulae.

$$MvL0[xCb+x][yCb+y]=\text{sub}Pb\text{MotionFlag?Sub}Pb\text{-}MvL0[xCb+x][yCb+y]:mvL0;$$

$$MvL1[xCb+x][yCb+y]=\text{sub}Pb\text{MotionFlag?Sub}Pb\text{-}MvL1[xCb+x][yCb+y]:mvL1;$$

$$\text{Ref}IdxL0[xCb+x][yCb+y]=\text{sub}Pb\text{MotionFlag?Sub}P\text{-}b\text{Ref}IdxL0[xCb+x][yCb+y]:\text{ref}IdxL0;$$

$$\text{Ref}IdxL1[xCb+x][yCb+y]=\text{sub}Pb\text{MotionFlag?Sub}P\text{-}b\text{Ref}IdxL1[xCb+x][yCb+y]:\text{ref}IdxL1;$$

$$\text{PredFlag}L0[xCb+x][yCb+y]=\text{sub}Pb\text{MotionFlag?Sub}Pb\text{PredFlag}L0[xCb+x][yCb+y]:\text{predFlag}L0;\text{ and}$$

$$\text{PredFlag}L1[xCb+x][yCb+y]=\text{sub}Pb\text{MotionFlag?Sub}Pb\text{PredFlag}L1[xCb+x][yCb+y]:\text{predFlag}L1.$$

Here, SubPbMvLX, SubPbRefIdxLX, SubPbPredFlagLX (where X is 0 or 1) correspond to subPbMvLX, subPbRefIdxLX, and subPbPredFlagLX described in the inter-layer merge candidate derivation section 30371.

(Residual Prediction)

The residual prediction section 3092 executes residual prediction in a case where the residual prediction execution flag resPredFlag is 1. The residual prediction section 3092 outputs the input predicted image predSamplesLX without change in a case where the residual prediction execution flag resPredFlag is 0. The residual prediction of refResSamples is executed by estimating a residual of the motion compensated image predSamplesLX generated in the motion prediction or the disparity prediction and adding the residual to the predicted image predSamplesLX of a target layer. Specifically, in a case where the prediction unit is motion prediction, the same residual as the reference layer is assumed to also occur in the target layer and the already derived residual of the reference layer is used as an estimated value of the residual of the target layer. In a case where the prediction unit is disparity prediction, the residuals of the picture of the reference layer at the different time (POC) from the target picture and the picture of the target layer are used as estimated values of the residuals.

The residual prediction section 3092 also executes the residual prediction in the sub-block unit in a case where the sub-block motion compensation flag subPbMotionFlag is 1, as in the motion disparity compensation section 3091.

Figure 17:
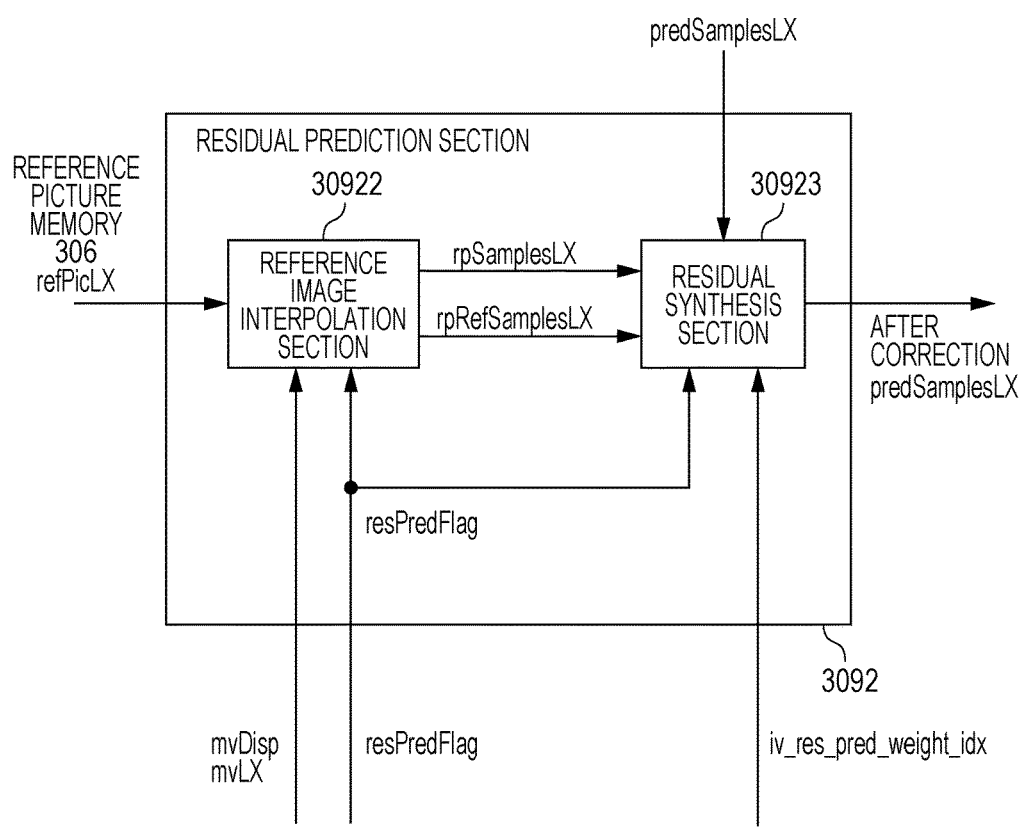
FIG. 17 is a schematic diagram illustrating the configuration of a residual prediction section 3092 according to the embodiment.

FIG. 17 is a block diagram illustrating the configuration of the residual prediction section 3092. The residual prediction section 3092 is configured to include a reference image interpolation section 30922 and a residual synthesis section 30923.

In a case where the residual prediction execution flag resPredFlag is 1, the reference image interpolation section 30922 generates two residual prediction motion compensated images (correspondence block rpSamplesLX and a reference block rpRefSamplesLX) using the vector mvLX and the residual prediction disparity vector mvDisp input from the inter-prediction parameter decoding section 303, and the reference picture stored in the reference picture memory 306.

The residual prediction section 3092 derives an interview prediction flag ivRefFlag which is a flag indicating whether the target block is the motion prediction or the disparity prediction by (DiffPicOrderCnt (currPic, RefPicListX[refIdxLX])==0). Here, DiffPicOrderCnt (X, Y) indicates a difference of the POC of the pictures X and Y (the same applies below). Accordingly, in a case where the POC of a target picture currPic and the POC of the reference picture RefPicListX[refIdxLX] indicated by the reference picture index refIdxLX and the reference picture list RefPicListX are 0, the disparity prediction is applied to the target block and 1 is set in ivRefFlag. In other cases, the motion prediction is applied to the target block and 0 is set in ivRefFlag.

Figure 18:
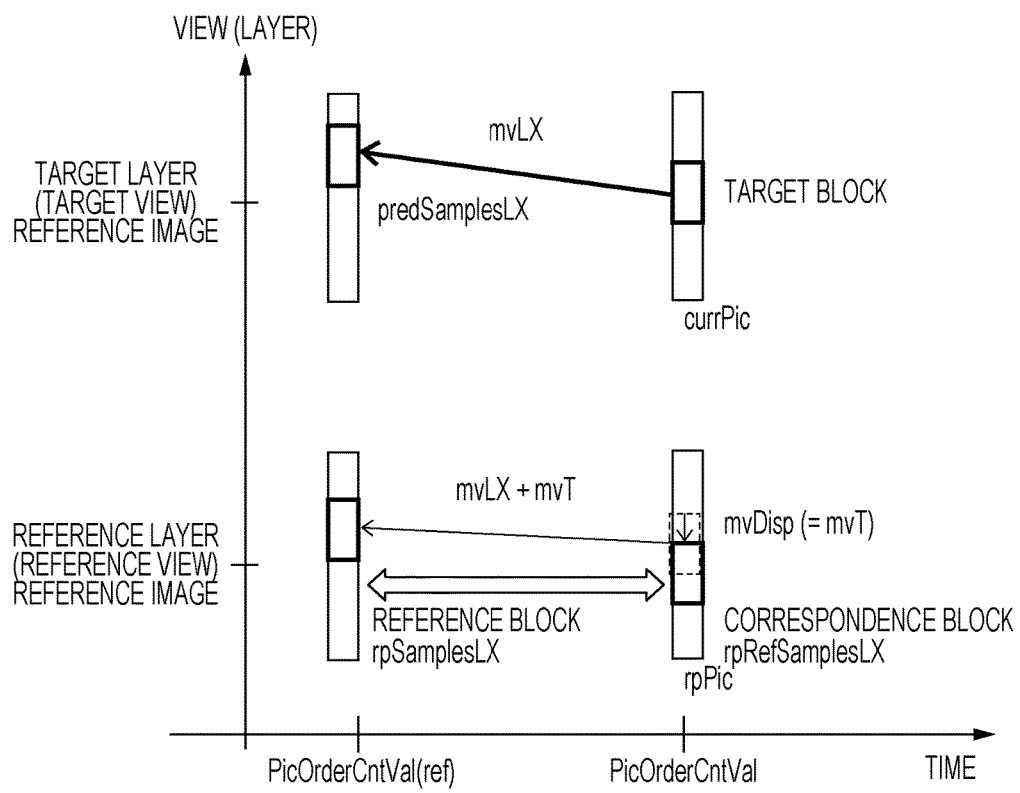
FIG. 18 is a conceptual diagram illustrating residual prediction (a case of a motion vector) according to the embodiment.

FIG. 18 is a diagram illustrating the correspondence block rpSamplesLX and the reference block rpRefSamplesLX in a case where the vector mvLX is a motion vector (a case in the interview prediction flag ivRefFlag is 0). As illustrated in FIG. 18, the correspondence block corresponding to the prediction unit on the target layer is located in a block located at a position deviated by the disparity vector mvDisp which is a vector indicating a positional relation between the reference layer and the target layer when the position of the prediction unit of an image on the reference layer is an origin.

Figure 19:
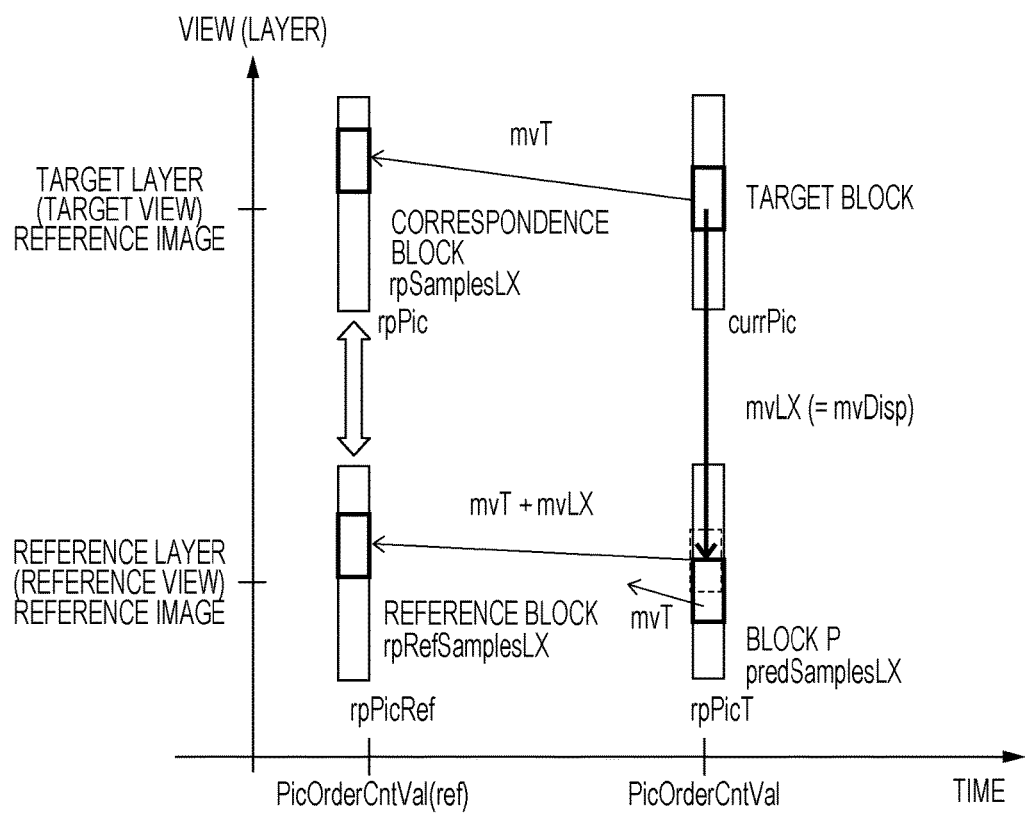
FIG. 19 is a conceptual diagram illustrating residual prediction (in a case of a parallax vector) according to the embodiment.

FIG. 19 is a diagram illustrating the correspondence block rpSamplesLX and the reference block rpRefSamplesLX in a case where the vector mvLX is a disparity vector (the interview prediction flag ivRefFlag is 1). As illustrated in FIG. 19, the correspondence block rpSamplesLX is a block on the reference picture rpPic which has a different time from the target picture and the same view ID as the target picture. The residual prediction section 3092 derives mvT which is a vector of the prediction unit on a destination picture mvPicT designated by the vector mvLX (=the disparity vector mvDisp) of the target block. The correspondence block rpSamplesLX is located in a block located at a position deviated by the vector mvT when the position of the prediction unit (target block) is an origin.

(Derivation of Residual Prediction Reference Picture)

The residual prediction section 3092 derives reference pictures rpPic and rpPicRef which are reference pictures referred to in derivation of residual prediction motion compensated images (rpSamplesLX and rpRefSamplesLX) and vectors mvRp and mvRpRef indicating the position of a reference block (the relative coordinates of the reference block when the coordinates of the target block are a standard).

The residual prediction section 3092 sets a picture which has the same display time (POC) as a target picture to which the target block belongs or the same view ID as rpPic.

Specifically, in a case where the target block is the motion prediction (a case where the interview prediction flag ivRefFlag is 0), the POC of the reference picture rpPic is the same as PicOrderCntVal which is the POC of the target picture and the view ID of the reference picture rpPic is the same as a reference view IDRefViewIdx[xP][yP] (which is different from th view ID of the target picture) of the prediction unit in the residual prediction section 3092. The reference picture rpPic is derived from this condition. Further, the residual prediction section 3092 sets the disparity vector MvDisp in the vector mvRp of the foregoing rpPic.

In a case where the target block is the disparity prediction (a case where the interview prediction flag ivRefFlag is 1), the residual prediction section 3092 sets rpPic in the reference picture used to generate the predicted image of the target block. That is, in a case where the reference index of the target block is RpRefIdxLY and the reference picture list is RefPicListY, the reference picture rpPic is derived from RefPicListY[RpRefIdxLY]. The residual prediction section 3092 further includes a residual prediction vector derivation section 30924 (not illustrated). The residual prediction vector derivation section 30924 derives mvT which is a vector of the prediction unit on a picture which has a different view ID and the same POC as the target picture of the destination indicated by the vector mvLX (which is the same as the disparity vector MvDisp) of the target block in the vector mvRp of the foregoing rpPic, and sets mvRp in the motion vector mvT.

Next, the residual prediction section 3092 sets the reference picture which has a different display time (POC) from the target picture and the different view ID as rpPicRef.

Specifically, in a case where the target block is the motion prediction (a case where the interview prediction flag ivRefFlag is 0), the residual prediction section 3092 derives the reference picture rpPicRef from the condition that the POC of the reference picture rpPicRef is the same as the POC of the reference picture RefPicListY[RpRefIdxLY] of the target block and the view ID of the reference picture rpPicRef is the same as the view IDRefViewIdx[xP][yP] of the reference picture of the disparity vector MvDisp. Further, the residual prediction section 3092 sets a sum (mvRp+mvLX) of the vector mvRp and the vector mvLX obtained by scaling the motion vector of the prediction block to the vector mvRpRef of the foregoing rpPicRef.

In a case where the target prediction unit is the disparity prediction (the case where the interview prediction flag ivRefFlag is 1), the residual prediction section 3092 derives the reference picture rpPicRef from the condition that the POC of the reference picture rpPicRef is same as the POC of the reference picture rpPic and the view ID of the reference picture rpPicRef is the same as the view IDRefViewIdx[xP][yP] of the prediction unit. Further, the residual prediction section 3092 sets a sum (mvRp+mvLX) of the motion vector mvLX of the prediction block and the vector mvRp in the vector mvRpRef of the foregoing rpPicRef.

That is, the residual prediction section 3092 derives mvRp and mvRpRef in the following way.

In the case where the interview prediction flag ivRefFlag is 0, $$mvRp = MvDisp \quad \text{formula (B-1); and}$$

$$mvRpRef = mvRp + mvLX (= mvLX + MvDisp) \quad \text{formula (B-2).}$$

In the case where the interview prediction flag ivRefFlag is 1, $$mvRp = mvT \quad \text{formula (B-3); and}$$

$$mvRpRef = mvRp + mvLX (= mvLX + mvT) \quad \text{formula (B-4).}$$

(Residual Prediction Vector Derivation Section 30924)

The residual prediction vector derivation section 30924 derives the vector mvT of the prediction unit on a different picture from the target picture. The residual prediction vector derivation section 30924 receives the reference picture, the target block coordinates (xP, yP), the target block sizes nPSW and nPSH, and the vector mvLX as inputs and derives the vector mvT and the view ID from the motion compensation parameters (the vector, the reference picture index, and the view ID) of the prediction unit on the reference picture. The residual prediction vector derivation section 30924 derives reference coordinates (xRef, yRef) as the central coordinates of a block located at a position deviated by the vector mvLX from the target block on the reference picture instructed as an input by the following formulae.

$$xRef = Clip3(0, PicWidthInSamplesL-1, xP + (nPSW>>1) + ((mvDisp[0]+2)>>2)); \text{ and}$$

$$yRef = Clip3(0, PicHeightInSamplesL-1, yP + (nPSH>>1) + ((mvDisp[1]+2)>>2)).$$

The residual prediction vector derivation section 30924 derives a reference picture index refPicLX and a vector mvLX of refPU which is the prediction unit including the reference block coordinates (xRef, yRef). In a case in the target prediction unit is the disparity prediction (DiffPicOrderCnt (currPic, refPic) is 0 or the reference prediction unit refPU is the motion prediction (DiffPicOrderCnt (refPic, refPicListRefX[refIdxLX]) is a value other than 0), a vector of refPU is set to mvT and a referable flag availFlagT is set to 1. Through the foregoing process, a vector of a block in which a picture having the same POC as the target picture and a different view ID is a reference picture is can be derived as mvT.

The residual prediction vector derivation section 30924 derives a vector of the prediction unit on a different picture from the target picture. The residual prediction vector derivation section 30924 receives the target block coordinates (xP, yP), the target block sizes nPbW and nPbH, and the disparity vector mvDisp as inputs and derives the following reference block coordinates (xRef, yRef).

$$xRef = Clip3(0, PicWidthInSamplesL-1, xP + (nPSW>>1) + ((mvDisp[0]+2)>>2)); \text{ and}$$

$$yRef = Clip3(0, PicHeightInSamplesL-1, yP + (nPSH>>1) + ((mvDisp[1]+2)>>2)).$$

The residual prediction vector derivation section 30924 derives the reference picture index refPicLX and the vector mvLX of refPU which is the prediction unit including the reference block coordinates (xRef, yRef). In a case where the target prediction unit is the motion prediction (DiffPicOrderCnt (currPic, refPic) is a value other than 0) and the reference prediction unit refPU is the disparity prediction (DiffPicOrderCnt (refPic, refPicListRefX[refIdxLX]) is 0), the referable flag availFlagT is set to 1. Accordingly, a vector of a block in which a picture having the same POC as the target picture and a different view ID is a reference picture is can be derived as mvT.

(Reference Image Interpolation Section 30922)

The reference image interpolation section 30922 sets the vector mvC in the vector mvLX and generates the compensated image of the reference block rpSamplesLX. A pixel located at a position deviated by the vector mvLX of the prediction unit from the coordinates (x, y) of the pixel of the interpolated image is derived through linear interpolation (bilinear interpolation). Considering that the disparity vector LX has quarter-pel decimal precision, the reference image interpolation section 30922 derives an X coordinate xInt and a Y coordinate yInt of a pixel R0 with corresponding integer precision and a decimal part xFrac of the X component and a decimal part yFrac of the Y component of the disparity vector mvDisp in a case where the coordinates of the pixel of the prediction unit are (xP, yP) by the following (formula C-1):

$$xInt = xPb + (mvLX[0]>>2);$$

$$yInt = yPb + (mvLX[1]>>2);$$

$$xFrac = mvLX[0] \& 3; \text{ and}$$

$$yFrac = mvLX[1] \& 3.$$

Here, X & 3 is a mathematical formula that extracts only 2 lower bits of X.

Next, the reference image interpolation section 30922 generates an interpolated pixel predPartLX[x][y] in consideration of the fact that the vector mvLX has the quarter-pel decimal precision. First, the coordinates of integer pixels A(xA, yB), B(xB, yB), C(xC, yC), and D(xD, yD) are derived by the following (formulae C-2):

$$xA = Clip3(0, picWidthInSamples-1, xInt);$$

$$xB = Clip3(0, picWidthInSamples-1, xInt+1);$$

$$xC = Clip3(0, picWidthInSamples-1, xInt);$$

$$xD = Clip3(0, picWidthInSamples-1, xInt+1);$$

$$yA = Clip3(0, picHeightInSamples-1, yInt);$$

$$yB = Clip3(0, picHeightInSamples-1, yInt);$$

$$yC = Clip3(0, picHeightInSamples-1, yInt+1); \text{ and}$$

$$yD = Clip3(0, picHeightInSamples-1, yInt+1).$$

Here, the integer pixel A is a pixel corresponding to the pixel R0, and the integer pixels B, C, and D are pixels which have integer precision and are adjacent to the right, bottom, and bottom right of the integer pixel A, respectively. The reference image interpolation section 30922 reads reference pixels refPicLX[xA][yA], refPicLX[xB][yB], refPicLX[xC][yC], and refPicLX[xD][yD] corresponding to the integer pixels A, B, C, and D, respectively, from the reference picture memory 306.

The reference image interpolation section 30922 derives interpolated pixels predPartLX[x][y] which are pixels at positions deviated by the decimal part of the vector mvLX from the pixel R0 through linear interpolation (bilinear interpolation) using the reference pixels refPicLX[xA][yA], refPicLX[xB][yB], refPicLX[xC][yC], and refPicLX[xD][yD] and the decimal part xFrac of the X component and the decimal part yFrac of the Y component of the vector mvLX. Specifically, the derivation is executed by the following formula (C-3):

predPart$LX$[$x$][$y$]=(refPic$LX$[$xA$][$yA$]*(8−$x$Frac)*(8−$y$Frac)+refPic$LX$[$xB$][$yB$]*(8−$y$Frac)*$x$Frac+refPic$LX$[$xC$][$yC$]*(8−$x$Frac)*$y$Frac+refPic$LX$[$xD$][$yD$]*$x$Frac*$y$Frac)>>6.

The interpolated pixel has been derived above by bilinear interpolation of one step using the four pixels around the target pixel. However, linear interpolation in the horizontal direction and linear interpolation in the vertical direction may be separated and the residual prediction interpolation image may be generated through the linear interpolation of two steps.

The reference image interpolation section 30922 executes the foregoing interpolated pixel derivation process on each pixel in the prediction unit and sets a set of the interpolated pixels as an interpolated block predPartLX. The reference image interpolation section 30922 outputs the derived interpolated block predPartLX as the correspondence block rpSamplesLX to the residual synthesis section 30923.

The reference image interpolation section 30922 executes the same process as the process of deriving the correspondence block rpSamplesLX, excluding the fact that the disparity vector mvLX is substituted with the vector mvR, to derive the reference block rpRefSamplesLX. The reference image interpolation section 30922 outputs the reference block rpRefSamplesLX to the residual synthesis section 30923.

(Residual Synthesis Section 30923)

In the case where the residual prediction execution flag resPredFlag is 1, the residual synthesis section 30923 derives a predicted image by deriving a residual from a difference between two residual prediction motion compensated images (rpSamplesLX and rpRefSamplesLX) and adding the residual to the motion compensated image. Specifically, the residual synthesis section 30923 derives a compensated predicted image predSamplesLX' from the predicted image predSamplesLX, the correspondence block rpSamplesLX, the reference block rpRefSamplesLX, and the residual prediction index iv_res_pred_weight_idx. The compensated predicted image predSamplesLX' is obtained using the following formula:

predSamples$LX$'[$x$][$y$]=predSamples$LX$[$x$][$y$]+((rpSamples$LX$[$x$][$y$]−rpRefSamples$LX$[$x$][$y$])>>(iv_res_pred_weight_$idx$−1)).

Here, x is the width of the prediction block−1 from 0 and y is the height of the prediction block−1 from 0. In the case where the residual prediction execution flag resPredFlag is 0, the residual synthesis section 30923 outputs the predicted image predSamplesLX without change as in the following formula.

predSamples$LX$'[$x$][$y$]=predSamples$LX$[$x$][$y$].

(Illumination Compensation)

In the case where the illumination compensation flag ic_flag is 1, the illumination compensation section 3093 executes illumination compensation on the input predicted image predSamplesLX. In the case where the illumination compensation flag ic_flag is 0, the input predicted image predSamplesLX is output without change.

(Weight Prediction)

In the case of uni-prediction (predFlagL0=1/predFlagL1=0 or predFlagL0=0/predFlagL1=1), the weight prediction section 3096 derives a predicted image predSamples from a motion compensated image predSampleL0 of L0 or a motion compensated image predSampleL1 of L1. Specifically, the predicted image is derived in the prediction from L0 and the prediction from L1 using the following formulae.

predSamples[$x$][$y$]=Clip3(0,(1<<bitDepth)−1,predSamples$L$0[$x$][$y$]$w$0+$o$0); and predSamples[$x$][$y$]=Clip3(0,(1<<bitDepth)−1,predSamples$L$1[$x$][$y$]$w$1+$o$1).

Here, w0, w1, o0, and o1 are weights and offsets coded with the parameter set, respectively. bitDepth is a value of a bit depth.

In the case of bi-prediction (predFlagL0=1/predFlagL1=1), the weight prediction section 3096 generates a predicted image from weighted prediction of the motion compensated image predSampleL0 of L0 or the motion compensated image predSampleL1 of L1.

(predSamples$L$0[$x$][$y$]$w$0+predSamples$L$1[$x$][$y$]$w$1+(($o$0+$o$1+1)<<log 2$Wd$))>>(log 2$Wd$+1)).

Here, w0, w1, o0, o1, and log 2Wd are values of weights and offsets coded with the parameter set, respectively. bitDepth is a value of a bit depth.

(DBBP Prediction)

In a case where the DBBP flag dbbp_flag is 1, the DBBP prediction section 3095 generates a predicted image predSamples by depth-based block partitioning (DBBP). In the depth-based block partitioning, a target block is partitioned into two regions (regions 1 and 2) based on segmentation of a depth image corresponding to the target block. The segmentation indicating region partition of an interpolated image of region 1 (hereinafter referred to as predSamplesA) and an interpolated image of region 2 (hereinafter referred to as predSamplesB) is derived and one interpolated image (predicted image) is generated by synthesizing the two interpolated images according to the segmentation.

Since appropriate partition is executing based on the depth image in DBBP, actually applied partition (segmentation) is different from the partition mode (PartMode) decoded from coded data. The prediction parameters such as a motion vector decoded from the coded data is used to derive the prediction parameter of a subsequent prediction unit or a prediction unit of another picture, it is appropriate to store a prediction parameter applied to DBBP using a partition mode close to the actual partition (segmentation) as much as possible. Accordingly, in the DBBP prediction section 3095, the partition mode PartMode from the depth image is derived by a DBBP partition mode derivation section 3094 to be described below. The DBBP prediction section 3095 substitutes the partition mode obtained through the decoding with the derived partition mode PartMode. The prediction parameter decoded by the inter-prediction parameter decoding control section 3031 is stored in the prediction parameter memory 307 according to the substituted partition mode PartMode. The segmentation indicates partition in units of pixels and the partition mode indicates partition in units of rectangles set in advance.

Figure 1:
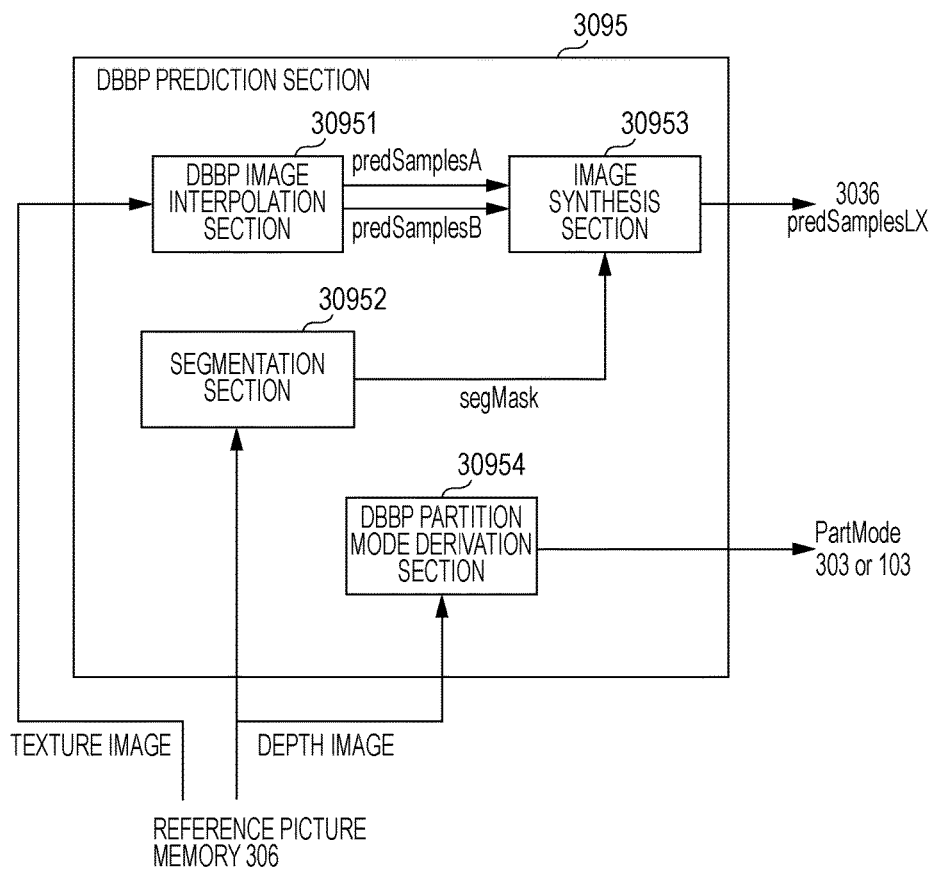
FIG. 1 is a block diagram illustrating the configuration of a DBBP prediction section 3095 according to an embodiment.

FIG. 1 is a block diagram illustrating the configuration of the DBBP prediction section 3095 according to the embodiment of the present invention. The DBBP prediction section 3095 is configured to include a DBBP image interpolation section 30951, a segmentation section 30952, an image synthesis section 30953, and a DBBP partition mode derivation section 3094. Operations of the segmentation section 30952 and the DBBP partition mode derivation section 30954 may also be executed by the prediction parameter decoding section 302 rather than a predicted image generation section 101.

(DBBP Image Interpolation Section 30951)

The DBBP image interpolation section 30951 generates two interpolated images (predSamplesA and predSamplesB) through bilinear interpolation on reference picture lists L0 and L1 based on two vectors input to the DBBP prediction section 3095. An operation of the DBBP image interpolation section 30951 on the bilinear interpolation is the same as an operation of the ARP reference image interpolation section 30922. First, integer positions xInt and yInt and phases xFrac and yFrac are derived from the motion vector mvLX by (formula C-1). Next, the positions of pixels refPicLx[xA][yA], refPicLx[xB][yB], refPicLx[xC][yC], and refPicLx[xD][yD] of four points are derived by (formula C-2). Finally, pixels are interpolated from the four points according to the phases xFrac and yFrac by (formula C-3). An image interpolation section executing common bilinear interpolation may be used as the ARP reference image interpolation section 30922 and the DBBP image interpolation section 30951.

Two interpolated images are distinguished by partIdx that has 0 or 1. That is, the DBBP image interpolation section 30951 derives an interpolated image predSamples of partIdx=0 or an interpolated image predSamples of partIdx=1. When the interpolated image predSamples of partIdx=0 is assumed to be predSamplesA, the interpolated image predSamples of partIdx=1 can be expressed as predSamplesB.

The segmentation section 30952 derives segmentation information segMask from a depth block corresponding to a target block input from the reference picture memory 306. A depth block corresponding to the target block is a block in which has the same POC as a decoding target picture and in which coordinates (xP+mvDisp[0] and xP+mvDisp[1]) on an image of a depth picture having the same view ID as the view ID (RefViewIdx) of the reference picture indicated by the disparity vector MvDisp are top left coordinates. Here, (xP, yP) indicate coordinates of the target block and MvDisp indicates a disparity vector MvDisp of the target block.

Specifically, the segmentation section 30952 derives a representative value thresVal of a pixel value of the depth block. In a case where each pixel value of the depth block is greater than the representative value thresVal, the segmentation section 30952 derives 1 as segMask[ ][ ]. In a case where each pixel value is equal to or less than the representative value thresVal, the segmentation section 30952 0 as segMask[ ][ ].

Specifically, the representative value thresVal is derived by the segmentation section 30952 by deriving a sum sumRefVals of the depth pixel refSamples[x][y] in each pixel (x=0, nCbSl-1, y=0 . . . x and y of nCbSL-1) forming a depth block by the following formula and executing right shift by a value equivalent to a logarithm of 2 of a depth block size nCbSL.

for ($y=0; y<=nCbSL-1; y++$)

for ($x=0; x<=nCbSL-1; x++$)

sumRefVals+=refSamples[$x$][$y$]

threshVal=(sumRefVals>>(2*log 2($nCbSL$)))

segMask[ ][ ] is derived by the segmentation section 30952 by obtaining a boolean value of whether the depth pixel refSamples[x][y] exceeds the representative value thresVal in each pixel (x=0 . . . nCbSL-1, y=0 . . . x and y of nCbSL-1) included in the depth block by the following formula.

segMask[$x$][$y$]=(refSamples[$x$][$y$]>threshVal).

segMask[$x$][$y$] is a block (segmentation information)

which has the same size as the target block and each pixel value of 0 or 1.

The image synthesis section 30953 derives the interpolated image predSamplesLX from segMask derived by the segmentation section 30952 and the two interpolated images (predSamplesA and predSampleB) derived by the DBBP image interpolation section 30951 in regard to the reference picture lists L0 and L1. The derived interpolated images predSamplesL0 and predSamplesL1 are output to the weight prediction section 3096.

Figure 21:
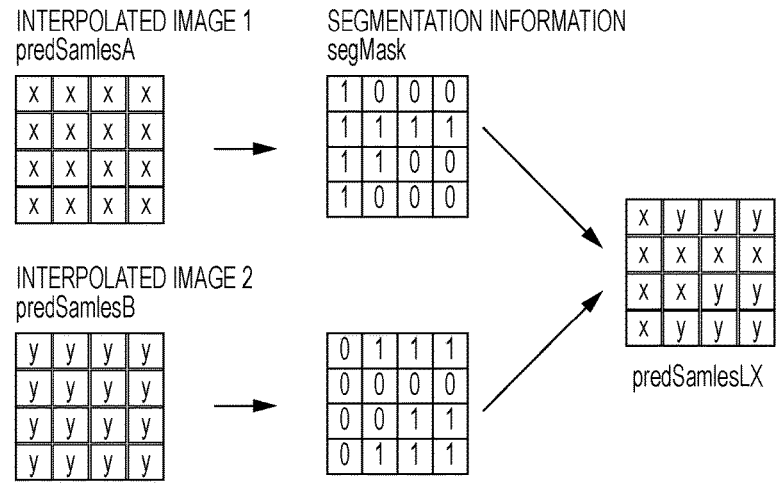
FIG. 21 is a diagram illustrating an image synthesis section 30953 according to the embodiment.

FIG. 21 is a diagram illustrating the image synthesis section 30953. The image synthesis section 30953 selects any one of the two interpolated images in units of pixels based on the segmentation information segMask and derives a predicted image predSamplesLX (here, PredSamplesDbbp) by further executing a filtering process.

Specifically, the image synthesis section 30953 first sets the interpolated image predSamples in the predicted image predSamplesDbbp according to values of partIdx for distinguishing the two interpolated images and the segmentation information segMask[x][y].

The image synthesis section 30953 may select the pixels from the two interpolated images based on the top left pixel segMask[0][0] of segMask. In this case, the image synthesis section 30953 selects the pixels from the interpolated image corresponding to partIdx different from segMask[0][0] as follows. The image synthesis section 30953 derives a flag curSegmentFlag indicating whether the values of segMask[0][0] and partIdx are the same by the following formula.

curSegmentFlag=(part$Idx$!=segMask[0][0]).

For a pixel in which the segmentation information segMask[x][y] at a pixel position (x, y) is the same as the foregoing curSegmentFlag, an interpolated image predSamples[x][y] (predSamplesL[x][y], predSamplesCb[x][y], PredSamplesCr[x][y]) corresponding to a target partIdx is allocated to an interpolated image predSamplesDbbp[x][y] (predSamplesDbbpLX[x][y], predSamplesDbbpCb[x][y], predSamplesDbbpCr[x][y]). For example, in a case where partIdx is 0 and the segmentation information segMask[0][0] of the top left pixel of a block is 0, the interpolated image predSamples[x][y] of partIdx=0 is set in PredSamplesDbbp[x][y] when the segmentation information segMask[x][y] of each pixel is 0 ((partIdx!=segMask[0][0])=(0!=0)=0). At this time, when the segmentation information segMask[x][y] of each pixel is 1, an interpolated image predSamples[x][y] of partIdx=1 is set in PredSamplesDbbp[x][y]. In a case where partIdx is 0 and the segmentation information segMask[0][0] of the top left pixel of a block is 1, the interpolated image predSamples[x][y] of partIdx=0 is set in PredSamplesDbbp[x][y] when the segmentation information segMask[x][y] of each pixel is 1 ((partIdx!=segMask[0][0])=(0!=1)=1). At this time, when the segmentation information segMask[x][y] of each pixel is 0, an interpolated image predSamples[x][y] of partIdx=1 is set in PredSamplesDbbp[x][y].

In conclusion, the image synthesis section 30953 allocates the interpolated image predSamples to the predicted image PredSampleDbbp according to the segmentation information segMask[x][y] of each pixel by the following formula.

```
        for (y = 0; y < nCbSL; y++) {
            for (x = 0; x < nCbSL; x++) {
                if (segMask[x] [y] == (partIdx ! = segMask[0] [0]))
                    PredSamplesDbbpL[x] [y] = predSamplesL[x] [y]
                if ((x % 2 == 0) && (y % 2 == 0)) {
                    PredSamplesDbbpCb[x/2] [y/2] =
predSamplesCb[x/2] [y/2]
                    PredSamplesDbbpCr[x/2] [y/2] =
predSamplesCr[x/2] [y/2]
                }
            }
        }
```

The image synthesis section 30953 further applies a filter to each pixel according to the segmentation information segMask[x][y]. The image synthesis section 30953 applies another filter according to the partition mode. Specifically, the image synthesis section 30953 applies a filter in the horizontal direction according to the segmentation information in a case where a target PU is vertically long (a case where partMode is N×2N). The image synthesis section 30953 applies a filter in the horizontal direction according to the segmentation information in a case where the target PU is horizontally long (a case where partMode is 2N×N).

Specifically, in the case where the target PU is vertically long (a case where partMode is N×2N), the image synthesis section 30953 refers to the segmentation information cFlag (=segMask[x][y]) of a target pixel, the segmentation information lFlag (=segmask[x−1][y]) of a pixel adjacent on the left side, and the segmentation information rFlag (segMask[x+1][y]) of a pixel adjacent to the right side. In a case where the pieces of segmentation information are different, a filter using a weight of 1:2:1 to the left pixel p[x−1][y], the target pixel p[x][y], and the right pixel p[x+1][y] is applied.

In a case where the target PU is horizontally long (part-Mode is 2N×N), the image synthesis section 30953 refers to segmentation information cFlag (=segMask[x][y]) of a target pixel, segmentation information tFlag (=segMask[x][y−1]) of a pixel adjacent to the top side, and segmentation information bFlag (=segMask[x][y+1]) of a pixel adjacent to the bottom side. In a case where the pieces of segmentation information are different, a filter using a weight of 1:2:1 to the top pixel p[x][y−1], the target pixel p[x][y], and the bottom pixel p[x][y+1] is applied. Pseudocodes of this process are as follows.

```
    for (y = 0; y < nCbSX; y++)
        for (x = 0; x < nCbSX; x++) {
            cFlag = segMask[n * x] [n * y]
            if (partMode = Nx2N) {
                lFlag = segMask[Max(0, (n * (x − 1))] [n * y]
                rFlag = segMask[Min(n * (x + 1), nCbSL − 1)] [n * y]
                if ((lFlag || cFlag || rFlag) && (! lFlag || ! cFlag || ! rFlag))     condition A-1
                    predSamples[x] [y] = (p[Max(0, x − 1)] [y] +
(p[x] [y] << 1) + p[Min(x + 1, nCbSX − 1)] [y]) >> 2
                formula B-1
            } else {// partMode = 2NxN
                tFlag = segMask[n * x] [Max(0, n * (y − 1))]
                bFlag = segMask[n * x] [Min(n * (y + 1), nCbSL − 1)]
                if ((tFlag || cFlag || bFlag) && (! tFlag || ! cFlag || ! bFlag))    condition A-2
                    predSamples[x] [y] = (p[x] [Max(0, y − 1)] +
(p[x] [y] << 1) + p[x] [Min(y + 1, nCbSX − 1)]) >> 2
            formula B-2
            }
        }
```

Here, nCbSx indicates the size of a target block, cFlag, lFlag, rFlag, tFlag, and bFlag are pieces of segmentation information of a target pixel, a left adjacent pixel, a right adjacent pixel, a top adjacent pixel, and a bottom adjacent pixel, p[x][y] is an image before filtering (a blended image predSamplesDbbp), predSamples[x][y] is an image subjected to a filtering process, and n is an integer of 1 in luminance and is an integer of 2 in chroma. In general, luminance has resolution which is twice chroma and the segmentation information is generated with the resolution of luminance. Accordingly, for the segmentation information, segmentation information of resolution of luminance can be referred to even in chroma by referring to segMask[n*x][n*y] or the like and coordinates multiplied by n (n*x, n*y).

Condition A-1 indicates that one of lFlag, cFlag, and rFlag is 1 and one of lFlag, cFlag, and rFlag is 0 and corresponds to a case other than a case where all of lFlag, cFlag, and rFlag are 1 or 0. In the end, condition A-1 is identical to the following condition A-1' indicating that cFlag and lFlag are different or cFlag and rFlag are different.

$$(cFlag!=lFlag)||(cFlag!=rFlag) \qquad \text{condition A-1'}.$$

Similarly, condition A-2 indicates that one of tFlag, cFlag, and bFlag is 1 and one of tFlag, cFlag, and bFlag is 0 and tFlag and lFlag are different or is identical to the following condition A-2' indicating cFlag and bFlag are different.

$$(cFlag!=tFlag)||(cFlag!=bFlag) \qquad \text{condition A-2'}.$$

Max(0, n*(x−1)), Max(0, n*(y−1)), Min(n*(x+1), nCbSL−1), Min(n*(y+1), nCbSL−1) are a process of executing clipping so that coordinates of left (x−1), bottom (y−1), right (x+1), and top (y−1) of the position (x, y) of a target image are in the same CU as a target CU.

A rounding constant of the filter with the weight of 1:2:1 is 0 indicating cutoff, but may be 2 indicating round-off. That is, the processes of formulae B-1 and B-2 may be substituted with processes of the following formulae B-1A and B-2A.

$$predSamples[x][y]=(p[Max(0,x-1)][y]+(p[x][y]<<1)+$$
$$p[Min(x+1,nCbSX-1)][y]+2)>>2 \qquad \text{formula B-1A;}$$

and $$predSamples[x][y]=(p[x][Max(0,y-1)]+(p[x][y]<<1)+$$
$$p[x][Min(y+1,nCbSX-1)]+2)>>2 \qquad \text{formula B-2A.}$$

In this case, pseudocodes of the image synthesis section 30953 are as follows.

```
    for (y = 0; y < nCbSX; y++)
        for(x = 0; x < nCbSX; x++) {
            cFlag = segMask[n * x] [n * y]
            if (partMode = Nx2N) {
                lFlag = segMask[Max(0, (n * (x − 1))] [n * y]
                rFlag = segMask[Min(n * (x + 1), nCbSL − 1)] [n * y]
                if ((lFlag || cFlag || rFlag) && (! lFlag || ! cFlag || ! rFlag))
                    predSamples [x] [y] = (p[Max(0, x − 1)] [y] +
(p[x] [y] << 1) + p[Min(x + 1, nCbSX − 1)] [y] + 2) >> 2
                formula B-1A
            } else {// partMode = 2NxN
                tFlag = segMask[n * x] [Max(0, n * (y − 1))]
                bFlag = segMask[n * x] [Min(n * (y + 1), nCbSL − 1)]
```

-continued

```
    if ((tFlag || cFlag || bFlag) && (! tFlag || !
cFlag || ! bFlag))
            predSamples[x] [y] = (p[x] [Max(0, y - 1)] +
(p[x] [y] << 1) + p[x] [Min(y + 1, nCbSX - 1)] + 2) >> 2
    formula B-2A
        }
    }
```

Comparative Example

A DBBP prediction section 30950 according to a comparative example is configured to include a DBBP image interpolation section 30951, a segmentation section 30952, an image synthesis section 309530, and a DBBP partition mode derivation section 3094.

The image synthesis section 309530 applies a filter to each pixel according to the segmentation information segMask[x][y]. Specifically, the image synthesis section 30953A refers to the segmentation information cFlag (=segMask[x][y]) of a target pixel, the segmentation information lFlag (segmask[x−1][y]) of a pixel adjacent on the left side, and the segmentation information rFlag (segMask[x+1][y]) of a pixel adjacent to the right side. In a case where the pieces of segmentation information are different, a filter using a weight of 1:2:1 to the left pixel p[x−1][y], the target pixel p[x][y], and the right pixel p[x+1][y] is applied. Subsequently, the image synthesis section 30953 refers to segmentation information cFlag (=segMask[x][y]) of a target pixel, segmentation information tFlag (=segMask[x][y−1]) of a pixel adjacent to the top side, and segmentation information bFlag (=segMask[x][y+1]) of a pixel adjacent to the bottom side. In a case where the pieces of segmentation information are different, a filter using a weight of 1:2:1 to the top pixel p[x][y−1], the target pixel p[x][y], and the bottom pixel p[x][y+1] is applied. Pseudocodes of this process are as follows.

```
for (y = 0; y < nCbSX; y++)
    for(x = 0; x < nCbSX; x++) {
        tFlag = segMask[n * x] [Max(0, n * (y - 1))]
        lFlag = segMask[Max(0, (n * (x - 1))] [n * y]
        bFlag = segMask[n * x] [Min(n * (y + 1), nCbSL - 1)]
        rFlag = segMask[Min(n * (x + 1), nCbSL - 1)] [n * y]
        cFlag = segMask[n * x] [n * y]
        filt = p[x] [y]
        if ((lFlag || cFlag || rFlag) && (! lFlag || ! cFlag
|| ! rFlag))
            filt = (p[Max(0, x - 1)] [y] + (filt << 1) + p[Min(x
+ 1, nCbSX - 1)] [y]) >> 2
        if ((tFlag || cFlag || bFlag) && (! tFlag || ! cFlag
|| ! bFlag))
            filt = (p[x] [Max(0, y - 1)] + (filt << 1) +
p[x] [Min(y + 1, nCbSX - 1)]) >> 2
        predSamples[x] [y] = filt
    }
```

The image synthesis section 309530 according to the comparative example determines whether there is a filter with reference to segmentation information segMask[ ][ ] of four points top, bottom, left, and right of each pixel of a target block as adjacent pixels, and therefore complexity of the determination process is considerable. The image synthesis section 309530 applies to two filters (a vertical filter after a horizontal filter), and therefore complexity of the filters is considerable.

The image synthesis section 30953 according to the embodiment (and a modification example to be described below) refers to either the segmentation information segMask[ ][ ] of two points left and right of each pixel of a target block as adjacent pixels (condition A-1) or the segmentation information segMask[ ][ ] of two points top and bottom of each pixels of the target block as adjacent pixels (condition A-2). Therefore, it is possible to obtain the advantageous effect that complexity of the determination of whether there is a filter, compared to the comparison example in which the determination is executed horizontally and horizontally twice. The image synthesis section 30953 applies the horizontal filter (formula B-1) or the vertical filter (formula B-2) which is one filter. Therefore, it is possible to obtain the advantageous effect that complexity of the filter is low, compared to the comparative example in which the filter is applied horizontally and horizontally twice. The image synthesis section 30953 uses a partition type partMode in regard to the position (disposition or direction) of segmentation information referred to in the determination and the position (disposition or direction) of a pixel used for a filter. However, a result already derived by the DBBP partition mode derivation section 30954 can be used without change. Therefore, it is not necessary to newly introduce derivation of the partition mode partMode for a filter of the image synthesis section 30953.

According to experiments of the inventor, while the image synthesis section 30953 according to the embodiment realizes a reduction of a processing amount, the image synthesis section 309530 according to the comparative example can realize coding efficiency of the same degree.

(DBBP Prediction Section 3095A)

A DBBP prediction section 3095A according a modification example is configured to include a DBBP image interpolation section 30951, a segmentation section 30952, an image synthesis section 30953A, and a DBBP partition mode derivation section 3094. As in the image synthesis section 30953A or the image synthesis section 30953, a horizontal filter or a vertical filter is applied according to the partition mode partMode. The image synthesis section 30953B is characterized in that rounding of a filtering process is changed according to the partition mode partMode. In a case where the partition mode partMode is N×2N indicates vertical longness, formula B-1 which a rounding constant is 0 is used. In a case where the partition mode partMode is 2N×N indicates horizontal longness, formula B-2A which a rounding constant is 2 is used. The rounding constant is not limited to 2, but an integer equal to or greater than 1 can be used. In particular, to execute the filtering process as integer calculation, the rounding constant may be an integer of 1<<(M−1) in a case where right shift is used after weighted addition is used and a case where a right shift amount is M bits. For example, since M=2 in this example, 2 is used as the rounding constant. Pseudocodes of the image synthesis section 30953A are indicated below.

```
for (y = 0; y < nCbSX; y++)
    for (x = 0; x < nCbSX; x++) {
        cFlag = segMask[n * x] [n * y]
        if (partMode = Nx2N) {
            lFlag = segMask[Max(0, (n * (x - 1))] [n * y]
            rFlag = segMask[Min(n * (x + 1), nCbSL - 1)] [n *
y]
            if ((lFlag || cFlag || rFlag) && (! lFlag || !
cFlag || ! rFlag))      condition A-1
                predSamples[x] [y] = (p[Max(0, x - 1)] [y] +
(p[x] [y] << 1) + p[Min(x + 1, nCbSX - 1)] [y]) >> 2
            formula B-1
        } else {// partMode = 2NxN
```

-continued

```
        tFlag = segMask[n * x] [Max(0, n * (y - 1))]
        bFlag = segMask[n * x] [Min(n * (y + 1), nCbSL -
1)]
        if ((tFlag || cFlag || bFlag) && (! tFlag || !
cFlag || ! bFlag))    condition A-2
            predSamples[x] [y] = (p[x] [Max(0, y - 1)] +
(p[x] [y] << 1) + p[x] [Min(y + 1, nCbSX - 1)] + 2) >> 2
            formula B-2A
        }
    }
```

In general, by using an integer indicating 1<<(M−1) as the integer for the rounding process in a case where the right shift is M bits at the time of filtering, it is possible to obtain a high value of high precision in a case where integer precision is lowered after calculation with higher precision than the integer precision by 1<<M bits. However, when 1<<(M−1) is used at the time of rounding, there is a problem that an average component (direct-current component) is overall increased more than the original value in a large area in a case where the filtering process is applied to the large area. Therefore, it is better to use 0 as the integer for the rounding process in some cases. A preferable integer for the rounding process is different depending on a region. When an integer for the rounding process is changed according to a condition as in the image synthesis section 30953B, a preferable integer can be indirectly selected on the side of the image coding device although the integer for the rounding process is not explicitly coded.

As will be described, in a case where the partition mode partMode is N×2N indicating vertical longness, the DBBP prediction section 3095A according to the modification example uses formula B-1A in which the rounding constant is 2 (an integer equal to or greater than 1). In a case where the partition mode partMode is 2N×N indicating horizontal longness, the DBBP prediction section 3095A uses formula B-2 in which the rounding constant is 0.

```
    for (y = 0; y < nCbSX; y++)
        for (x = 0; x < nCbSX; x++) {
            cFlag = segMask[n * x] [n * y]
            if (partMode = Nx2N) {
                lFlag = segMask[Max(0, (n * (x - 1))] [n * y]
                rFlag = segMask[Min(n * (x + 1), nCbSL - 1)] [n *
y]
                if ((lFlag || cFlag || rFlag) && (! lFlag || !
cFlag || ! rFlag))    condition A-1
                    predSamples[x] [y] = (p[Max(0, x - 1)] [y] +
(p[x] [y] << 1) + p[Min(x + 1, nCbSX - 1)] [y] + 2) >> 2
                    formula B-1A
            } else {// partMode = 2NxN
                tFlag = segMask[n * x] [Max(0, n * (y - 1))]
                bFlag = segMask[n * x] [Min(n * (y + 1), nCbSL -
1)]
                if ((tFlag || cFlag || bFlag) && (! tFlag || !
cFlag || !bFlag))    condition A-2
                    predSamples[x] [y] = (p[x] [Max(0, y - 1)] +
(p[x] [y] << 1) + p[x] [Min(y + 1, nCbSX - 1)]) >> 2
                    formula B-2
            }
        }
```

The image synthesis section 30953A having the foregoing configuration changes a value of the rounding constant according to the partition mode, and therefore it is possible to obtain the advantageous effect of improving coding efficiency.

(Image Synthesis Section 30953B)

The DBBP prediction section 3095B according to the modification example is configured to include a DBBP image interpolation section 30951, a segmentation section 30952, an image synthesis section 30953B, and a DBBP partition mode derivation section 3094. Hereinafter, the image synthesis section 30953 which is a modification example of the image synthesis section 30953B will be described. As in the image synthesis section 30953C or the image synthesis section 30953, a horizontal filter or a vertical filter is applied according to the partition mode partMode. The image synthesis section 30953B is characterized in that a rounding of a filtering process is changed according to whether a target pixel (component) is luminance or chroma. Specifically, in a case where the target pixel is luminance, 2 is set as the rounding constant. In a case where the target pixel is chroma, 0 is set as the rounding constant. The rounding constant is not limited to 2, but an integer equal to or greater than 1 can be used. In particular, in a case where right shift is M bits at the time of filtering, an integer indicating 1<<(M−1) is good. For example, since M=2 in this example, 2 is used. Pseudocodes of the image synthesis section 30953B are indicated below.

```
    for (y = 0; y < nCbSX; y++)
        for (x = 0; x < nCbSX; x++) {
            cFlag = segMask[n * x] [n * y]
            if (partMode = Nx2N) {
                lFlag = segMask[Max(0, (n * (x - 1))] [n * y]
                rFlag = segMask[Min(n * (x + 1), nCbSL - 1)] [n *
y]
                if ((lFlag || cFlag || rFlag) && (! lFlag || !
cFlag || ! rFlag))    condition A-1
                    predSamples[x] [y] = (p[Max(0, x - 1)] [y] +
(p[x] [y] <<1) + p[Min(x + 1, nCbSX - 1)] [y] + (cIdx == 0) ?
2 : 0) >> 2         formula B-1B
            } else {// partMode = 2NxN
                tFlag = segMask[n * x] [Max(0, n * (y - 1))]
                bFlag = segMask[n * x] [Min(n * (y + 1), nCbSL -
1)]
                if ((tFlag || cFlag || bFlag) && (! tFlag || !
cFlag || ! bFlag))    condition A-2
                    predSamples[x] [y] = (p[x] [Max(0, y - 1)] +
(p[x] [y] << 1) + p[x] [Min(y + 1, nCbSX - 1)] + (cIdx == 0) ?
2 : 0) >> 2         formula B-2B
            }
        }
```

A process of (cIdx==0) ? 2:0 of formulae B-1B and B-2B is a process of setting 2 as the rounding constant in the case of luminance and setting 0 as the rounding constant in the case of chroma in which n=2. Another variable (here n) changed according to luminance or chroma may be used or switched. For example, when (n==1) ? 2:0 is used instead of (cIdx==0) ? 2:0, 2 is used as the rounding constant because of n=1 in the case of luminance and 0 is used as the rounding constant because of n=2 in the case of chroma.

The DBBP prediction section 3095B according to the modification example may set 0 as the rounding constant in a case where the target pixel is luminance and may set 2 as the rounding constant in a case where the target pixel is chroma as in the following pseudocodes.

```
    for (y = 0; y < nCbSX; y++)
        for (x = 0; x < nCbSX; x++) {
            cFlag = segMask[n * x] [n * y]
            if (partMode = Nx2N) {
                lFlag = segMask[Max(0, (n * (x - 1))] [n * y]
                rFlag = segMask[Min(n * (x + 1), nCbSL - 1)] [n *
y]
                if ((lFlag || cFlag || rFlag) && (!lFlag || !
cFlag || ! rFlag))    condition A-1
                    predSamples[x] [y] = (p[Max(0, x - 1)] [y] +
```

-continued

```
         (p[x] [y] << 1) + p[Min(x + 1, nCbSX - 1)] [y] + (cIdx == 0) ?
         0 : 2) >> 2
             } else {// partMode = 2NxN
             tFlag = segMask [n * x] [Max(0, n * (y - 1))]
             bFlag = segMask[n * x] [Min(n * (y + 1), nCbSL -
1)]
             if((tFlag || cFlag || bFlag) && (!tFlag || ! cFlag
|| ! bFlag))        condition A-2
                 predSamples[x] [y] = (p[x] [Max(0, y - 1)] +
         (p[x] [y] << 1) + p[x] [Min(y + 1, nCbSX - 1)] + (cIdx == 0) ?
         0 : 2) >> 2
                }
             }
```

A process of (cIdx==0) ? 0:2 is a process of setting 0 as the rounding constant in the case of luminance and setting 2 as the rounding constant in the case of chroma in which n=2.

When an integer for the rounding process is changed according to a condition as in the image synthesis section 30953B, a preferable integer can be indirectly selected on the side of the image coding device although the integer for the rounding process is not explicitly coded.

The image synthesis section 30953B having the foregoing configuration changes a value of the rounding constant according to luminance or chroma, and therefore it is possible to obtain the advantageous effect of improving coding efficiency.

(DBBP Partition Mode Derivation Section 30954)

The DBBP partition mode derivation section 30954 derives the partition mode partMode from the depth block refSamples corresponding to a target block. Specifically, sums partSum[0], partSum[1], partSum[2], partSum[3], partSum[4], and partSum[5] corresponding to N×2N (SIZE_N×2N), 2N×N (SIZE_2N×N), 2N×nU (SIZE_2N×nU), 2N×nD (SIZE_2N×nD), nL×2N (SIZE_nL×2N), nR×2N (SIZE_nR×2N) which are partition modes in which 2N×2N are partitioned into two pieces as partition modes PartMode as in the following formula based on the segmentation information segMask derived from the depth block refSamples are derived based on the following pseudocodes at x and y (x=0 . . . nCbS−1, y=0 . . . nCbS−1) of the target block.

```
         for (y = 0; y < nCbS; y ++)
             for (x = 0; x < nCbS; x ++) {
                 segFlag = segMask[x] [y]
                 partSum[0] [(x < (nCbS >> 1)) ? segFlag :! segFlag] ++
                 partSum[1] [(y < (nCbS >> 1)) ? segFlag :!
segFlag] ++
                 if (nCbS > 8) {
                     partSum[2] [(y < (nCbS >> 2)) ? segFlag :!
segFlag] ++
                     partSum[3] [(y < (nCbS >> 2 + nCbS >> 1)) ?
segFlag :! segFlag] ++
                     partSum[4] [(x < (nCbS >> 2)) ? segFlag :!
segFlag ]++
                     partSum[5] [(x < (nCbS >> 2 + nCbS >> 1)) ?
segFlag :! segFlag ] ++
                 }
             }
```

Further, the DBBP partition mode derivation section 30954 derive p in which partSum[p] is maximum in p=0 . . . 5 and derives the partition mode corresponding to p on the assumption that p=0.5 corresponds to SIZE_N×2N, SIZE_2N×N, SIZE_2N×nU, SIZE_2N×nD, SIZE_nL×2N, SIZE_nR×2N. For example, in a case of p=0, SIZE_N×2N is obtained.

```
         partIdc = 0
         maxPartSum = 0
         for (p = 0; p < 6; p++)
             for (i = 0; i < 2; i++) {
                 if (partSum[p] [i] > maxPartSum) {
                     maxPartSum = partSum[p] [i]
                     partIdc = p
                 }
             }
```

In the DBBP prediction section 3095 described above and the DBBP prediction section 3095A and the DBBP prediction section 3095B according to the modification examples, the following DBBP partition mode derivation section 30954A and DBBP partition mode derivation section 30954B can be used instead of the DBBP partition mode derivation section 30954.

(DBBP Partition Mode Derivation Section 30954A)

The DBBP partition mode derivation section 30954A derives p in which partSum[p] is maximum in p=0 . . . 1 and derives the partition mode corresponding to p on the assumption that p=0 . . . 1 corresponds to SIZE_N×2N and SIZE_2N×N.

```
         partIdc = 0
         maxPartSum = 0
         for (p = 0; p < 2; p++)
             for (i = 0; i < 2; i++) {
                 if (partSum[p] [i] > maxPartSum) {
                     maxPartSum = partSum[p] [i]
                     partIdc = p
                 }
             }
```

The DBBP partition mode derivation section 30954A sets only two partition modes N×2N and 2N×N of symmetric partition as targets without deriving asymmetric partition (AMP partition, SIZE_2N×nU, SIZE_2N×nD, SIZE_nL×2N, and SIZE_nR×2N) as the partition mode.

(DBBP Prediction Section 3095B)

The DBBP partition mode derivation section 30954B decides the partition mode PartMode with reference to only four corner pixels of a target block of refSamples (hereinafter referred to as refDepPels) corresponding to the target block, as illustrated in FIG. 13.

Specifically, coordinates xP0, xP0, yP0, and yP1 corresponding to the top left coordinate (xP0, yP0), the top right coordinates (xP1, yP0), the bottom left coordinates (xP0, xP1) and the bottom right coordinates (xP1, yP1) are derived by the following formulae.

$$xP0=Clip3(0,pic\_width\_in\_luma\_samples-1,xTL);$$

$$yP0=Clip3(0,pic\_height\_in\_luma\_samples-1,yTL);$$

$$xP1=Clip3(0,pic\_width\_in\_luma\_samples-1,xTL+nPSW-1); \text{ and}$$

$$yP1=Clip3(0,pic\_height\_in\_luma\_samples-1,yTL+nPSH-1).$$

Further, the splitting flag horSplitFlag is derived by the following formula from comparison (refDepPels[xP0][yP0]<refDepPels[xP1][yP1]) between the top left pixel TLrefDepPels[xP0][yP0] and the bottom right pixel BR and comparison (refDepPels[xP1][yP0]<refDepPels[xP0][yP1]) between the bottom left pixel BLrefDepPels[xP0][yP0] and the top right pixel TR.

horSplitFlag=(refDepPels[*xP*0][*yP*0]<refDepPels [*xP*1][*yP*1])==(refDepPels[*xP*1][*yP*0]<refDepPels[*xP*0][*yP*1])).

The DBBP partition mode derivation section 30954B allocates 2N' N or N' 2N according to the splitting flag horSplitFlag. Specifically, the partition mode PartMode is derived by allocating 2N' N in a case where horSplitFlag is 1 and by allocating N' 2N in a case where horSplitFlag is 0.

(Configuration of Image Coding Device)

Figure 22:
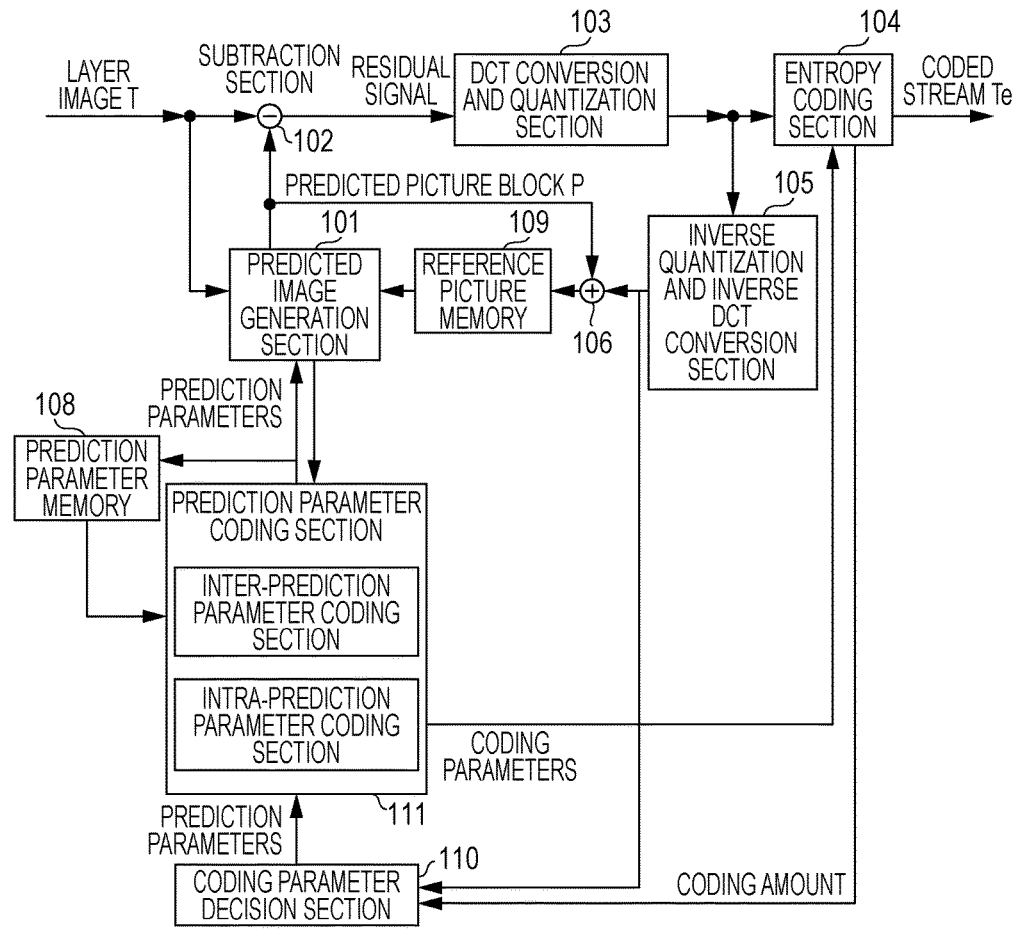
FIG. 22 is a block diagram illustrating the configuration of an image coding device 11 according to the embodiment.

Next, the configuration of the image coding device 11 according to the embodiment will be described. FIG. 22 is a block diagram illustrating the configuration of an image coding device 11 according to the embodiment. The image coding device 11 is configured to include the predicted image generation section 101, a subtraction section 102, a DCT and quantization section 103, an entropy coding section 104, an inverse quantization and inverse DCT section 105, an addition section 106, a prediction parameter memory (a prediction parameter storage section or a frame memory) 108, a reference picture memory (a reference image storage section or a frame memory) 109, a coding parameter decision section 110, and a prediction parameter coding section 111. The prediction parameter coding section 111 is configured to include an inter-prediction parameter coding section 112 and an intra-prediction parameter coding section 113.

The predicted image generation section 101 generates the predicted picture block predSamples for each block which is a region separated from each picture in regard to the picture at each viewpoint of the layer image T input from the outside. Here, the predicted image generation section 101 reads the reference picture block from the reference picture memory 109 based on the prediction parameter input from the prediction parameter coding section 111. The prediction parameter input from the prediction parameter coding section 111 is, for example, the motion vector or the disparity vector. The predicted image generation section 101 reads the reference picture block of the block located at a position indicated by the motion vector or the disparity vector predicated using a coding prediction unit as an origin. The predicted image generation section 101 generates the predicted picture block predSamples using one prediction scheme among a plurality of prediction schemes in regard to the read reference picture block. The predicted image generation section 101 outputs the generated predicted picture block predSamples to the subtraction section 102 and the addition section 106. Since the operation of the predicted image generation section 101 is the same as the operation of the predicted image generation section 308 described above, the details of the generation of the predicted picture block predSamples will be omitted.

To select the prediction scheme, the predicted image generation section 101 selects, for example, a prediction scheme in which an error value based on a difference between a signal value for each pixel of the block included in the layer image and a signal value for each pixel corresponding to the predicted picture block predSamples is the minimum. The method of selecting the prediction scheme is not limited thereto.

When a coding target picture is a base view picture, the plurality of prediction schemes are intra-prediction, motion prediction, and merge prediction. The motion prediction is display inter-temporal prediction among the above-described inter-prediction. The merge prediction is prediction in which the same reference picture block as a block which is the already coded block and is a block within a pre-decided range from the prediction unit and the prediction parameters are used. In a case where the coding target picture is a picture other than the base view picture, the plurality of prediction schemes are intra-prediction, motion prediction, a merge mode (including viewpoint synthesis prediction), and disparity prediction. The disparity prediction (parallax prediction) is prediction between different layer images (different viewpoint images) in the above-described inter-prediction. In the disparity prediction (parallax prediction), there are prediction in a case where the additional prediction (the residual prediction and the illumination compensation) is executed and prediction when the additional prediction is not executed.

In a case where the intra-prediction is selected, the predicted image generation section 101 outputs the prediction mode predMode indicating the intra-prediction mode used at the time of the generation of the predicted picture block predSamples to the prediction parameter coding section 111.

In a case where the motion prediction is selected, the predicted image generation section 101 stores the motion vector mvLX used at the time of the generation of the predicted picture block predSamples in the prediction parameter memory 108 and outputs the motion vector mvLX to the inter-prediction parameter coding section 112. The motion vector mvLX indicates a vector from the position of the coding prediction unit to the position of the reference picture block at the time of the generation of the predicted picture block predSamples. Information indicating the motion vector mvLX includes information (for example, the reference picture index refIdxLX or the picture order number POC) indicating the reference picture and may indicate the prediction parameter. The predicted image generation section 101 outputs a prediction mode PredMode indicating the inter-prediction mode to the prediction parameter coding section 111.

In a case where the disparity prediction is selected, the predicted image generation section 101 stores the disparity vector used at the time of the generation of the predicted picture block predSamples in the prediction parameter memory 108 and outputs the disparity vector to the inter-prediction parameter coding section 112. The disparity vector dvLX indicates a vector from the position of the coding prediction unit to the position of the reference picture block at the time of the generation of the predicted picture block predSamples. Information indicating the disparity vector dvLX includes information (for example, the reference picture index refIdxLX or the view ID view_id) indicating the reference picture and may indicate the prediction parameter. The predicted image generation section 101 outputs a prediction mode predMode indicating the inter-prediction mode to the prediction parameter coding section 111.

In a case where the merge mode is selected, the predicted image generation section 101 outputs the merge index merge_idx indicating the selected reference picture block to the inter-prediction parameter coding section 112. Further, the predicted image generation section 101 outputs a prediction mode predMode indicating the merge mode to the prediction parameter coding section 111.

In a case where the VSP mode flag VspModeFlag indicates that the predicted image generation section 101 executes the viewpoint synthesis prediction in the merge mode described above, the VSP prediction section 30374 included in the predicted image generation section 101, as described above, executes the viewpoint synthesis prediction. In a case where the residual prediction execution flag resPredFlag indicates that the predicted image generation section 101 executes the residual prediction, the residual prediction section 3092 included in the predicted image generation section 101, as described above, executes the residual prediction.

The subtraction section 102 generates a residual signal by subtracting a signal value of the predicted picture block predSamples input from the predicted image generation section 101 for each pixel from a signal value of the block corresponding to the layer image T input from the outside. The subtraction section 102 outputs the generated residual signal to the DCT and quantization section 103 and the coding parameter decision section 110.

The DCT and quantization section 103 executes DCT on the residual signal input from the subtraction section 102 to calculate a DCT coefficient. The DCT and quantization section 103 quantizes the calculated DCT coefficient to obtain a quantization coefficient. The DCT and quantization section 103 outputs the obtained quantization coefficient to the entropy coding section 104 and the inverse quantization and inverse DCT section 105.

The quantization coefficient is input from the DCT and quantization section 103 to the entropy coding section 104 and the coding parameters are input from the coding parameter decision section 110 to the entropy coding section 104. As the input coding parameters, for example, there are codes such as the reference picture index refIdxLX, the prediction vector flag mvp_LX_flag, the difference vector mvdLX, the prediction mode PredMode, the merge index merge_idx, the residual prediction index iv_res_pred_weight_idx, and the illumination compensation flag ic_flag.

The entropy coding section 104 executes entropy coding on the input quantization coefficient and coding parameters to generate the coded stream Te and outputs the generated coded stream Te to the outside.

The inverse quantization and inverse DCT section 105 executes inverse quantization on the quantization coefficient input from the DCT and quantization section 103 to obtain a DCT coefficient. The inverse quantization and inverse DCT section 105 executes the inverse DCT on the obtained DCT coefficient to calculate a decoding residual signal. The inverse quantization and inverse DCT section 105 outputs the calculated decoding residual signal to the addition section 106 and the coding parameter decision section 110.

The addition section 106 adds a signal value of the predicted picture block predSamples input from the predicted image generation section 101 and a signal value of the decoding residual signal input from the inverse quantization and inverse DCT section 105 for each pixel to generate a reference picture block. The addition section 106 stores the generated reference picture block in the reference picture memory 109.

The prediction parameter memory 108 stores the prediction parameter generated by the prediction parameter coding section 111 at a position decided in advance for each coding target picture and block.

The reference picture memory 109 stores the reference picture block generated by the addition section 106 at a position decided in advance for each coding target picture and block.

The coding parameter decision section 110 selects one set from a plurality of sets of coding parameters. The coding parameters are the above-described prediction parameters or parameters which are coding targets generated in association with the prediction parameters. The predicted image generation section 101 generates the predicted picture block predSamples using each set of coding parameters.

The coding parameter decision section 110 calculates a cost value indicating the size of an information amount or a coding error in each of the plurality of sets. The cost value is, for example, a sum of the coding amount and a value obtained by multiplying a squared error by a coefficient $\lambda$. The coding amount is an information amount of the coded stream Te obtained by executing the entropy coding on a quantized error and the coding parameter. The squared error is a total sum of squared values of residual values of residual signals calculated in the subtraction section 102 between the pixels. The coefficient $\lambda$ is a larger real number than preset zero. The coding parameter decision section 110 selects the set of coding parameters for which the calculated cost value is the minimum. In this way, the entropy coding section 104 outputs the selected set of coding parameters as the coded stream Te to the outside and does not output the unselected set of coding parameters.

The prediction parameter coding section 111 derives the prediction parameters used at the time of the generation of the predicted picture based on the parameter input from the predicted image generation section 101 and codes the derived prediction parameter to generate the set of coding parameters. The prediction parameter coding section 111 outputs the generated set of coding parameters to the entropy coding section 104.

The prediction parameter coding section 111 stores the prediction parameter corresponding to the set of coding parameters selected by the coding parameter decision section 110 among the generated sets of coding parameters in the prediction parameter memory 108.

In a case where the prediction mode PredMode input from the predicted image generation section 101 is the inter-prediction mode, the prediction parameter coding section 111 causes the inter-prediction parameter coding section 112 to operate. In a case where the prediction mode PredMode indicates the intra-prediction mode, the prediction parameter coding section 111 causes the intra-prediction parameter coding section 113 to operate.

The inter-prediction parameter coding section 112 derives the inter-prediction parameter based on the prediction parameter input from the coding parameter decision section 110. The inter-prediction parameter coding section 112 has the same configuration as the configuration in which the inter-prediction parameter decoding section 303 derives the inter-prediction parameter as the configuration in which the inter-prediction parameter is derived. The configuration of the inter-prediction parameter coding section 112 will be described below.

The intra-prediction parameter coding section 113 decides an intra-prediction mode IntraPredMode indicated by the prediction mode PredMode input from the coding parameter decision section 110 as the set of inter-prediction parameter.

(Configuration of Inter-Prediction Parameter Coding Section)

Figure 23:
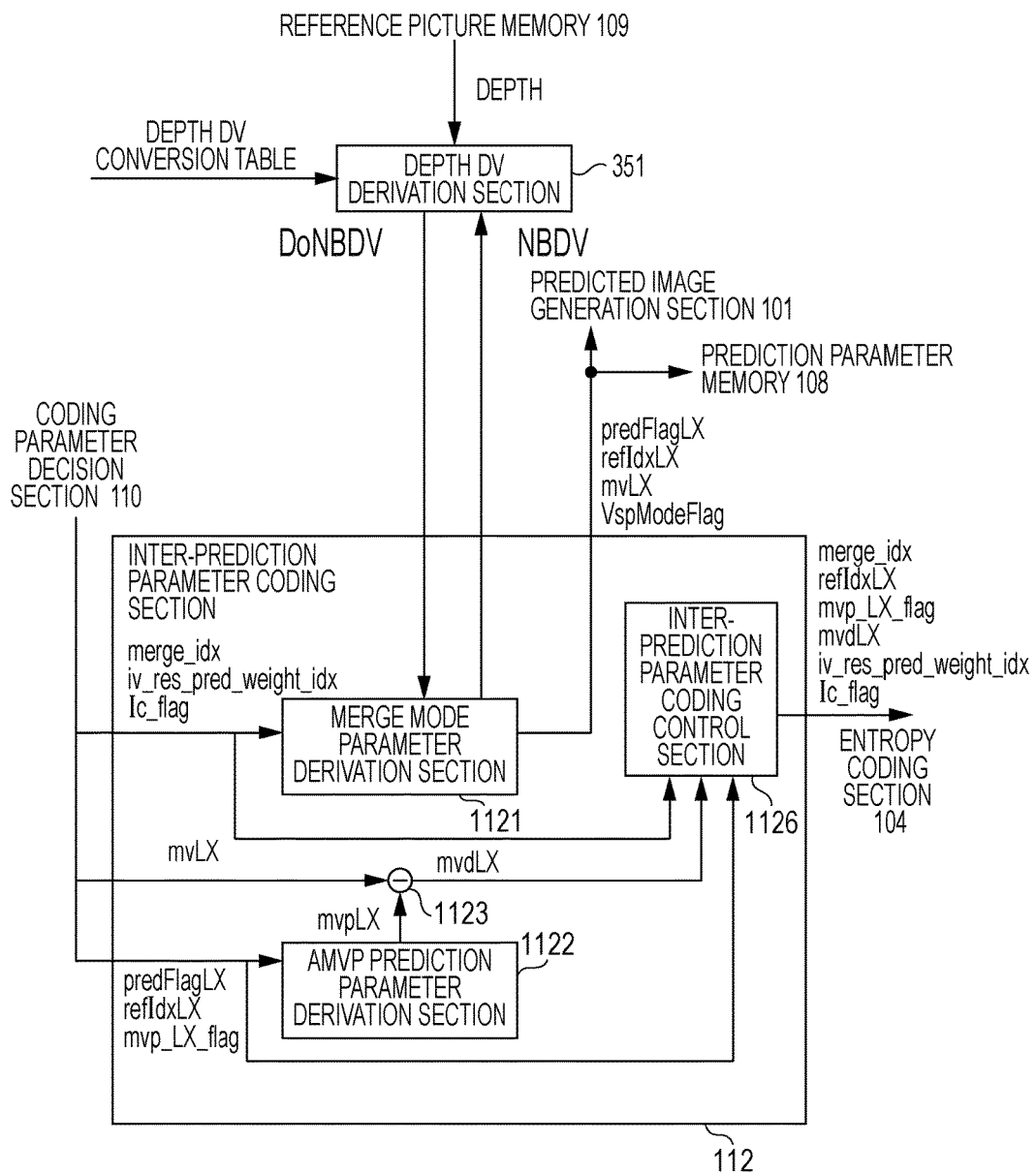
FIG. 23 is a schematic diagram illustrating the configuration of an inter-prediction parameter coding section 112 according to the embodiment.

Next, the configuration of the inter-prediction parameter coding section 112 will be described. The inter-prediction parameter coding section 112 is means corresponding to the inter-prediction parameter decoding section 303. FIG. 23 is a schematic diagram illustrating the configuration of the inter-prediction parameter coding section 112 according to the embodiment. The inter-prediction parameter coding section 112 is configured to include a merge mode parameter derivation section 1121, an AMVP prediction parameter derivation section 1122, a subtraction section 1123, and an inter-prediction parameter coding control section 1126.

The merge mode parameter derivation section 1121 has the same configuration as the above-described merge mode parameter derivation section 3036 (see FIG. 9).

The AMVP prediction parameter derivation section 1122 has the same configuration as the above-described AMVP prediction parameter derivation section 3032 (see FIG. 10).

The subtraction section 1123 subtracts the prediction vector mvpLX input from the AMVP prediction parameter derivation section 1122 from the vector mvLX input from the coding parameter decision section 110 to generate the difference vector mvdLX. The difference vector mvdLX is output to the inter-prediction parameter coding control section 1126.

The inter-prediction parameter coding control section 1126 instructs the entropy coding section 104 to codes codes (syntax elements) related to the inter-prediction and codes codes (the syntax elements) included in the coded data, for example, the partition mode part_mode, the merge flag merge_flag, the merge index merge_idx, the inter-prediction identifier inter_pred_idc, the reference picture index refIdxLX, the prediction vector flag mvp_LX_flag, and the difference vector mvdLX.

The inter-prediction parameter coding control section 1126 is configured to include a residual prediction index coding section 10311, a illumination compensation flag coding section 10312, a merge index coding section, a vector candidate index coding section, a partition mode coding section, a merge flag coding section, an inter-prediction identifier coding section, a reference picture index coding section, and a vector difference coding section. The partition mode coding section, the merge flag coding section, the merge index coding section, the inter-prediction identifier coding section, the reference picture index coding section, the vector candidate index coding section, and the vector difference coding section code the partition mode part_mode, the merge flag merge_flag, the merge index merge_idx, the inter-prediction identifier inter_pred_idc, the reference picture index refIdxLX, the prediction vector flag mvp_LX_flag, and the difference vector mvdLX.

The residual prediction index coding section 10311 codes the residual prediction index iv_res_pred_weight_idx to indicate whether to execute residual prediction.

The illumination compensation flag coding section 10312 codes the illumination compensation flag is flag to indicate whether to execute illumination compensation.

In a case where the prediction mode PredMode input from the predicted image generation section 101 is the merge mode, the inter-prediction parameter coding control section 1126 outputs the merge index merge_idx input from the coding parameter decision section 110 to the entropy coding section 104 so that the merge index merge_idx is coded.

The inter-prediction parameter coding control section 1126 executes the following processes in the case where the prediction mode PredMode input from the predicted image generation section 101 is the inter-prediction mode.

The inter-prediction parameter coding control section 1126 unifies the reference picture index refIdxLX and the prediction vector flag mvp_LX_flag input from the coding parameter decision section 110 and the difference vector mvdLX input from the subtraction section 1123. The inter-prediction parameter coding control section 1126 outputs the unified code to the entropy coding section 104 so that the code is coded. The inter-prediction parameter coding control section 1126 includes a DBBP flag coding section 11263 (not illustrated).

The predicted image generation section 101 is means corresponding to the above-described predicted image generation section 308 and a process of generating a predicted image from the prediction parameter is the same.

In the embodiment, the predicted image generation section 101 includes the above-described residual synthesis section 30923 according to the embodiment, as in the predicted image generation section 308. That is, in a case where the size of a target block (prediction block) is equal to or less than a predetermined size, the residual prediction is not executed. The predicted image generation section 101 executes the residual prediction only in a case where the partition mode part_mode of the coding unit CU is 2N×2N. That is, the residual prediction index iv_res_pred_weight_idx is processed as 0. The residual prediction index coding section 10311 according to the embodiment codes the residual prediction index iv_res_pred_weight_idx only in a case where the partition mode part_mode of the coding unit CU is 2N×2N.

The image coding device including the residual prediction section 3092 codes the residual prediction index in a case where the partition mode of the coding unit including a target block is 2N×2N in the image coding device including the residual prediction index coding section coding the residual prediction index. In other cases, the residual prediction index is not coded. In a case where the residual prediction index is a value other than 0, the residual prediction is executed.

(DBBP Prediction)

The predicted image generation section 101 included in the image coding device 11 according to the embodiment includes the DBBP prediction section 3095. Since the details of the operation of the DBBP prediction section 3095 have been described above, the description thereof will be omitted. The DBBP prediction section 3095 executes depth-based block prediction in a case where the above-described DBBP flag coding section 11263 codes 1 as the DBBP flag dbbp_flag.

In the image coding device including the DBBP prediction section 3095 (the image synthesis section 30953) having the above-described configuration and the DBBP prediction section 3095A and the DBBP prediction section 3095B according to the modification examples, one of the segmentation information segMask[ ][ ] of adjacent pixels of two right and left points of each pixel of a target block (condition A-1) and the segmentation information segMask[ ][ ] of two adjacent pixels of top and bottom points (condition A-2) is referred to. Therefore, it is possible to obtain the advantageous effect that complexity of the determination of whether there is a filter, compared to the comparison example in which the determination is executed horizontally and horizontally twice. The image synthesis section 30953 applies the horizontal filter (formula B-1) or the vertical filter (formula B-2) which is one filter. Therefore, it is possible to obtain the advantageous effect that complexity of the filter is low, compared to the comparative example in which the filter is applied horizontally and horizontally twice. The image synthesis section 30953 uses a partition type partMode in regard to the position (disposition or direction) of segmentation information referred to in the determination and the position (disposition or direction) of a pixel used for a filter. However, a result already by the DBBP partition mode derivation section 30954 can be used without change. Therefore, it is not necessary to newly introduce derivation of the partition mode partMode for a filter of the image synthesis section 30953.

In the image coding device including the DBBP prediction section 3095A, the rounding constant of the filtering process is changed according to the partition mode. Therefore, it is possible to improve coding efficiency.

In the image coding device including the DBBP prediction section 3095B, the rounding constant of the filtering process is changed according to whether the target pixel is luminance or chroma. Therefore, it is possible to improve coding efficiency.

Parts of the image coding device 11 and the image decoding device 31 according to the above-described embodiment, for example, the entropy decoding section 301, the prediction parameter decoding section 302, the predicted image generation section 101, the DCT quantization section 103, the entropy coding section 104, the inverse quantization and inverse DCT section 105, the coding parameter decision section 110, and the prediction parameter coding section 111, the entropy decoding section 301, the prediction parameter decoding section 302, the predicted image generation section 308, and the inverse quantization and inverse DCT section 311 may be realized by a computer. In this case, a program realizing the control function may be recorded on a computer-readable recording medium and the program recorded on the recording medium may be read and executed in to a computer system to be realized. The "computer system" mentioned here is a computer system included in one of the image coding device 11 and the image decoding device 31 and includes an OS and hardware such as peripheral apparatus. The "computer-readable recording medium" refers to a portable medium such as a flexible disk, a magneto-optical disc, a ROM, or a CD-ROM or a storage device such as a hard disk included in a computer system. The "computer-readable recording medium" may also include a medium retaining a program dynamically for a short time, such as a communication line when a program is transmitted via a network such as the Internet or a communication circuit line such as a telephone circuit and a medium retaining a program for a given time, such as a volatile memory included in a computer system serving as a server or a client in this case. The program may be a program used to realize some of the above-described functions or may be a program combined with a program already stored in a computer system to realize the above-described functions.

Some or all of the image coding device 11 and the image decoding device 31 according to the above-described embodiment may be realized as an integrated circuit such as large scale integration (LSI). Each of the functional blocks of the image coding device 11 and the image decoding device 31 may be individually formed as a processor or some or all of the functional blocks may be integrated to be formed as a processor. A method for an integrated circuit is not limited to the LSI, but may be realized by a dedicated circuit or a general processor. When an integrated circuit technology substituting the LSI with an advance in semiconductor technologies appears, an integrated circuit may be used by the technology.

The embodiment of the invention has been described above in detail with reference to the drawings, but a specific configuration is not limited to the above-described configuration. The invention can be modified in various forms within the scope of the invention without departing from the gist of the invention.

CONCLUSION

According to an aspect of the invention, a predicted image generation device includes: a segmentation derivation section that derives segmentation information from an image; and an image synthesis section that generates a predicted image. The image synthesis section executes a filtering process based on a partition mode and the segmentation information.

According to the aspect of the invention, the image synthesis section may determine whether to execute the filtering process with reference to the segmentation information located in a horizontal direction of a target pixel in a case where the partition mode is a vertically long block, and may determine whether to execute the filtering process with reference to the segmentation information located in a vertical direction of the target pixel in a case where the partition mode is a horizontally long block.

According to the aspect of the invention, the image synthesis section may determine whether to execute the filtering process with reference to the segmentation information located in a horizontal direction of a target pixel in a case where the partition mode is N×2N, and may determine whether to execute the filtering process with reference to the segmentation information located in a vertical direction of the target pixel in a case where the partition mode is 2N×N.

According to the aspect of the invention, the image synthesis section may execute the filtering process with reference to a target pixel and pixels located in a horizontal direction of the target pixel in a case where the partition mode is a vertically long block, and may execute the filtering process with reference to the target pixel and pixels located in a vertical direction of the target pixel in a case where the partition mode is a horizontally long block.

According to the aspect of the invention, the image synthesis section may execute the filtering process with reference to the target pixel and the pixels located in the horizontal direction of the target pixel in a case where the partition mode is N×2N, and may execute the filtering process with reference to the target pixel and pixels located in a vertical direction of the target pixel in a case where the partition mode is 2N×N.

According to the aspect of the invention, the image synthesis section may execute the filtering process by setting a right shifted value from a product sum of c, r, and l with reference to a target pixel c, a pixel l located on a left side of the target pixel, and a pixel r located on a right side of the target pixel as an output pixel in the case where the partition mode is the vertically long block and by setting a right shifted value from the product sum of c, t, and b with reference to the target pixel c, a pixel t located on a top side of the target pixel, and a pixel b located on a bottom side of the target pixel as an output pixel in the case where the partition mode is the horizontally long block.

According to the aspect of the invention, the image synthesis section may execute the filtering process by setting $(l+2*c+r)>>2$ as an output pixel in the right adjacent pixel l, the target pixel c, and the left adjacent pixel r in the case where the partition mode is the vertically long block and by setting $(t+2*c+b)>>2$ as an output pixel in the top adjacent pixel t, the target pixel c, and the bottom adjacent pixel b in the case where the partition mode is the horizontally long block.

According to another aspect of the invention, an image decoding device includes the predicted image generation device and a DBBP flag decoding section. The predicted image generation device executes DBBP prediction in a case where a DBBP flag is 1.

According to still another aspect of the invention, an image coding device includes the predicted image generation device and a DBBP flag coding section. The predicted image generation device executes DBBP prediction in a case where a DBBP flag is 1.

INDUSTRIAL APPLICABILITY

The invention can be appropriately applied to an image decoding device that decodes coded data in which image data is coded and an image coding device that generates coded data in which image data is coded. The invention can be appropriately applied to a data structure of coded data that is generated by the image coding device and is referred to by the image decoding device.

REFERENCE SIGNS LIST 1 image transmission system
11 image coding device
101 predicted image generation section
102 subtraction section
103 DCT and quantization section
10311 residual prediction index coding section
10312 illumination compensation flag coding section
104 entropy coding section
105 inverse quantization and inverse DCT section
106 addition section
108 prediction parameter memory (frame memory)
109 reference picture memory (frame memory)
110 coding parameter decision section
111 prediction parameter coding section
112 inter-prediction parameter coding section
1121 merge mode parameter derivation section
1122 AMVP prediction parameter derivation section
1123 subtraction section
1126 inter-prediction parameter coding control section
113 intra-prediction parameter coding section
21 network
31 image decoding device
301 entropy decoding section
302 prediction parameter decoding section
303 inter-prediction parameter decoding section
3031 inter-prediction parameter decoding control section
30311 partition mode decoding section
30312 inter-prediction identifier decoding section
30313 DBBP flag decoding section
3032 AMVP prediction parameter derivation section
3035 addition section
3036 merge mode parameter derivation section
30361 merge candidate derivation section
303611 merge candidate storage section
30362 merge candidate selection section
30370 enhancement merge candidate derivation section
30371 inter-layer merge candidate derivation section
30373 disparity merge candidate derivation section
30374 VSP merge candidate derivation section (VSP prediction section, viewpoint synthesis prediction means, partition splitting section, depth vector derivation section)
30380 base merge candidate derivation section
30381 spatial merge candidate derivation section
30382 temporal merge candidate derivation section
30383 coupled merge candidate derivation section
30384 zero merge candidate derivation section
304 intra-prediction parameter decoding section
306 reference picture memory (frame memory)
307 prediction parameter memory (frame memory)
308 predicted image generation section
309 inter-predicted image generation section
3091 motion disparity compensation section
3092 residual prediction section
30922 reference image interpolation section
30923 residual synthesis section
30924 residual prediction vector derivation section
3093 illumination compensation section
3095, 3095A, 3095B DBBP prediction section (depth-based block predicted image generation device)
30951 DBBP image interpolation section (image interpolation section, image interpolation means)
30952 segmentation section
30953, 30953A, 30953B image synthesis section
30954, 30954A, 30954B DBBP partition mode derivation section (depth partition mode derivation means)
3096 weight prediction section
310 intra-predicted image generation section
311 inverse quantization and inverse DCT section
312 addition section
351 depth DV derivation section
352 disparity vector derivation section
353 partition mode derivation section
41 image display apparatus

The invention claimed is:

1. A predicted image generation device comprising:
a segmentation section that derives segmentation information of a target block; and
an image synthesis section that generates a predicted image using the segmentation information,
wherein the image synthesis section generates the predicted image by using a target pixel c, a pixel l located on a left side of the target pixel and a pixel r located on a right side of the target pixel in a case that a partition mode is a vertically long block and by using the target pixel c, a pixel t located on a top side of the target pixel and a pixel b located on a bottom side of the target pixel in a case that the partition mode is a horizontally long block.

2. The predicted image generation device according to claim 1,
wherein the image synthesis section generates the predicted image by using a value obtained by left shifting the target pixel c by 1 bit.

3. An image decoding device comprising:
the predicted image generation device according to claim 1; and
a Depth-based Block Partitioning (DBBP) flag decoding section,
wherein the predicted image generation device executes DBBP prediction in a case that a DBBP flag is 1.

4. An image coding device comprising:
the predicted image generation device according to claim 1; and
a Depth-based Block Partitioning (DBBP) flag coding section,
wherein the predicted image generation device executes DBBP prediction in a case that a DBBP flag is 1.

5. The predicted image generation device according to claim 1, wherein the vertically long block is indicated by N×2N and the horizontally long block is indicated by 2N×N.

* * * * *